United States Patent
Okamoto

(10) Patent No.: US 7,564,596 B2
(45) Date of Patent: Jul. 21, 2009

(54) IMAGE RECORDING APPARATUS

(75) Inventor: Hiroshi Okamoto, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 1139 days.

(21) Appl. No.: 10/491,910

(22) PCT Filed: Oct. 11, 2002

(86) PCT No.: PCT/JP02/10571

§ 371 (c)(1),
(2), (4) Date: Apr. 8, 2004

(87) PCT Pub. No.: WO03/033271

PCT Pub. Date: Apr. 24, 2003

(65) Prior Publication Data

US 2004/0263875 A1 Dec. 30, 2004

(30) Foreign Application Priority Data

Oct. 12, 2001 (JP) .............................. 2001-315065

(51) Int. Cl.
*H04N 1/04* (2006.01)

(52) U.S. Cl. ................. 358/474; 358/514; 358/1.9; 358/505; 358/1.8; 358/1.15

(58) Field of Classification Search .......... 358/1.9, 358/514, 474, 1.15, 1.8, 1.2, 505, 497
See application file for complete search history.

(56) References Cited

U.S. PATENT DOCUMENTS

| | | | | |
|---|---|---|---|---|
| 5,072,304 A | * | 12/1991 | Abe et al. | 358/296 |
| 5,492,057 A | * | 2/1996 | Bornhors et al. | 358/3.32 |
| 5,663,802 A | | 9/1997 | Beckett et al. | |
| 5,737,090 A | * | 4/1998 | Christopher et al. | 358/3.29 |
| 6,128,676 A | * | 10/2000 | Ohkubo | 710/28 |
| 6,607,260 B1 | * | 8/2003 | Ikeda | 347/19 |
| 6,843,610 B2 | * | 1/2005 | Ioka et al. | 400/76 |
| 7,147,300 B2 | * | 12/2006 | Shioya | 347/41 |
| 2003/0001914 A1 | * | 1/2003 | Matsumoto et al. | 347/12 |
| 2008/0180756 A1 | * | 7/2008 | Nagasaka | 358/474 |

(Continued)

FOREIGN PATENT DOCUMENTS

JP 56-5775 A 1/1981

(Continued)

OTHER PUBLICATIONS

European Search Report issued in European Patent Application No. EP 07 11 2301, mailed Oct. 12, 2007.

*Primary Examiner*—Negussie Worku
(74) *Attorney, Agent, or Firm*—McDermott Will & Emery LLP

(57) ABSTRACT

Means for detecting scanning positions of first and second recording heads is provided for detecting that the first recording head is opposed to a recording inhibition area (in which an imaging material is not mounted) on a drum 1, based on an output from the detection means. While the recording head is in the recording inhibition area, correction data for the second recording head is read from a correction data memory and transferred to a submemory in an FPGA for image processing. The second recording head reads the correction data from the submemory. Correction data can be read in parallel.

22 Claims, 30 Drawing Sheets

U.S. PATENT DOCUMENTS

2008/0192266 A1 * 8/2008 Vanhooydonck et al. ..... 358/1.8

FOREIGN PATENT DOCUMENTS

| | | |
|---|---|---|
| JP | 5-16317 A | 1/1993 |
| JP | 9-141817 A | 6/1997 |
| JP | 9-185196 A | 7/1997 |
| JP | 11-198457 A | 7/1999 |
| JP | 2000-94807 A | 4/2000 |
| JP | 2001-80125 A | 3/2001 |
| JP | 2001-130084 A | 5/2001 |

* cited by examiner

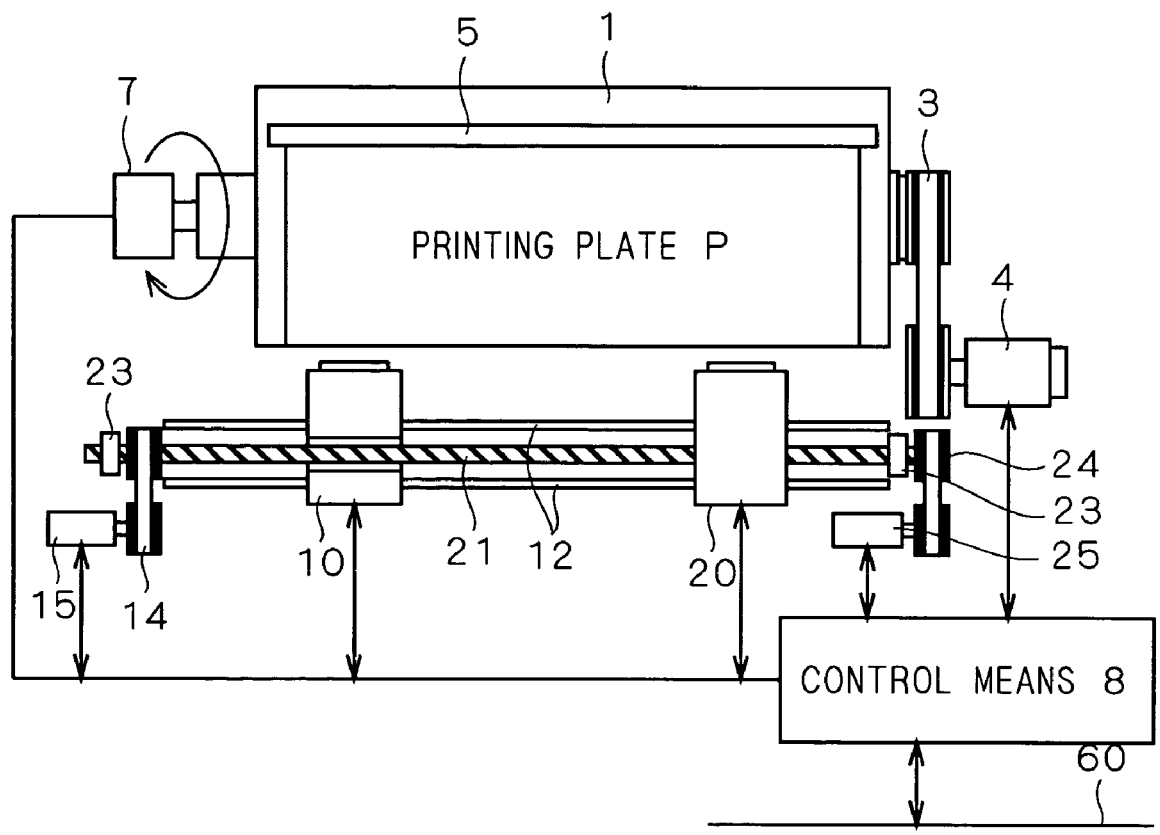

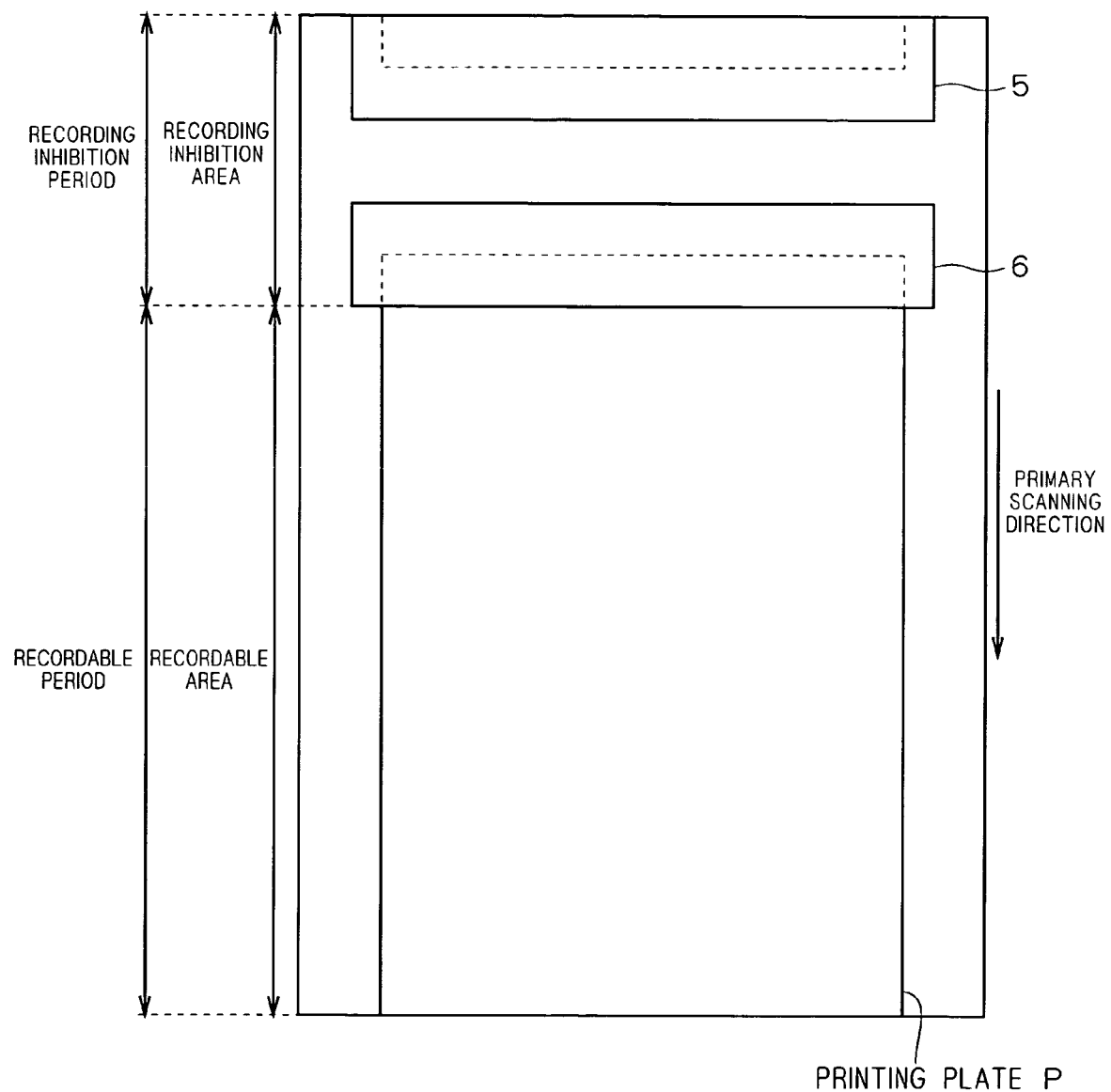

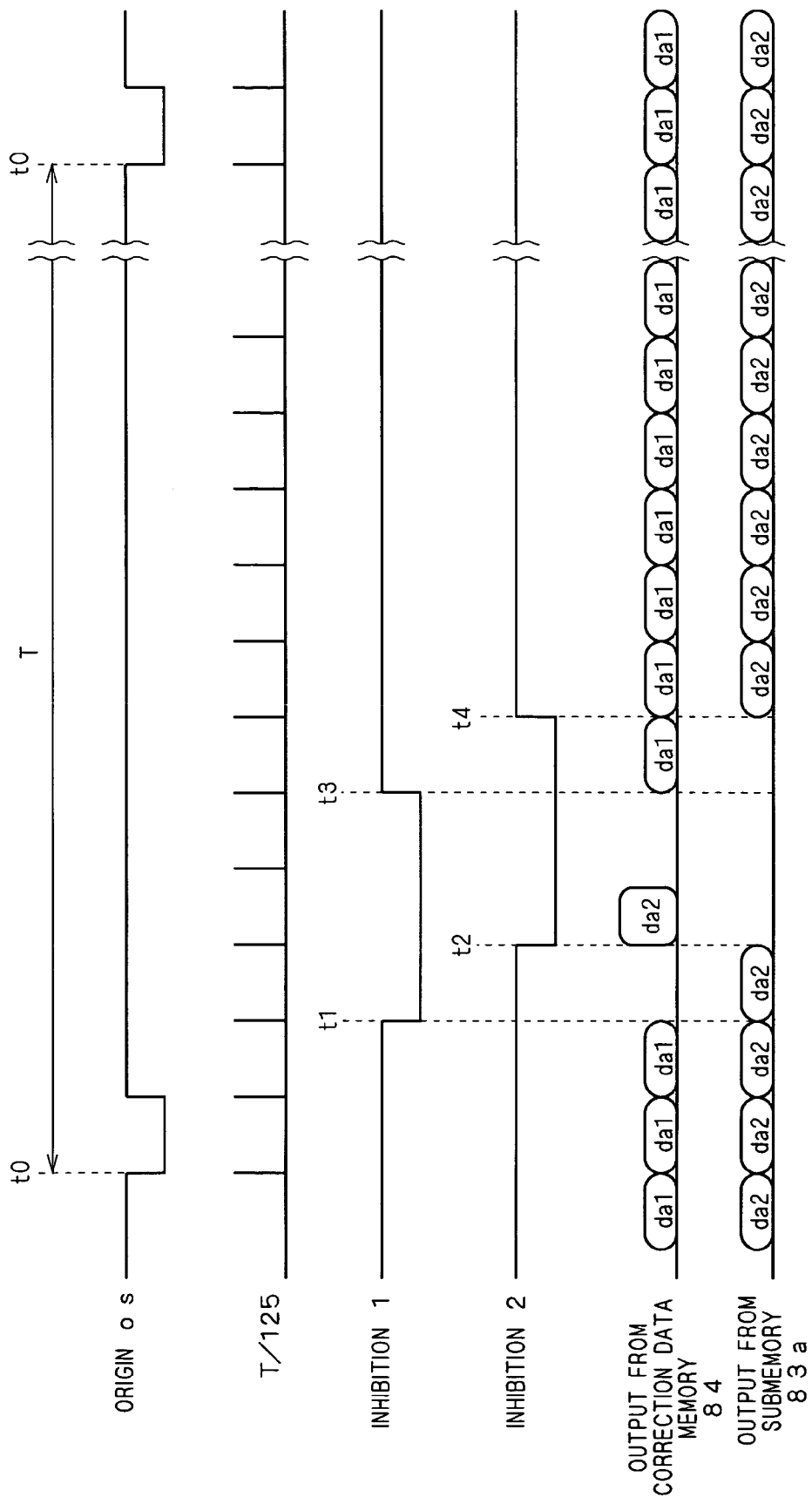

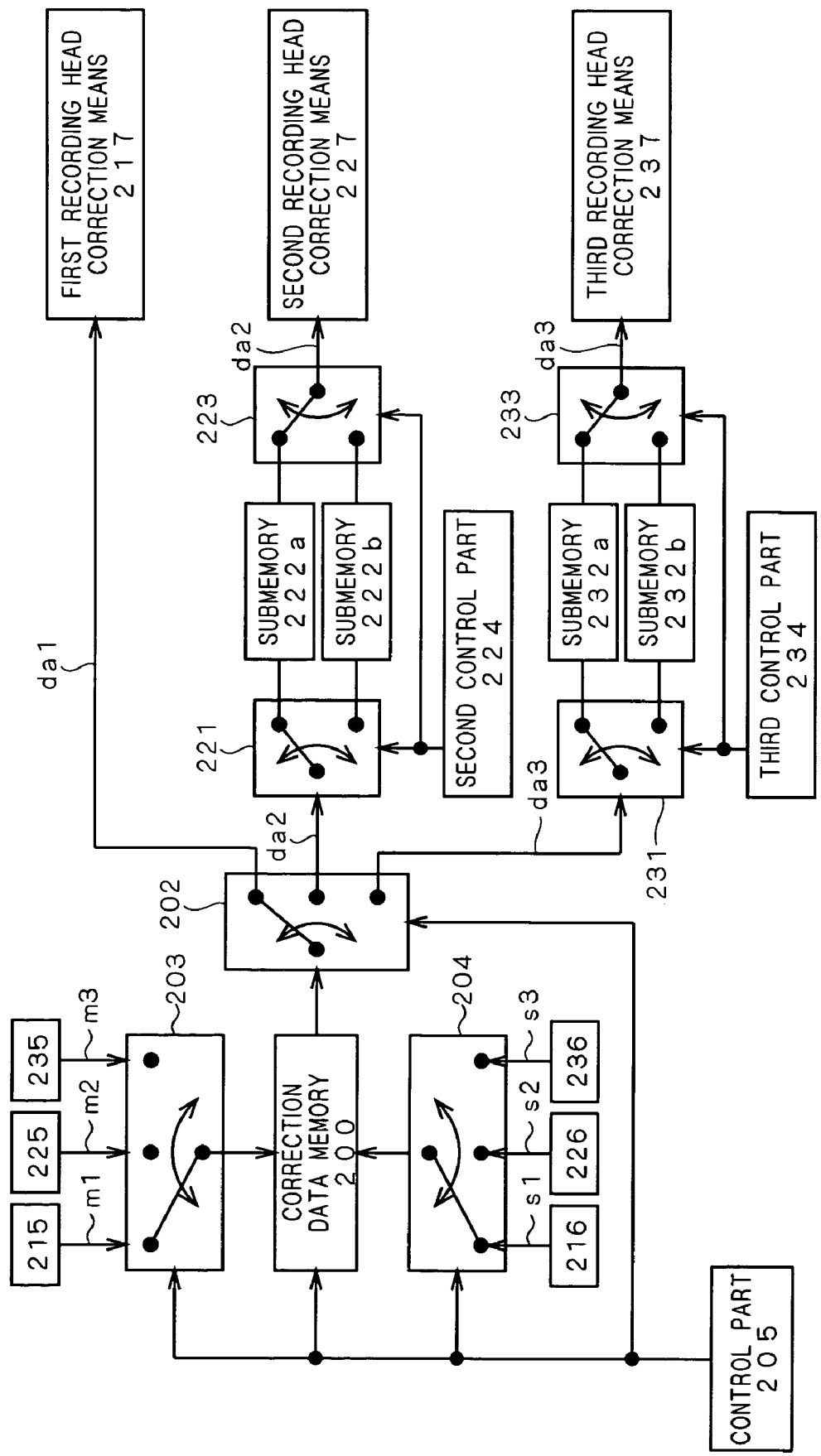

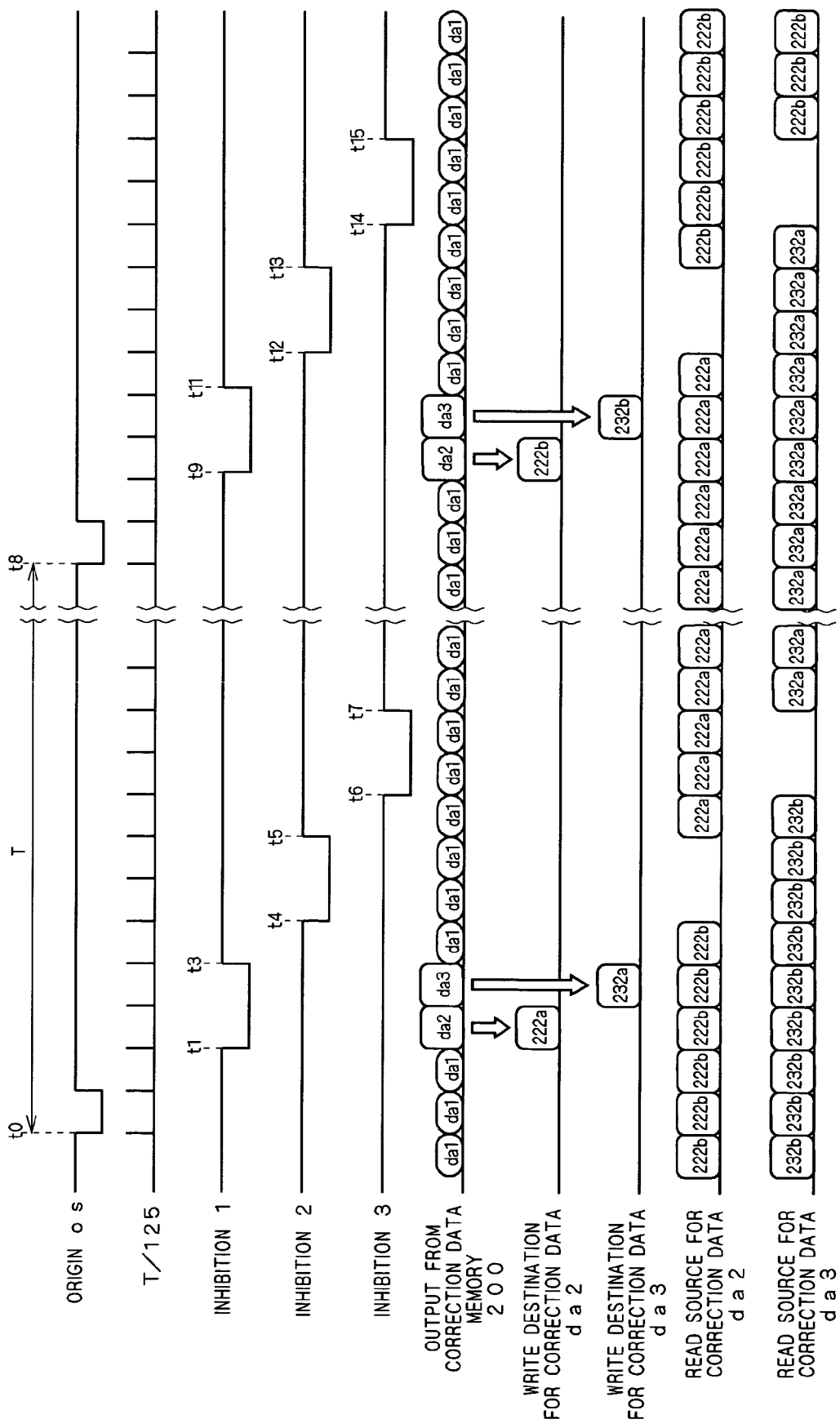

F I G. 1 1
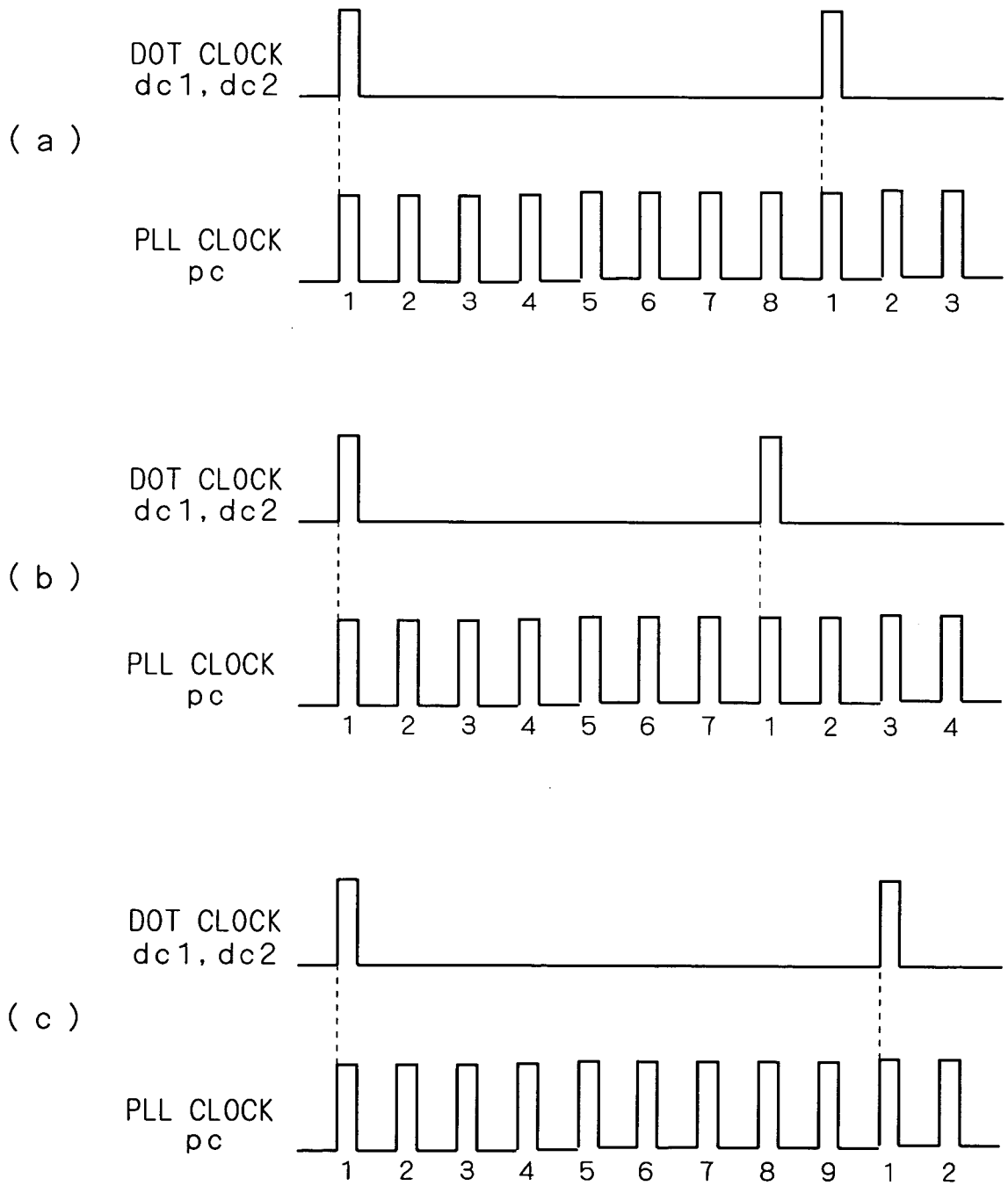

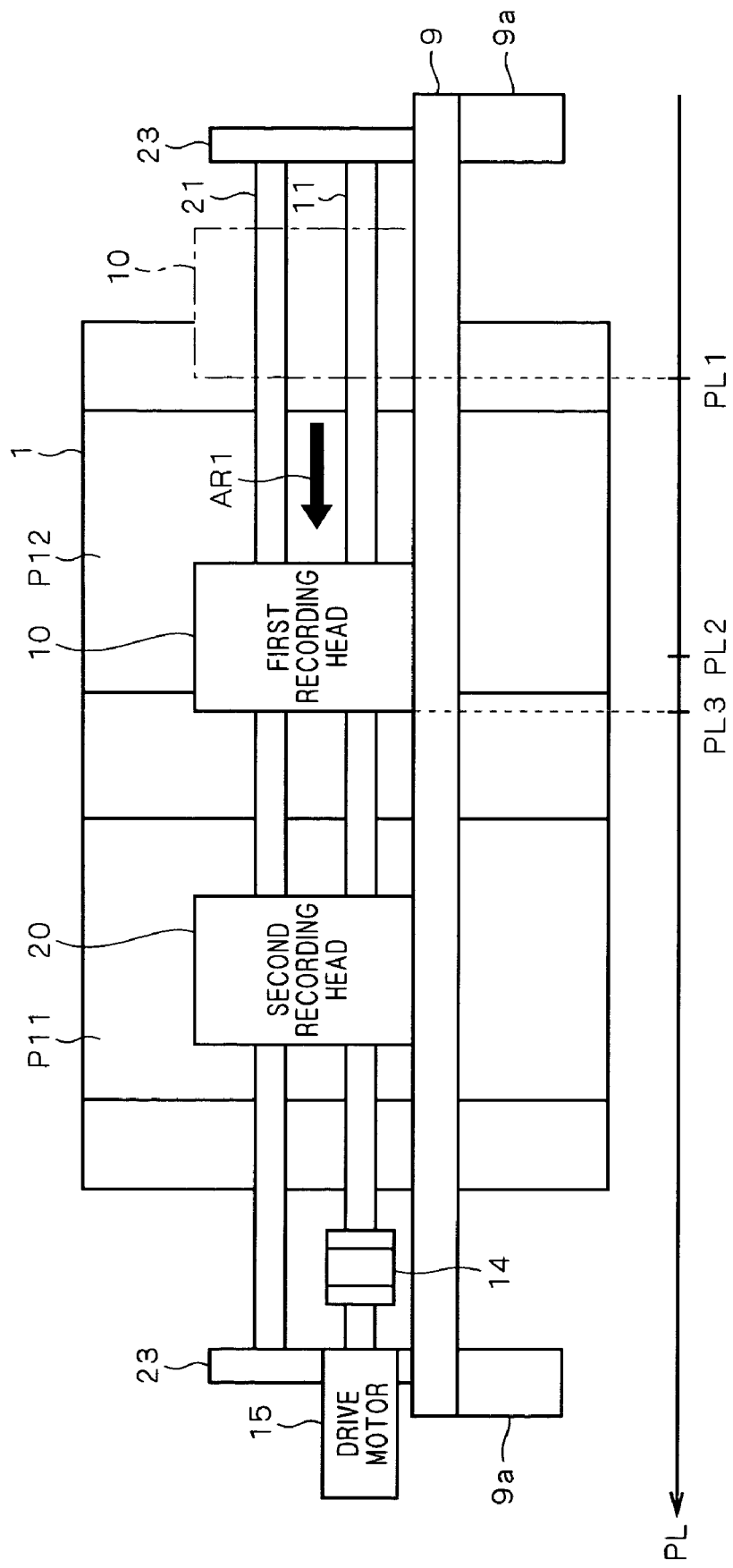

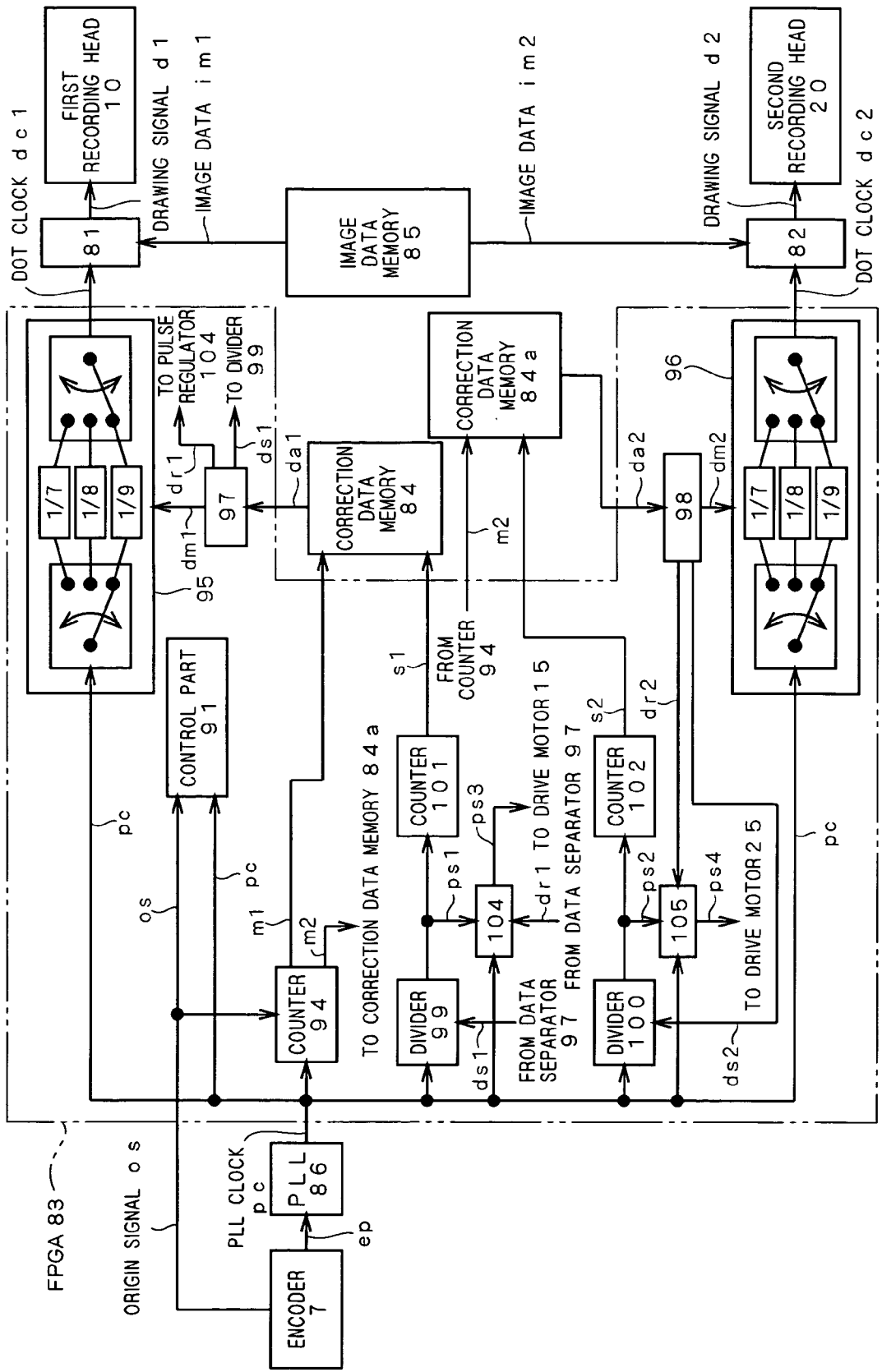
F I G . 1 5

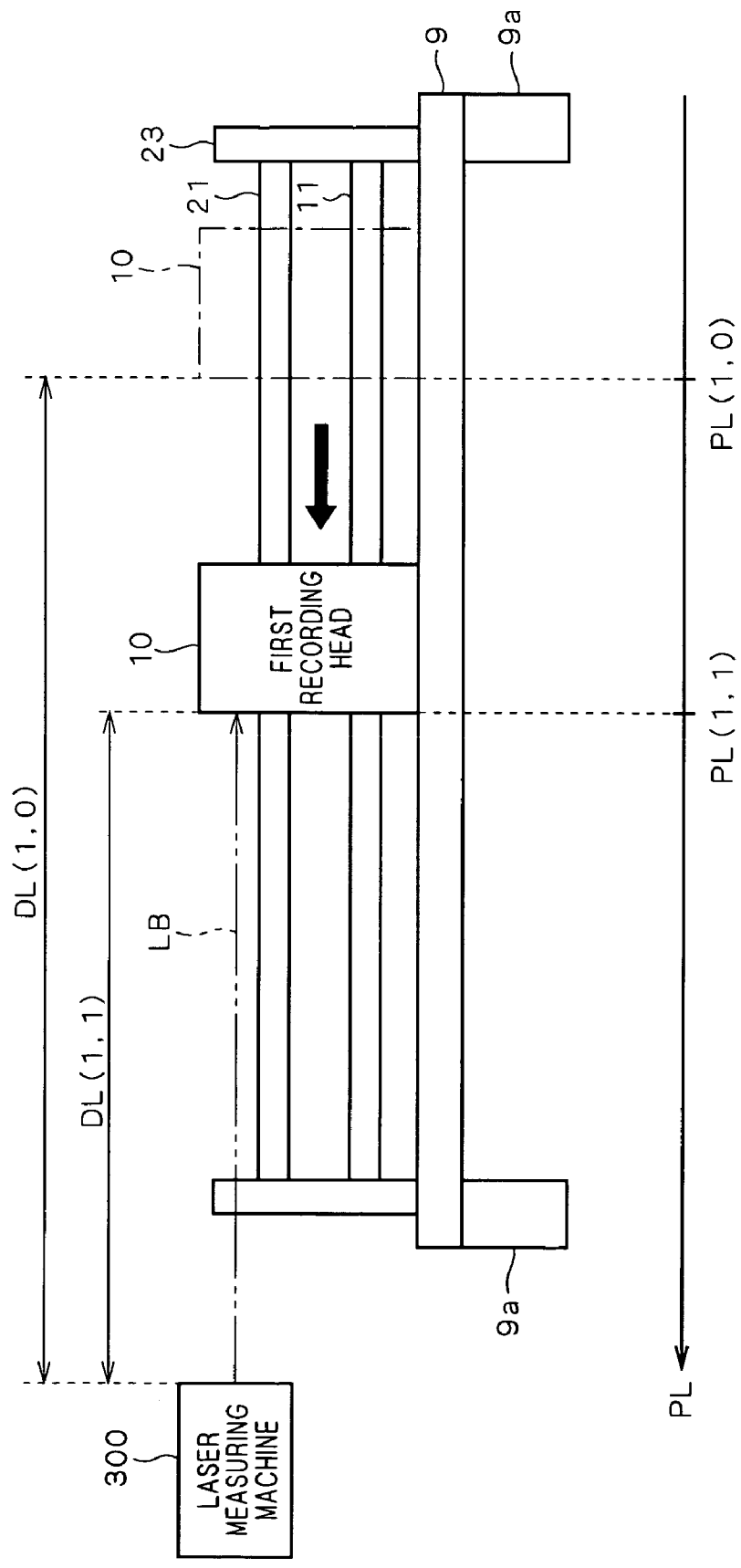

FIG. 20
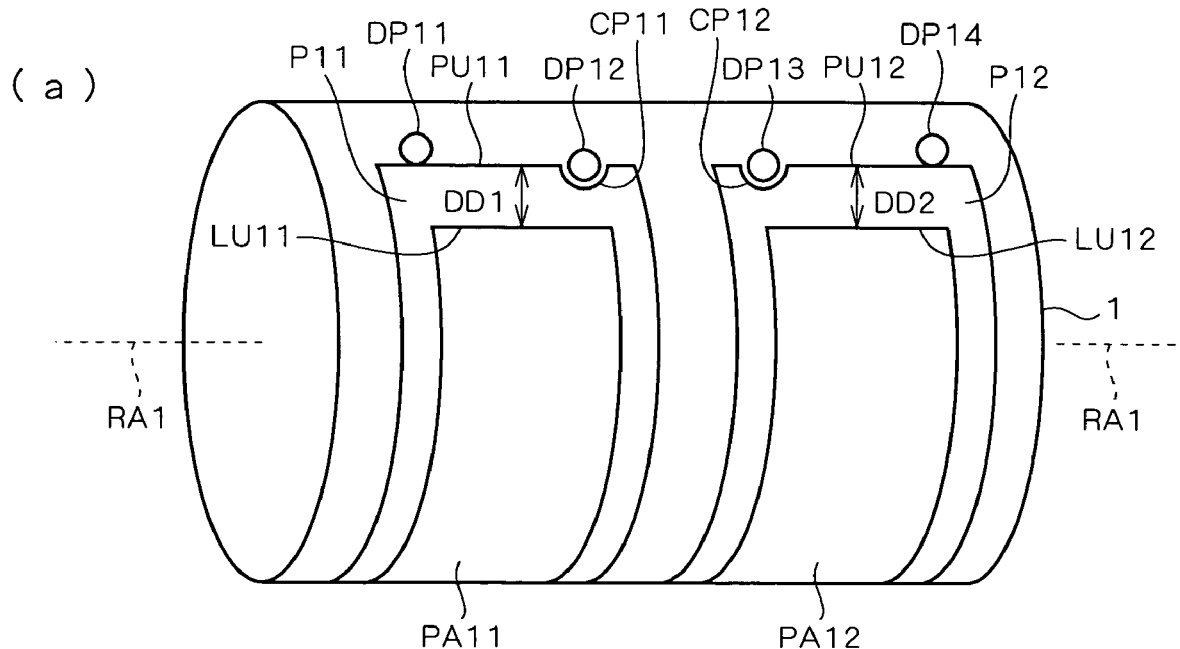
(a)
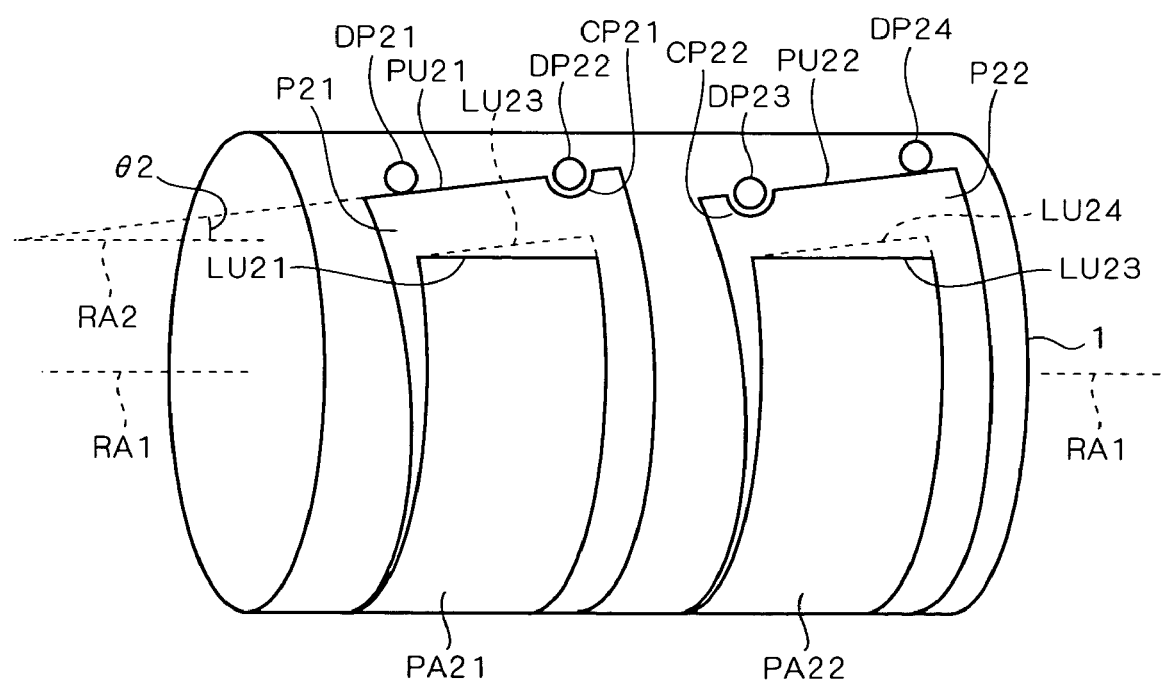
(b)

FIG. 21
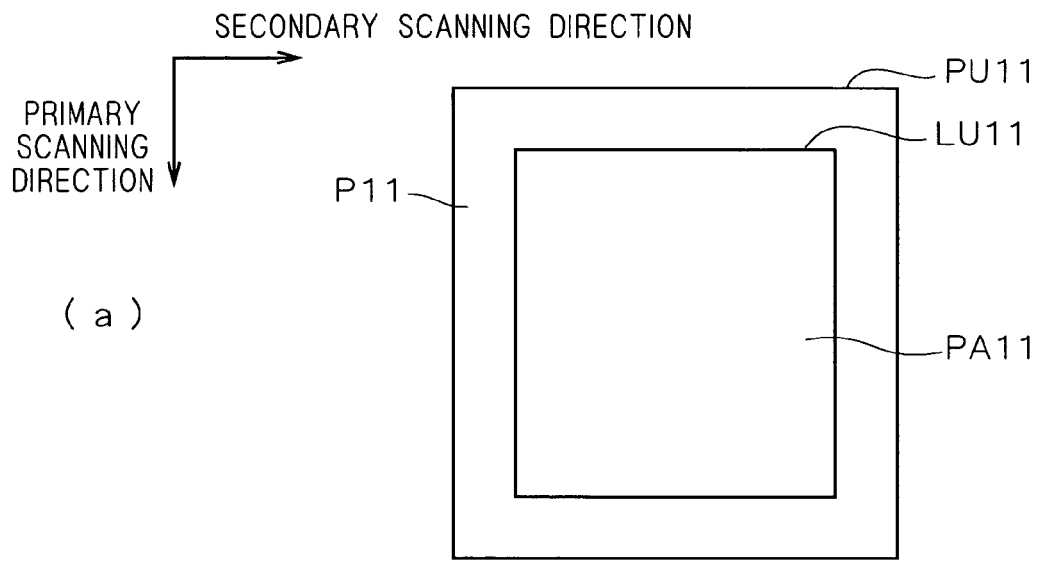
(a)
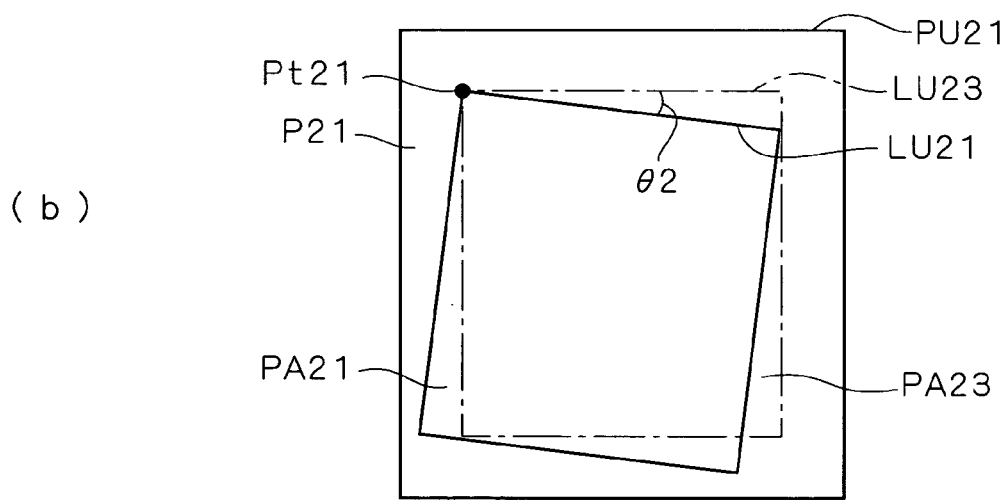
(b)
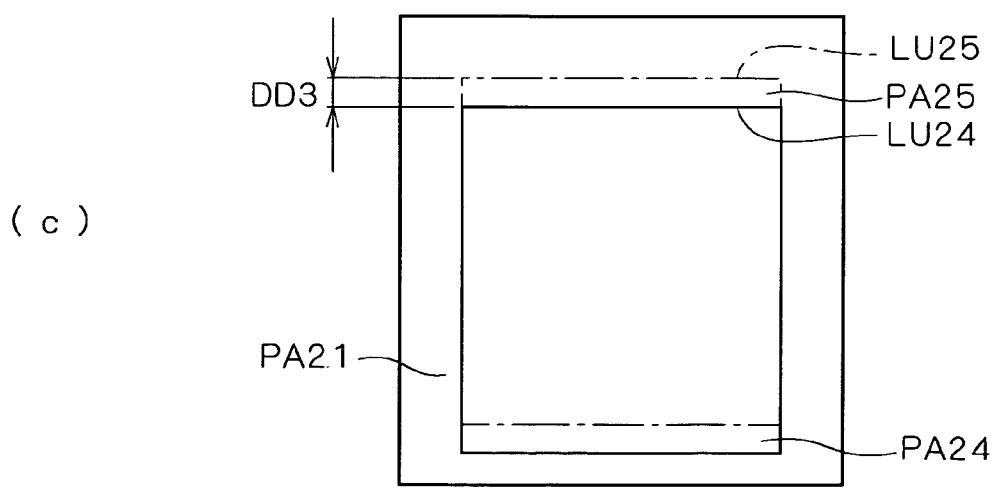
(c)

FIG. 25
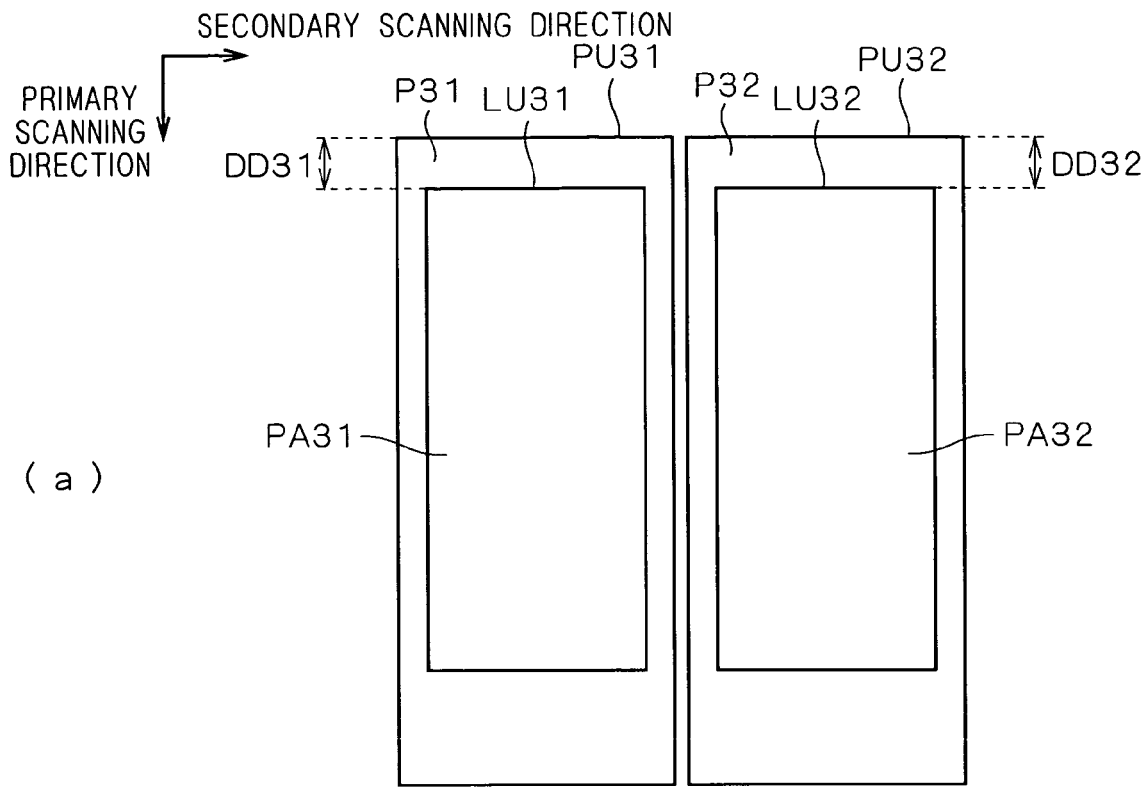
(a)
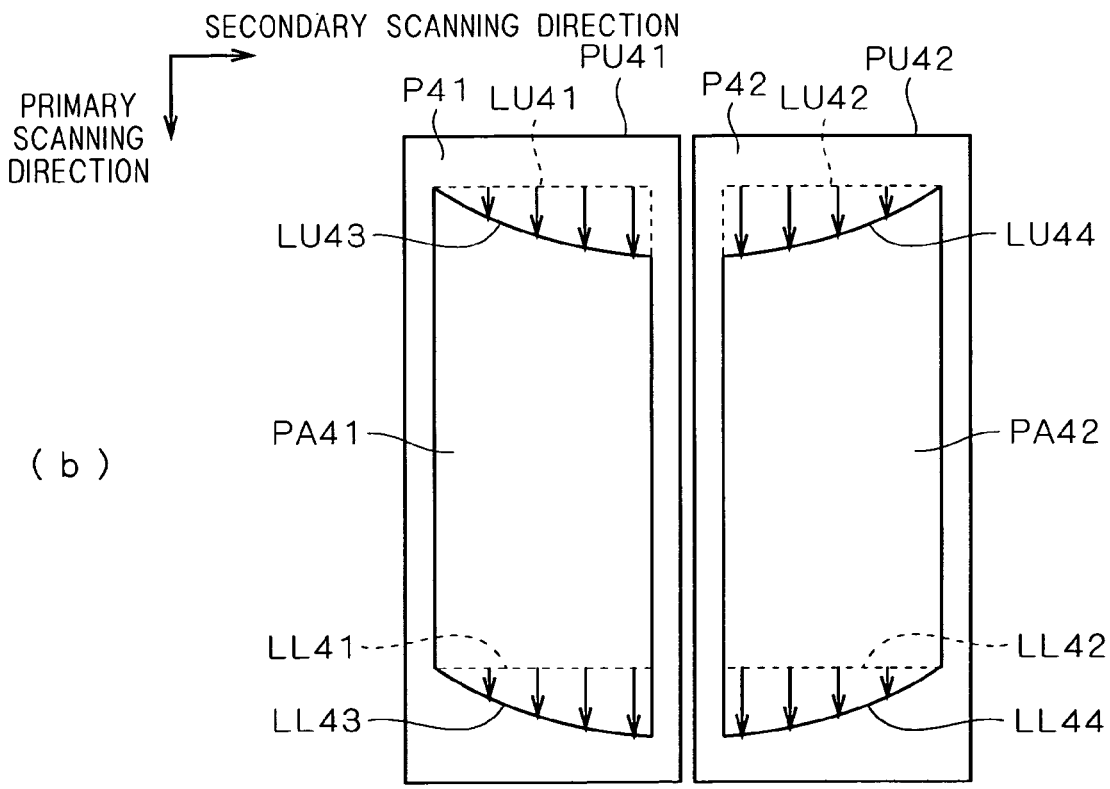
(b)

IMAGE RECORDING APPARATUS

TECHNICAL FIELD

The present invention relates to an image recording system for performing image recording on an imaging material such as a lithographic printing plate on the basis of image data, and more particularly, it relates to a technique for efficiently performing image recording.

BACKGROUND ART

A so-called external drum image recording system having a drum wound with an imaging material such as a printing plate and a recording head comprising emission means emitting light in response to image data and moving along the axial direction of the drum is well known. This system rotates the drum at a high speed and moves the recording head along the axial direction of the drum for making the emission means emit light, thereby forming a two-dimensional image on the imaging material.

While the scanning rate can be improved in such an external drum image recording system by improving the rotational speed of the drum or increasing the number of arrays of the emission means mounted on the recording system, effectiveness thereof is limited.

In order to solve the aforementioned problem, a plurality of recording heads for recording images may conceivably be provided for parallelly scanning a plurality of areas on the printing plate and increasing speed. For example, an image recording system disclosed in Japanese Patent Application Laid-Open No. 9-185196 (1997) is formed with a plurality of recording heads arranged in a subscanning direction for parallelly recording images with the recording heads.

PRIOR ART AND PROBLEMS THEREOF

In the image recording system employing a plurality of recording heads, however, as many conventional circuit structures as the recording heads are merely aligned with each other, and this is not an efficient structure.

DISCLOSURE OF INVENTION

The present invention is directed to an image recording system for recording an image by scanning an imaging material on the basis of image data.

According to the present invention, the image recording system comprises holding means for holding the imaging material on a substantially cylindrical holding surface, a plurality of recording heads movable on a common moving path along an axial direction of the holding surface and capable of individually scanning the imaging material, compensation data holding means for holding compensation data compensating for a scanning error from a reference scanning state with respect to the holding surface, and regulation means for regulating scanning positions of the plurality of recording heads on the imaging material while employing the same part of the compensation data for the plurality of recording heads for the same scanning position.

The quantity of data employed for regulating the scanning positions can be reduced.

Preferably, the compensation data holding means comprises a data memory for storing the compensation data for compensating for scanning positions of the recording heads on the imaging material, and the regulation means comprises a submemory for temporarily storing the compensation data, scanning position detection means for detecting the scanning positions of the recording heads, means for detecting that at least one of the plurality of recording heads is in a recording inhibition area on the basis of a signal from the scanning position detection means, to read the compensation data for the remainder of the plurality of recording heads from the data memory thereby to store the compensation data in the submemory while the one of the recording heads is in the recording inhibition area, and correction means for reading the compensation data in parallel from the data memory and the submemory to correct the scanning positions of the plurality of recording heads on the imaging material.

Accesses to the data memory do not overlap each other, but a read address can be supplied to the data memory with a relatively simple circuit structure.

The present invention is also directed to an image recording system for recording a plurality of images on a plurality of imaging materials respectively on the basis of a plurality of image data corresponding to each other.

According to the present invention, the image recording system comprises holding means for holding the plurality of imaging materials in parallel on a substantially cylindrical holding surface, a plurality of recording heads arranged in parallel opposite to the holding surface, image data supply means for supplying the plurality of image data to the plurality of recording heads respectively, moving means for individually moving the plurality of recording heads along an axial direction of the holding surface, moving signal supply means for supplying moving signals for the plurality of recording heads respectively to the moving means, and regulation means for at least partially regulating the plurality of image data and the moving signals, thereby to compensate for a geometric mismatch between the images on the plurality of imaging materials respectively recorded by the plurality of recording heads.

Images of substantially identical shapes can be recorded on the plurality of imaging materials respectively by the plurality of recording heads.

The present invention is also directed to an image recording system for recording a plurality of images on a plurality of imaging materials respectively on the basis of a plurality of image data corresponding to each other.

According to the present invention, the image recording system comprises holding means for holding the plurality of imaging materials in parallel on a substantially cylindrical holding surface, a recording head provided opposite to the holding surface, image data supply means for sequentially supplying the plurality of image data to the recording head, moving means for moving the recording head along an axial direction of the holding surface, moving signal supply means for supplying a moving signal for the recording head to the moving element, and regulation means for at least partially regulating the plurality of image data and the moving signal each, thereby to compensate for a geometric mismatch between the scans of the plurality of imaging materials respectively by the recording head.

Correct images can be recorded on two imaging materials by the single recording head.

Accordingly, an object of the present invention is to provide an image recording system employing a plurality of recording heads and capable of operating the plurality of heads in parallel by means of relatively small equipment.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 1 is a schematic plan view showing an exemplary image recording system according to a first embodiment of the present invention.

FIG. 7 schematically shows the surface of a drum 1 of the image recording system according to the first embodiment.

FIG. 8 is a timing chart illustrating correction processing in the image recording system according to the first embodiment.

FIG. 9 is a simplified block diagram of control means in an exemplary image recording system according to a second embodiment of the present invention.

FIG. 10 is a timing chart illustrating correction processing in the image recording system according to the second embodiment.

FIG. 11 is a timing chart illustrating the relation between a PLL clock and dot clocks employed in the image recording system according to the first embodiment.

FIG. 14 is a view for illustrating feed rate correction of ball screws in a third embodiment of the present invention.

FIG. 15 is a functional block diagram of control means of an image recording system according to the third embodiment.

FIG. 16 is a view for illustrating measurement of the feed rate of the ball screws in the third embodiment.

FIG. 20 is a view for illustrating the relation between positions of respective positioning pins provided upright and fixed positions of respective printing plates in the case of drawing images on two printing plates with two recording heads in a fourth embodiment of the present invention.

FIG. 21 is a view for illustrating an image recording area in the case where a printing plate is inclined with respect to a rotation axis in the fourth embodiment.

FIG. 25 is a view for illustrating image recording areas in the case of drawing images on two printing plates with two recording heads when the base part and the ball screws are deflected in the fifth embodiment.

BEST MODES FOR CARRYING OUT THE INVENTION

First Embodiment

Figure 2:
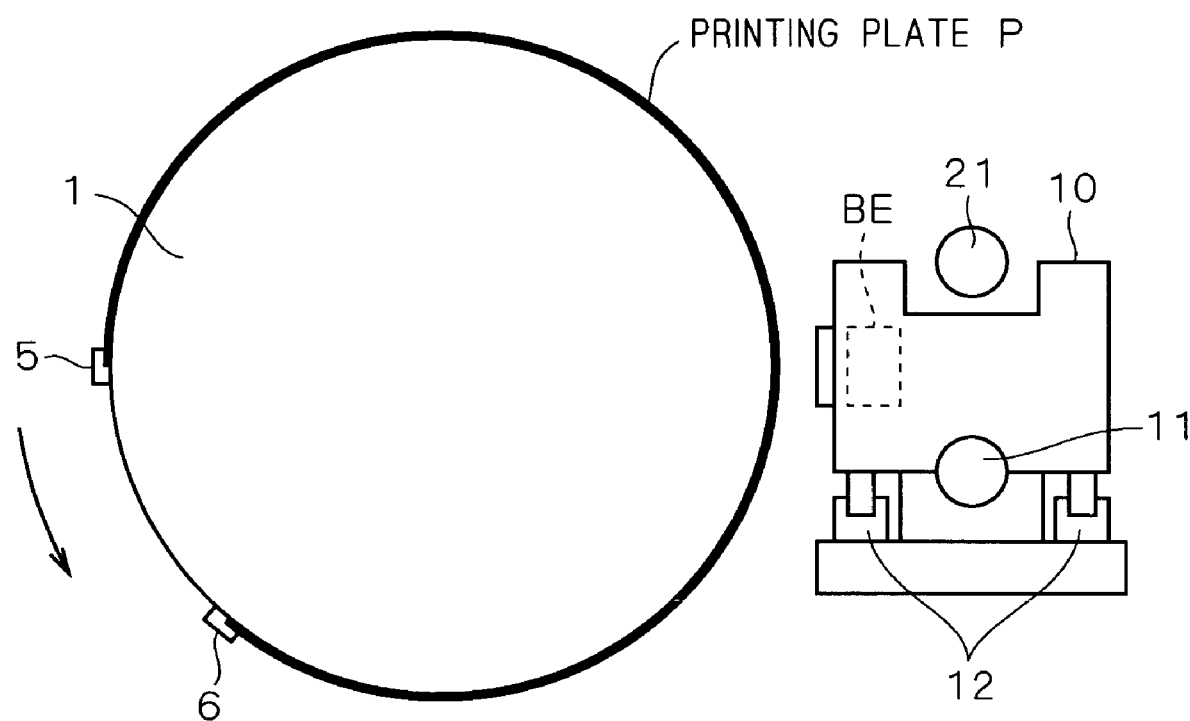
FIG. 2 is a schematic side-elevational view of the image recording system according to the first embodiment.

A first embodiment of the present invention is described with reference to the drawings. FIG. 1 is a schematic plan view showing a principal part of an exemplary image recording system according to the first embodiment as viewed from above. Referring to FIG. 1, the image recording system comprises a drum 1 rotatable while holding a printing plate P (imaging material), first and second recording heads 10 and 20 movable along the axial direction of the drum 1 and control means 8 for controlling the image recording system.

The drum 1 holds the sheetlike printing plate P (imaging material) in a substantially cylindrical form on its outer peripheral surface serving as a holding surface. Clamp members 5 and 6 (see FIG. 2) are arranged on the outer peripheral surface of the drum 1. The pair of clamp members 5 and 6 hold both ends of the printing plate P therebetween thereby holding the printing plate P on the outer peripheral surface of the drum 1. A drive motor 4 rotates/drives the drum 1 through belt drive means 3. Alternatively, suction means or the like may hold the printing plate P in place of or along with the clamp members 5 and 6. An encoder 7 is supported on a rotary shaft of the drum 1 opposite the drive motor 4. The encoder 7 outputs an origin signal os indicating that the rotational position of the drum 1 is the origin position and an encoder pulse signal ep synchronous with rotation of the drum 1.

The first and second recording heads 10 and 20 are now described with reference to FIGS. 1 and 2. FIG. 2 is a schematic left side elevational view of the image recording system shown in FIG. 1.

Both of the first and second recording heads 10 and 20 are placed on common guide rails 12. The guide rails 12 extend in parallel with the axis of the drum 1. The first and second recording heads 10 and 20 are in threaded engagement with ball screws 11 and 21 respectively, and are moved along the axial direction of the drum 1 by the rotation of the ball screws 11 and 21. Therefore, the first and second recording heads 10 and 20 can move on a common moving path. Since the ball screws 11 and 21 are vertically arranged, FIG. 1 illustrates only the upper ball screw (the ball screw 21 for driving the second recording head 20).

Screw support means 23 rotatably supports both ends of the ball screw 11 for driving the first recording head 10, and a drive motor 15 rotates/drives the ball screw 11 through belt drive means 14. The drive motor 15 is driven in synchronization with a pulse signal ps1 obtained by dividing the encoder pulse signal ep output from the encoder 7 (as described later in detail).

The screw support means 23 rotatably supports both ends of the ball screw 21 for driving the second recording head 20, and a drive motor 25 rotates/drives the ball screw 21 through belt drive means 24.

The drive motor 25 is driven in synchronization with a pulse signal ps2 obtained by dividing the encoder pulse signal ep output from the encoder 7 (as described later in detail).

As shown in FIG. 2, a recess is formed in the upper surface of the first recording head 10 so that the ball screw 21 for the second recording head 20 and the first recording head 10 do not interfere with each other. The drive motors 15 and 25 are drivable independently of each other, whereby the first and second recording heads 10 and 20 are movable in a subscanning direction independently of each other.

According to this embodiment, the first and second recording heads 10 and 20 are constructed to horizontally move flush with the axis of the drum 1. Therefore, the first and second recording heads 10 and 20 scan substantially identical circumferential positions in relation to the drum 1.

Each of the first and second recording heads 10 and 20 is a multi-beam head having beam emission means BE capable of simultaneously emitting a plurality of light beams and arranged substantially along the axial direction of the drum 1. The beam emission means BE employs a beam array having linearly arranged light-emitting devices such as LEDs or semiconductor lasers, and each light-emitting device is individually emission-controlled on the basis of image data. Therefore, each of the recording heads 10 and 20 can record an image for the width of the array of the number of the beams as the drum 1 performs the main scanning rotation. Assuming that each of the first and second recording heads 10 and 20 has beams of 64 channels, for example, the image recording system according to this embodiment can simultaneously perform recording for the width of 128 channels during the single rotation by translating the recording heads 10 and 20.

The control means 8 is a computer system connected with the respective parts of the image recording system, and functions to control the overall system according to a prescribed program. The control means 8 is connected with a network 60 such as a local network such as a LAN (local area network) or a wide-area network such as the Internet, and supplied with image data. According to this embodiment, the recording heads 10 and 20 perform image recording while carrying out a correction responsive to the scanning positions thereof.

Figure 3:
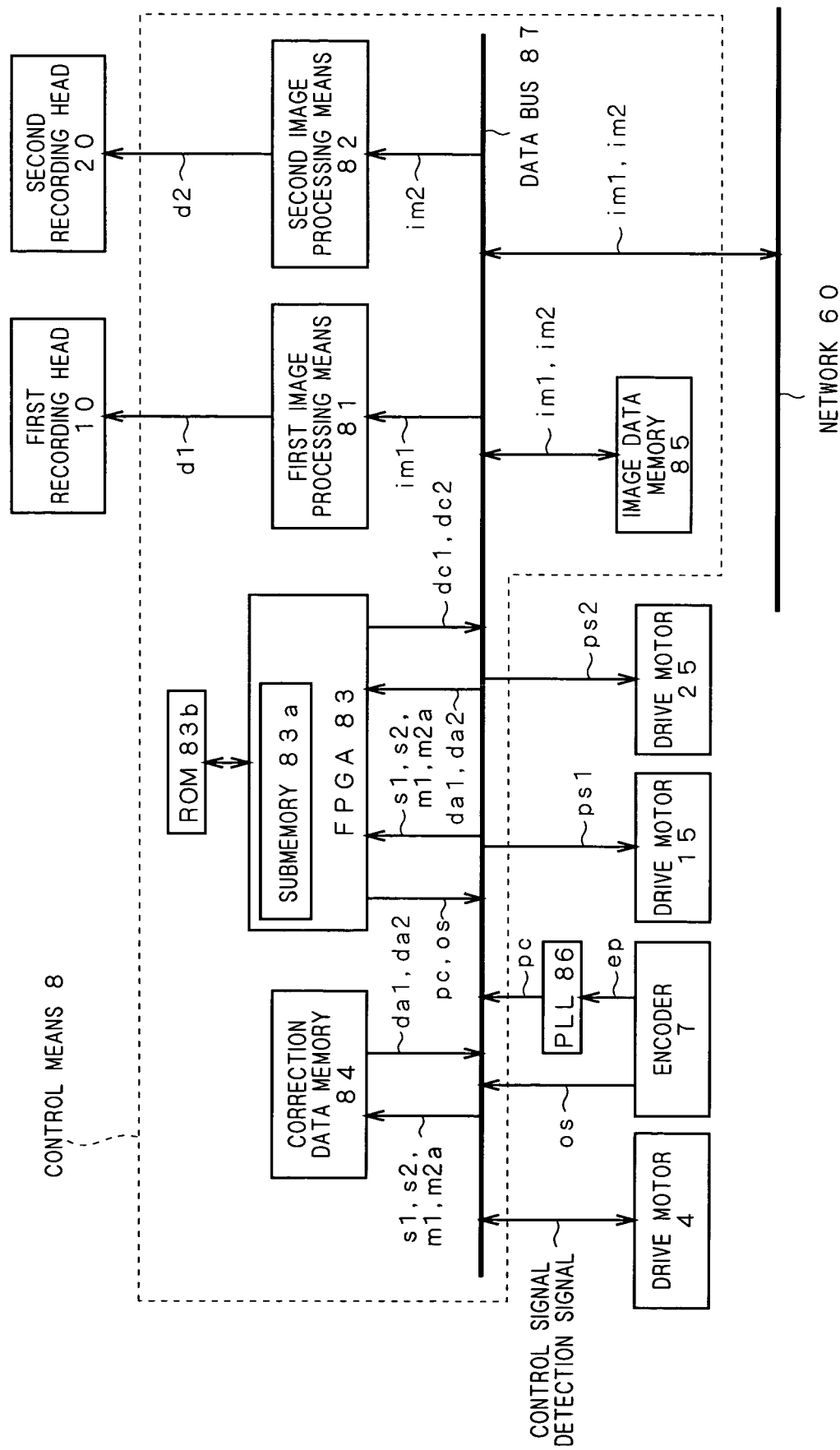
FIG. 3 is a block diagram illustrating the hardware structure of control means of the image recording system according to the first embodiment.

FIG. 3 shows the hardware structure of the control means 8 of the image recording system. The control means 8 has first and second image processing means 81 and 82 for supplying drawing signals d1 and d2 to the first and second recording heads 10 and 20 respectively, an FPGA (field programmable gate array) 83 in which a circuit for performing image correction described later is programmed, a ROM 83b for storing data for reprogramming the FPGA 83, a correction data memory 84 for supplying correction data da1 and da2 to the FPGA 83, an image data memory 85 for storing image data im1 and im2 externally supplied through the network 60 or the like, a PLL (phase-locked loop) circuit 86 for generating a PLL clock pc by multiplying the encoder pulse signal ep output from the encoder 7 in a multiplication ratio responsive to recording resolution, and a data bus 87 interconnecting the aforementioned respective hardware elements with each other.

The FPGA 83 is a semiconductor chip having a circuit structure changeable by reprogramming. Therefore, the function of the control means 8 can be changed by reprogramming the FPGA 83. Data for reprogramming is previously written in the ROM 83b coupled to the FPGA 83.

While the circuit structure of the FPGA 83 is rewritable depending on the purpose such as general image recording, test pattern recording, initial regulation or the like in this image recording system, the following description is made on the assumption that the FPGA 83 has a circuit structure for performing general image recording.

The FPGA 83 contains a submemory 83a. The submemory 83a, although employed for various purposes, is particularly employed herein for the purpose of temporarily storing the correction data output from the correction data memory 84. This submemory 83a may have storage capacity which is not less than the quantity of data required by a single recording head during single rotation of the drum 1.

Figure 4:
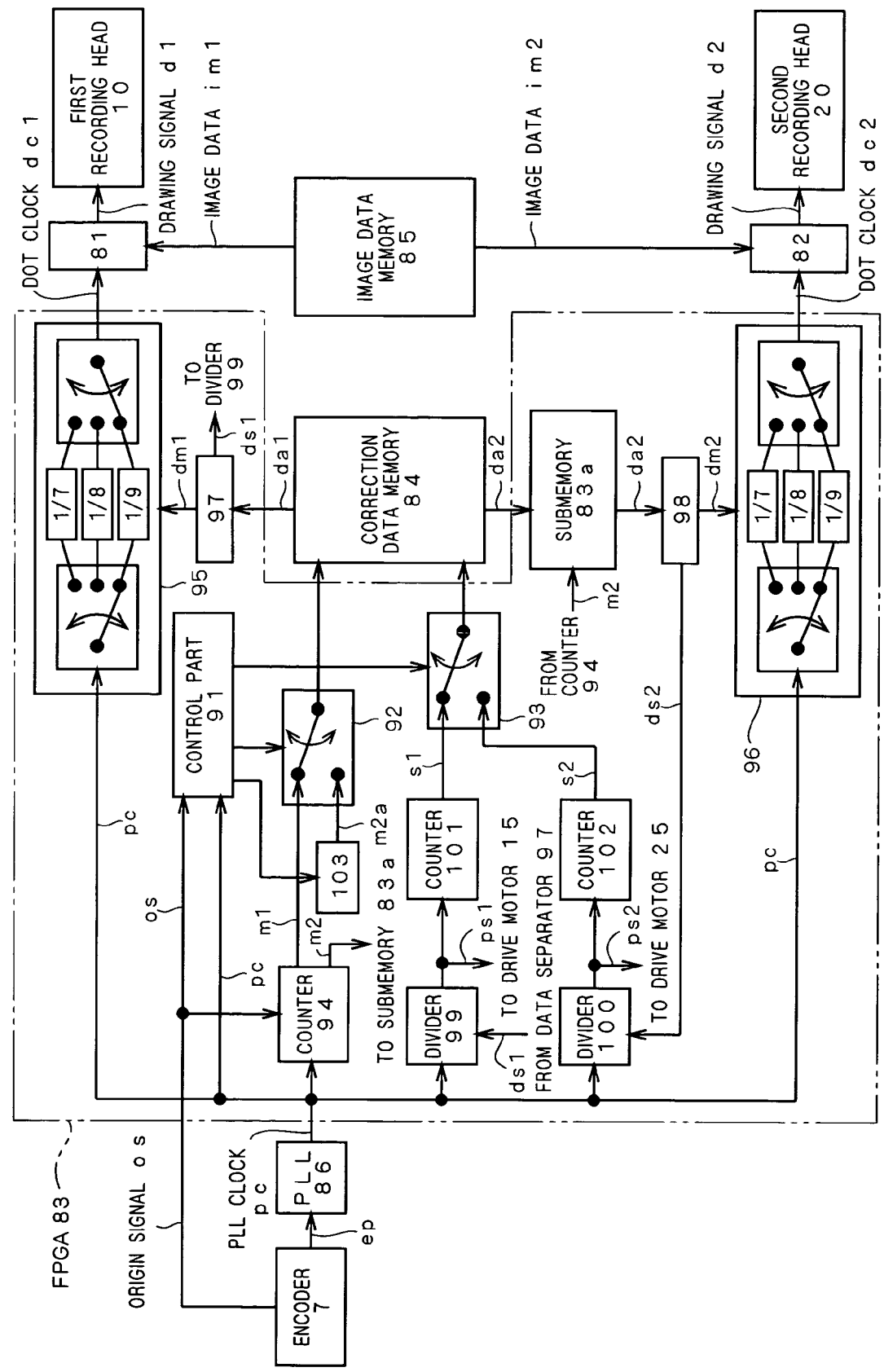
FIG. 4 is a functional block diagram of the control means of the image recording system according to the first embodiment.

FIG. 4 is a functional block diagram showing the circuit structure of the FPGA 83 during the general image recording. Referring to FIG. 4, the FPGA 83 implements elements enclosed with two-dot chain lines. In other words, these elements are a control part 91, switches 92 and 93, a counter 94, dot length regulators 95 and 96, data separators 97 and 98, dividers 99 and 100, counters 101 and 102 and an address generator 103.

As shown in FIG. 4, the FPGA 83 outputs dot clocks dc1 and dc2 defining dot forming periods by the first and second recording heads 10 and 20 from the origin signal os received from the encoder 7 and the PLL clock pc received from the PLL circuit 86. Further, the FPGA 83 outputs the pulse signals ps1 and ps2 corrected in response to respective subscanning positions of the recording heads 10 and 20. As described above, the drive motors 15 and 25 are rotated/driven in synchronization with the pulse signals ps1 and ps2.

The dot clocks dc1 and dc2 output from the FPGA 83 are input in the first and second image processing means 81 and 82 respectively. The first and second image processing means 81 and 82 generate the drawing signals d1 and d2 in synchronism with the dot clocks dc1 and dc2 respectively on the basis of the image data im1 and im2 transmitted from the image data memory 85.

The dot length regulators 95 and 96 are means for dividing the PLL clock pc at a prescribed dividing ratio thereby generating the dot clocks dc1 and dc2. The dividing ratio in the dot length regulators 95 and 96 is any of "1/7", "1/8" and "1/9". The lengths of the dot clocks dc1 and dc2 can be changed by applying any of these dividing ratios thereby changing the main scanning direction length of a single dot recorded on a printing plate by the first and second recording heads 10 and 20.

FIG. 11 illustrates the relation between the dot clocks dc1 and dc2 and the PLL clock pc. A general dividing ratio is 1/8, in which case a single dot clock is output each time eight pulses of the PLL clock pc are output (reference time interval) as shown in FIG. 11(a), and a single dot is drawn on the basis of the dot clock.

When the dividing ratio is set at 1/7, a single dot clock is output each time seven pulses of the PLL clock pc are output, as shown in FIG. 11(b). Consequently, the time interval for dot clock generation is shorter by one pulse of the PLL clock pc than the reference time interval, whereby the length of dots along the main scanning direction is reduced. When the dividing ratio is set at 1/9, a single dot clock is output each time nine pulses of the PLL clock pc are output as shown in FIG. 11(c). The time interval for dot clock generation is longer by one pulse of the PLL clock pc than the reference time interval, whereby the length of the dots along the main scanning direction is increased.

The dividing ratio is set in response to dot regulation data dm1 and dm2 included in the correction data da1 and da2 output from the correction data memory 84.

The counter 94 outputs a first main scanning position signal m1 indicating the main scanning position of the first recording head 10 and a second main scanning position signal m2 indicating the main scanning position of the second recording head 20 on the basis of the PLL clock pc and the origin signal os. The counter 94 grasps the main scanning positions of the respective recording heads 10 and 20 from the number of PLL clocks after the emission of the origin signal os. When the heights of the recording heads 10 and 20 are different from each other, the first and second main scanning position signals m1 and m2 are also different from each other. The first main scanning position signal m1 is output to the switch 92. The second main scanning position signal m2 is output to the submemory 83a.

The address generator 103 is means for outputting a plurality of main scanning positions for single rotation of the drum 1 as a main scanning position signal m2a at a high speed in response to an instruction from the control part 91.

The first main scanning position signal m1 from the counter 94 and the main scanning position signal m2a from the address generator 103 are output to the switch 92. The switch 92 outputs one of the input signals to the correction data memory 84 according to a switch signal from the control part 91. While the first scanning position signal m1 is output to the correction data memory 84 at a frequency synchronous with rotation of the drum 1, the main scanning position signal m2a from the address generator 103 is output to the correction data memory 84 at a high frequency. The details are described later.

The dividers 99 and 100 having variable dividing ratios divide the PLL clock pc output from the PLL circuit 86 at a dividing ratio responsive to subscanning feed regulation data ds1 and ds2 to generate the pulse signals ps1 and ps2.

The counters 101 and 102 count the pulse signals ps1 and ps2 and output subscanning position signals s1 and s2 indicating subscanning positions of the respective recording heads 10 and 20. The first subscanning position signal s1 indicating the subscanning position of the first recording head 10 and the second subscanning position signal s2 indicating the subscanning position of the second recording head 20 are output to the switch 93. The switch 93 outputs one of the input signals to the data memory 84 according to a switch signal from the control part 91.

The correction data memory 84 employs the received main scanning position signal m1 or m2a and the received subscanning position signal s1 or s2 as read addresses and outputs correction data da stored in a cell corresponding to a divided area (to be described later) on the surface of the drum 1 including scanning coordinates indicated by these position signals.

The control part 91 receives the origin signal os and the PLL clock pc. The control part 91 outputs the switch signals to the switches 92 and 93 in response to the scanning positions of the respective recording heads 10 and 20 determined from these signals. In other words, the control part 91 controls the switches 92 and 93 to output the first subscanning position signal s1 and the first main scanning position signal m1 to the correction data memory 84 while the first recording head 10 scans a recordable area (to be described later). Similarly, the control part 91 controls the switches 92 and 93 to output the second subscanning position signal s2 and the main scanning position signal m2a generated from the address generator 103 to the correction data memory 84 while the first and second recording heads 10 and 20 scan recording inhibition areas (to be described later).

The drawing signals d1 and d2 are transmitted to the first and second recording heads 10 and 20 to cause light-emitting devices of the first and second recording heads 10 and 20 to emit light.

Correction in this image recording system is now described. This image recording system can simultaneously perform correction related to the main scanning direction and correction related to the subscanning direction on the respective recording heads 10 and 20. Description will be given first on the details of the correction related to the main scanning direction, and then on the details of the correction related to the subscanning direction.

The drum 1, which is designed and manufactured to have a longitudinally uniform external dimension, may not be so manufactured due to an error. For example, the peripheral surface of the drum is not an exactly circumferential surface but barreled (with an axial intermediate portion larger in diameter than an end portion) or waisted (with an axial intermediate portion smaller in diameter than an end portion), in some cases.

Figure 5:
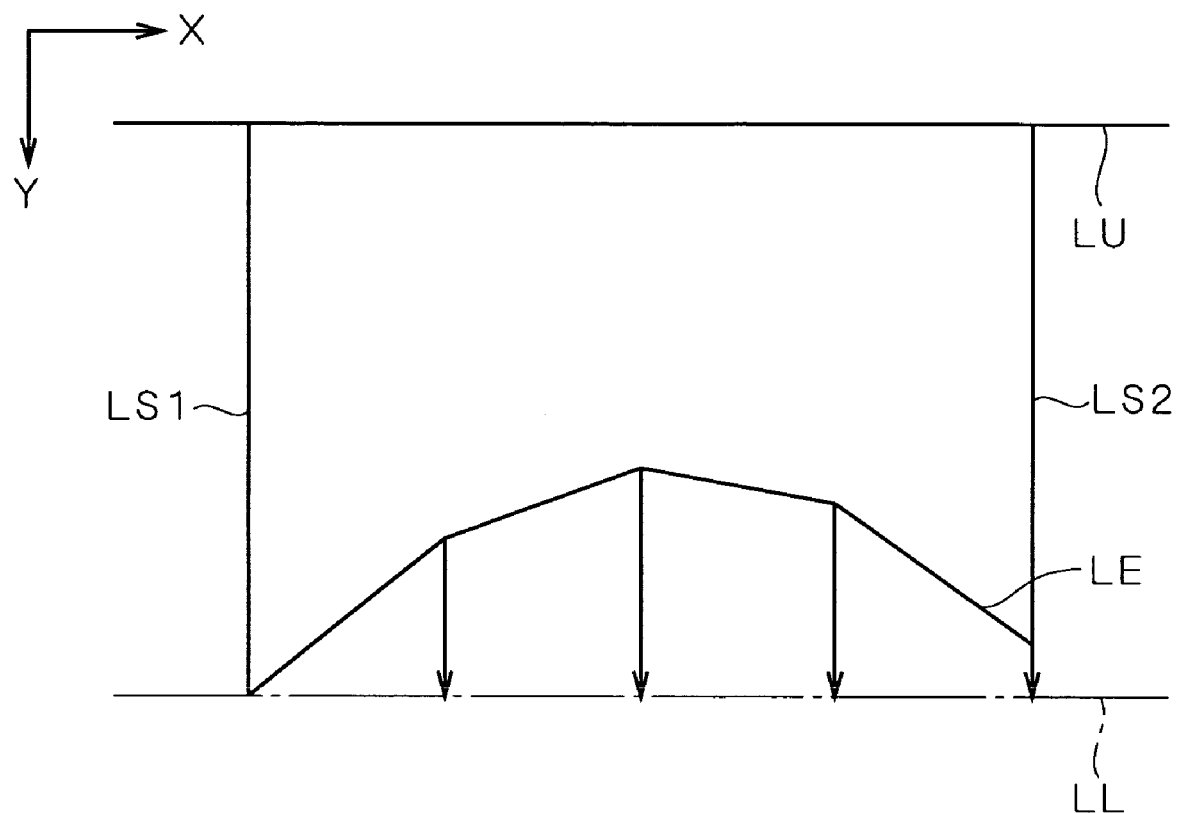
FIG. 5 illustrates image distortion correction in the image recording system according to the first embodiment.
Figure 12:
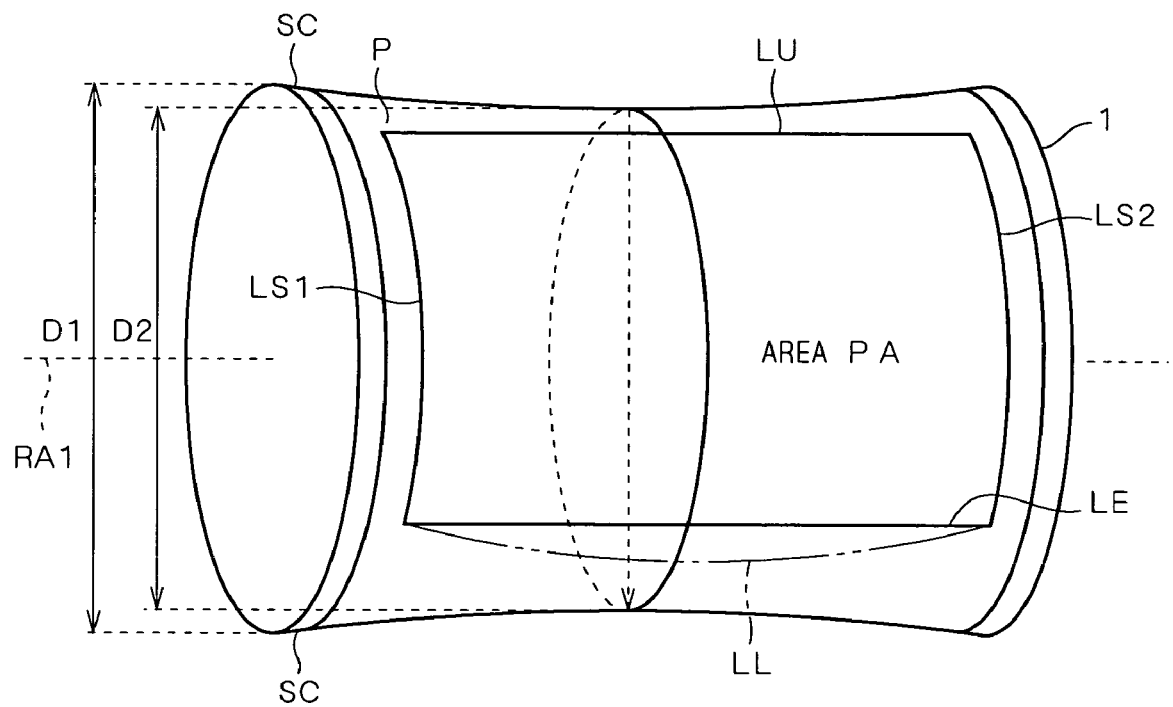
FIG. 12 illustrates image distortion correction in the image recording system according to the first embodiment.

Description is now made on such a case that the drum 1 has a waisted shape as an exemplary case where an image recorded on the printing plate P is distorted. FIG. 12 is a view for illustrating an image recorded on the printing plate P held on the drum 1 when the outer peripheral surface of the drum 1 is not an exactly cylindrical surface but waisted. FIG. 5 shows that an image recording area PA (area enclosed by line segments LU, LS1, LE and LS2) of the printing plate P held on the drum 1 as shown in FIG. 12 is developed on an X-Y plane. As shown in FIG. 12, because the outer peripheral surface SC of the drum 1 is not an exactly cylindrical surface but waisted, the diameter D2 around an intermediate portion along the rotation axis RA1 is smaller than the diameter D1 around an end along the rotation axis RA1. When the drum 1 is rotated for drawing a rectangular image on the image recording area PA of the printing plate P and this image recording area PA is developed on the X-Y plane in this case, the image recording area PA is shrunk around an intermediate portion along the X-axis in the recorded image as shown in FIG. 5. This is because the main scanning rate on the surface of the printing plate P is relatively slow around the intermediate portion along the rotation axis RA1 having the small diameter of the drum 1 and hence the main scanning direction length of dots is reduced.

In order to eliminate such distortion of the image, the main scanning line around the center along the X-axis may be extended so that a drawing end position LE of each main scanning line is aligned with a lower end reference line LL in parallel with an upper reference straight line LU, as shown in FIG. 5. Thus, the rectangular image enclosed with the line segments LU, LS1, LL and LS2 is obtained as shown in FIG. 5. In other words, distortion of the image resulting from distortion of the drum 1 can be corrected by individually setting the expansion/contraction ratio of the main scanning lines.

Correction in the subscanning direction is now described. As hereinabove described, the first and second recording heads 10 and 20 are placed on the common guide rails 12. While the guide rails 12 are manufactured to guide the recording heads at a uniform rate, parallelism between the drum and the guide rails may be distorted to result in non-uniform subscanning positions of the recording heads 10 and 20 when the guide rails 12 are elongated.

This image recording system regulates the dividing ratios of the dividers 99 and 100 for generating the pulse signals ps1 and ps2 defining the rotational speeds of the drive motors 15 and 25 in response to subscanning positions thereby controlling the subscanning positions of the first and second recording heads 10 and 20 to be uniform. The dividing ratios are regulated in response to the subscanning feed regulation data ds. The recording heads 10 and 20 share the subscanning feed regulation data ds.

Figure 6:
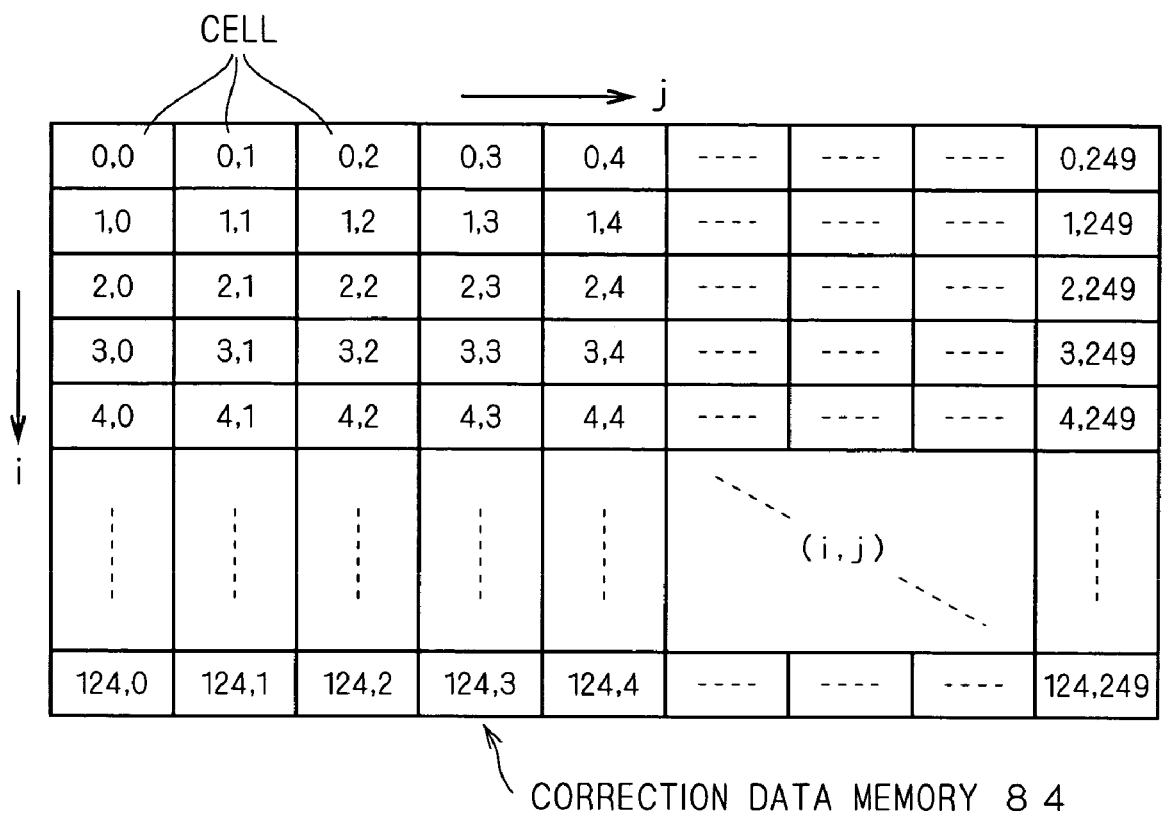
FIG. 6 illustrates the structure of a correction data memory employed for the image recording system according to the first embodiment.

This image recording system applies the correction data to each divided area obtained by dividing the surface of the drum 1 into 125 along the main scanning direction and into 250 along the subscanning direction. FIG. 6 illustrates storage contents of the correction data memory 84. As shown in FIG. 6, a memory space of the correction data memory 84 consists of a plurality of cells. The directions of the memory space corresponding to the main scanning direction and the subscanning direction are regarded as i and j axes respectively, so that each cell of the correction data memory 84 can be uniquely specified by a pair of values (i,j). The cells correspond to the aforementioned divided areas, respectively. The cells store correction data da applied to the respective divided area. The correction data da stored in each cell includes dot regulation data dm for making dot intervals uniform in the main scanning lines and subscanning feed regulation data ds for making the subscanning positions of the recording heads uniform. The first and second recording heads 10 and 20 employ the dot regulation data dm and the subscanning feed regulation data ds in common. The data separators 97 and 98 (to be described later) separate the correction data da1 and da2 read for the first and second recording heads 10 and 20 respectively into the dot regulation data dm1 and dm2 and the subscanning feed regulation data ds1 and ds2, the former being output to the dot length regulators 95 and 96 and the latter being output to the dividers 99 and 100.

Figure 13:
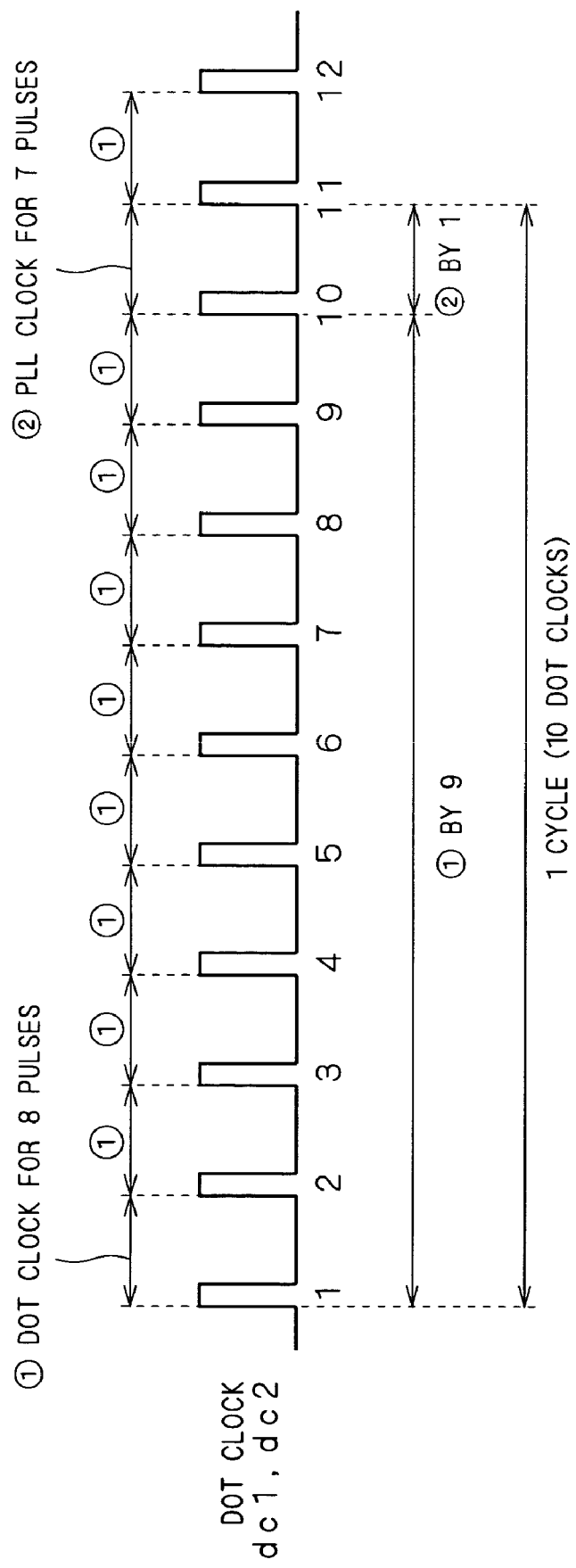
FIG. 13 illustrates exemplary dot interval correction of a main scanning line by dot regulation data in the first embodiment.

The dot regulation data dm1 and dm2 define application proportions of the dividing ratios "1/7", "1/8" and "1/9" to be applied to the dot length regulators 95 and 96 when drawing the divided area corresponding to each cell. In other words, each cell stores values such as "dividing ratio 1/7: 10%, dividing ratio 1/8: 90%, dividing ratio 1/9: 0%" as dot regulation data. FIG. 13 illustrates exemplary dot clocks dc1 and dc2 generated in response to the dot regulation data dm1 and dm2. When dot regulation data for a certain divided area are set as "dividing ratio 1/7: 10%, dividing ratio 1/8: 90%, dividing ratio 1/9: 0%", nine first dot clocks ① are output in succession and a single second dot clock ② is thereafter output, as shown in FIG. 13. Among these dot clocks, one first dot clock ① is generated each time eight pulses of the PLL clock pc are output, and one second dot clock ② is generated each time seven pulses of the PLL clock pc are output. The dot clocks are generated in this divided area, with a set of such ten dot clocks defined as one cycle.

Thus, the dot length regulators 95 and 96 can change average times of the generated dot clocks dc1 and dc2 per clock by switching the dividing ratios for the PLL clock pc received in the means 95 and 96 on the basis of the application proportions of the dividing ratios specified by the dot regulation data dm1 and dm2 stored in the correction data, whereby the length of the image along the main scanning direction can be expanded/contracted.

This image recording system has two recording heads 10 and 20. These recording heads 10 and 20 may share the correction data (the dot regulation data dm) for performing correction along the main scanning direction since the aforementioned dot regulation data dm are employed for compensating for distortion of the drum 1 shared by the recording heads 10 and 20. Similarly, the recording heads 10 and 20 may also share the correction data (the subscanning feed regulation data ds) for performing correction along the subscanning direction, since the aforementioned subscanning feed regulation data ds are employed for compensating for uneven feed resulting from the guide rails 12 shared by the recording heads 10 and 20.

Thus, since the recording heads 10 and 20 share the correction data, it is not necessary to prepare memories the number of which corresponds to the number of recording heads. In other words, only a single memory may store the correction data. If timings for accessing the memory for reading the correction data overlap with each other, however, the correction data cannot be excellently read. In this sense, it is desirable to prepare as many correction data memories as the recording heads. In this case, however, there arises another problem that unnecessary resources must be employed due to provision of the plurality of memories although the single memory may be sufficient. Further, there may be cases where the performance of the CPU is temporarily lowered because of the calculation of the correction data to be stored in the memories.

According to the present invention, the aforementioned two contradictory problems are solved by employing the following method:

FIG. 7 illustrates the surface of the drum 1 in a two-dimensionally developed manner. As hereinabove described, the pair of clamp members 5 and 6 are arranged on the surface of the drum 1 for fixing the printing plate P. In the surface of the drum 1 provided with the printing plate P, image recording can be performed on an area not pressed by the pair of clamp members 5 and 6. This area is referred to as a recordable area. A period during which this area is scanned by the recording heads 10 and 20 is referred to as a recordable period.

No image recording can be performed on the surface area of the drum 1 other than the aforementioned recordable area. This area allowing no image recording is referred to as a recording inhibition area, and a period during which this area is scanned by the recording heads 10 and 20 is referred to as a recording inhibition period.

FIG. 8 is a timing chart for illustrating correction processing in this image recording system.

The origin signal os is shown on the uppermost stage, and one pulse of the origin signal os is generated each time the drum 1 makes one rotation. The second stage shows the timing for 1/125 rotation of the drum 1. The third and fourth stages show the timings for the recording inhibition periods of the first and second recording heads 10 and 20 respectively. The fifth and sixth stages "output from correction data memory 84" and "output from submemory 83*a*" show the types of the correction data da output from the memories 84 and 83*a* respectively.

The correction processing of the image recording system is sequentially described with reference to FIGS. 4 and 8. In this image recording system, the main scanning positions of the first and second recording heads 10 and 20 are not completely coincident with each other. In other words, the first recording head 10 scans a circumferential position slightly ahead of that of the second recording head 20 as the main scanning position.

During the time interval between the instant (t0) when the rotational position of the drum 1 reaches a drum origin and the instant (t1) when the first recording head 10 reaches the recording inhibition area, the control part 91 controls the switches 92 and 93 to supply the first main scanning position signal m1 and the first subscanning position signal s1 to the correction data memory 84. The correction data memory 84 outputs the correction data da1 stored in the cell corresponding to the scanning position of the first recording head 10 to the data separator 97. The data separator 97 separates the correction data da1 into the dot regulation data dm1 and the subscanning feed regulation data ds1 to output the former to the dot length regulator 95 while outputting the latter to the divider 99. The dot length regulator 95 transmits the dot clock dc1 properly corrected on the basis of the dot regulation data dm1 to the first image processing means 81. The divider 99 outputs the pulse signal ps1 properly corrected in response to the subscanning feed regulation data ds1 to the drive motor 15.

During the time interval between t0 and t1, the correction data da2 for the second recording head 20 is read from the submemory 83a.

When the first recording head 10 reaches the recording inhibition area and the second recording head 20 also reaches the recording inhibition area (at t2), the control part 91 controls the switches 92 and 93 to transmit the main scanning position signal m2a from the address generator 103 and the second subscanning position signal s2 from the counter 102 to the correction data memory 84. The address generator 103 outputs the correction data da2 for one line corresponding to the scanning position of the second recording head 20 at t2 to the submemory 83a at a high frequency (a frequency high enough to allow the output of the one line of the correction data da2 before t3 when the first recording head 10 reaches the recordable area).

When the first recording head 10 reaches the recordable area (at t3), the control part 91 controls the switches 92 and 93 to transmit the first main scanning position signal m1 and the first subscanning position signal s1 to the correction data memory 84. Thus, the correction data memory 84 sequentially transmits the correction data da1 to the data separator 97.

When the second recording head 20 reaches the recordable area (at t4), the submemory 83a transmits the correction data da2 to the data separator 98 with reference to the sequentially received second main scanning position signal m2. The correction data da2 is separated into the dot regulation data dm2 and the subscanning feed regulation data ds2, the former being output to the dot length regulator 96 and the latter to the divider 100. The dot length regulator 96 divides the PLL clock pc on the basis of the dot regulation data dm2 to generate the dot clock dc2. The divider 100 outputs the pulse signal ps2 properly corrected in response to the subscanning feed regulation data ds2 to the drive motor 25.

Until the time t0 (the time t0 shown on the right side of FIG. 8) when the rotational position of the drum 1 reaches the origin position again and the encoder 7 transmits the origin signal os to the control part 91, the correction data da1 and da2 are parallelly output to the corresponding data separators 97 and 98, the dot clocks dc1 and dc2 are parallelly transmitted to the respective image processing means 81 and 82, and the pulse signals ps1 and ps2 are parallelly transmitted to the respective drive motors 15 and 25. Thus, the first and second recording heads 10 and 20 parallelly perform image recording. Further, no overlap occurs between accesses to the correction data memory 84 during this time interval. If the image recording system has a circuit structure which causes an overlap between the accesses to the correction data memory 84, an access timing regulation mechanism is additionally required for saving one of the overlapping accesses with respect to the other one or making the same wait for a slight period, leading to a complicated circuit structure. Unlike this, the first embodiment causes no overlap between the accesses to the correction data memory 84, thereby eliminating such complicated circuit arrangement. In other words, the image recording system can effectively supply the read addresses to the correction data memory 84 by means of a relatively simple circuit structure. Further, the image recording system need not hold a plurality of correction data memories 84 to produce the effect of saving resources.

Second Embodiment

According to the first embodiment, the image recording system can read the correction data da to the submemory 83a only while both of the first and second recording heads 10 and 20 scan the corresponding recording inhibition areas. This is because the first and second recording heads 10 and 20 scan substantially identical circumferential positions of the drum and hence there is a large overlap between the recording inhibition areas. If the circumferential spacing between the scanning positions of the recording heads is widened or a large number of recording heads are employed, however, the overlap between the recording inhibition areas may conceivably be reduced (or eliminated as the case may be).

In this case, two submemories 83a may be prepared for each recording head for alternately writing and reading the correction data da. Thus, the correction data da can be read from the correction data memory 84 at arbitrary timing. In other words, the submemories 83a can acquire the correction data da also during the recordable period of the second recording head 20.

An image recording system according to a second embodiment of the present invention comprises three recording heads (first, second and third recording heads 210, 220 and 230). The recording heads 210, 220 and 230 are placed on common guide rails 12 similarly to those in the image recording system according to the first embodiment described above with reference to FIGS. 1 and 2, can individually perform subscanning feeding by individually prepared feeding mechanisms, and emit light beams to the common drum 1. It is assumed that circumferential spacing between scanning positions of the recording heads 210, 220 and 230 are so large that there is no overlap between the recording inhibition areas in the second embodiment.

FIG. 9 is a diagram for illustrating control processing in the image recording system according to the second embodiment.

This image recording system has a correction data memory 200 storing the correction data da including the dot regulation data dm and the subscanning feed regulation data ds identical to those described with reference to the first embodiment.

The correction data memory 200 is read using main scanning position signals m1, m2 and m3 from a switch 203 and subscanning position signals s1, s2 and s3 from a switch 204 as addresses. First, second and third main scanning position generation means 215, 225 and 235 supply the main scanning position signals m1, m2 and m3 indicating main scanning positions of the first, second and third recording heads 210, 220 and 230 respectively. The first main scanning position generation means 215 is means implemented by the encoder 7, the PLL circuit 86, the counter 94 and the like described with reference to the first embodiment.

The main scanning position generation means 225 and 235 for the second and third recording heads 220 and 230 are means corresponding to the address generator 103 according to the first embodiment.

First, second and third subscanning position generation means 216, 226 and 236 supply the subscanning position signals s1, s2 and s3 indicating subscanning positions of the first, second and third recording heads 210, 220 and 230 respectively. Each of the first, second and third subscanning position generation means 216, 226 and 236 is means implemented by the encoder 7, the PLL circuit 86, the dividers 99 and 100, the counters 101 and 102 and the like described with reference to the first embodiment.

The switch 203 selects one of the main scanning position signals m1, m2 and m3 supplied from the aforementioned main scanning position generation means 215, 225 and 235 in response to a switch signal supplied from a control part 205 to output the selected signal to the correction data memory 200.

The switch 204 selects one of the subscanning position signals s1, s2 and s3 supplied from the aforementioned subscanning position generation means 216, 226 and 236 in response to a switch signal supplied from the control part 205 to output the selected signal to the correction data memory 200.

The switch 202 selects and outputs correction data da output from the correction data memory 200 to first recording head correction means 217 (to be described later) or either one of switches 221 and 231 (to be described later) in response to a switch signal supplied from the control part 205.

The control part 205 is means corresponding to the control part 91 in the first embodiment, and outputs the switch signals in response to the angular position of the drum 1. The switch timing is described later.

The first recording head correction means 217 corrects a main scanning position of the light beam emitted from the first recording head 210 and a subscanning position of the first recording head 210. The first recording head correction means 217 is means corresponding to the dot length regulator 95 and the divider 99 described with reference to the first embodiment, and corrects dot generation timing and the subscanning feeding of the first recording head 210 according to correction data da1 supplied from the correction data memory 200.

Second recording head correction means 227 corrects a main scanning position of the light beam emitted from the second recording head 220 and a subscanning position of the second recording head 220. The second recording head correction means 227 is means corresponding to the dot length regulator 95 and the divider 99 described with reference to the first embodiment, and corrects dot generation timing and the subscanning feeding of the second recording head 220 according to correction data da2 supplied from the correction data memory 200.

Third recording head correction means 237 corrects a main scanning position of the light beam emitted from the third recording head 230 and a subscanning position of the third recording head 230. The third recording head correction means 237 is means corresponding to the dot length regulator 95 and the divider 99 described with reference to the first embodiment, and corrects dot generation timing and the subscanning feeding of the third recording head 230 according to correction data da3 supplied from the correction data memory 200.

A pair of submemories 222a and 222b are prepared in relation to the second recording head 220. In a hardware structure, the pair of submemories 222a and 222b are incorporated in an FPGA, for example, and employed for the purpose of temporarily storing the correction data da2 read from the correction data memory 200 similarly to the submemory 83a described with reference to the first embodiment. The pair of submemories 222a and 222b are employed as toggle memories. In other words, the switch 221 selects a data write memory and the switch 223 selects a data read memory. A second control part 224 controls the switching operation for the switches 221 and 223. The second control part 224 alternates the operations of the submemories 222a and 222b each time the second recording head 220 reaches a recording inhibition area. The switch timing is described later.

A pair of submemories 232a and 232b are prepared also in relation to the third recording head 230. In a hardware structure, the pair of submemories 232a and 232b are incorporated in the FPGA, for example, and employed for the purpose of temporarily storing the correction data da3 read from the correction data memory 200 similarly to the submemory 83a described with reference to the first embodiment. The pair of submemories 232a and 232b are employed as toggle memories. In other words, the switch 231 selects a data write memory and the switch 233 selects a data read memory. A third control part 234 controls the switching operation for the switches 231 and 233. The third control part 234 alternates the operations of the submemories 232a and 232b each time the third recording head 230 reaches a recording inhibition area. The switch timing is described later.

FIG. 10 is a timing chart for illustrating correction processing in this image recording system. The terms "recording inhibition area", "recordable area", "recording inhibition period" and "recordable period" defined with reference to the first embodiment are employed in similar senses in the following description.

The time axis on the uppermost stage indicates the timing for generating the origin signal os. One pulse of the origin signal os is generated each time the drum 1 makes one rotation. The second stage indicates the timing of $\frac{1}{125}$ rotation of the drum 1. The time axes on the third to fifth stages indicate the recording inhibition periods for the first, second and third recording heads 210, 220 and 230 respectively. The sixth stage "output from correction data memory 200" indicates the type of the correction data da read from the memory 200. The seventh and eighth stages "write destination for correction data da2" and "write destination for correction data da3" indicate write destinations and write timings for the correction data da2 and da3 respectively. The ninth and tenth stages "read source for correction data da2" and "read source for correction data da3" indicate submemories serving as read sources and read timings for the correction data da2 and da3 respectively.

The correction processes of the image recording system according to the second embodiment will be sequentially described with reference to FIGS. 9 and 10.

During the time interval between the instant (t0) when the rotational position of the drum 1 reaches the drum origin and the instant (t1) when the first recording head 210 reaches the recording inhibition area, the control part 205 controls the switches 203 and 204 to supply the first main scanning position signal m1 and the first subscanning position signal s1 to the correction data memory 200. The control part 205 also controls the switch 202 to transmit the correction data da1 read from the correction data memory 200 to the first recording head correction means 217. The correction data memory 200 supplies the correction data da1 stored in a cell corresponding to the scanning position of the first recording head 210 to the switch 202. The correction data da1 read from the correction data memory 200 is transmitted to the first recording head correction means 217, which in turn performs correction related to the main scanning position and the subscanning position of the first recording head 210.

During the time interval between t0 and t1, the correction data da2 and da3 for the second and third recording heads 220 and 230 are read from the read submemories 222b and 232b respectively and supplied to the second and third recording head correction means 227 and 237.

When the first recording head 210 reaches the recording inhibition area (at t1), the control part 205 controls the switches 203 and 204 to supply the second main scanning position signal m2 and the second subscanning position signal s2 to the correction data memory 200. Thus, the correction data da2 for the second recording head 220 is read from the correction data memory 200. This correction data da2 is written into the current write submemory 222a through the switches 202 and 221. The correction data da2 is correction data for single rotation of the drum 1. In other words, this is correction data for 125 cells.

When the aforementioned second correction data da2 is completely read, the control part 205 controls the switches 203 and 204 to supply the third main scanning position signal m3 and the third subscanning position signal s3 to the correction data memory 200 (at t2). Thus, the correction data da3 for the third recording head 230 is read from the correction data memory 200. This correction data da3 is written into the current write submemory 232a through the switches 202 and 231. The correction data da3 is correction data for single rotation of the drum 1. In other words, this is correction data for 125 cells.

Also while the aforementioned correction data da2 and da3 are written into the submemories 222a and 232a, correction data are read from the current read submemories 222b and 232b and supplied to the second and third recording head correction means 227 and 237.

When the first recording head 210 scans a recordable area (at t3), the image recording system starts reading the correction data da1 for the first recording head 210 from the correction data memory 200 again.

When the second recording head 220 scans a recording inhibition area (at t4), the read and write sides of the submemories 222a and 222b are interchanged. In other words, the second control part 224 controls the switches 221 and 223 so that the submemory 222a serving as the write side until the time t4 in turn serves as a read side and the submemory 222b serving as the read side until the time t4 in turn serves as a write side. When the second recording head 220 scans the recordable area (at t5), the correction data da2 is read from the submemory 222a.

When the third recording head 230 scans a recording inhibition area (at t6), the read and write sides of the submemories 232a and 232b are interchanged. In other words, the third control part 234 controls the switches 231 and 233 so that the submemory 232a serving as the write side until the time t6 in turn serves as a read side and the submemory 232b serving as the read side until the time t6 in turn serves as a write side. When the third recording head 230 scans the recordable area (at t7), the correction data da3 is read from the submemory 232a.

When the drum 1 returns to the origin and starts the subsequent rotation (at t8), the aforementioned operation from t0 to t8 is repeated. In the step following the time t8, however, the correction data da2 and da3 are written into the submemories 222b and 232b and read from the submemories 222a and 232a respectively, unlike the aforementioned steps from the times t0 to t8.

Thus, the image recording system according to the second embodiment can parallelly supply the correction data for the respective recording heads to the corresponding correction circuits also when the recording inhibition areas of the plurality of recording heads do not overlap each other.

Third Embodiment

<1. Feed Rate Correction in Subscanning Direction>

The image recording system according to the first embodiment can record different images on two printing plates respectively by fixing the two printing plates on the drum 1 and supplying the different drawing signals d1 and d2 to the recording heads 10 and 20 respectively. Therefore, the image recording system can simultaneously record any two images on two printing plates among images of respective color separations forming a finished color reproduction image.

The term "color separations" refers to printing plates such as a C (cyan) separation, an M (magenta) separation, a Y (yellow) separation and a K (black) separation, for example, for recording images of four color components, which are created by reading a single printing object image with a plurality of CCD line sensors comprising color filters of R, G and B respectively or the like, separating the same into the colors of C, M, Y and K and separately recording the images of the separated colors on a plate. Since the color separations are created by color-separating the same printing object image as hereinabove described, the images recorded on the respective color separations are substantially identical in color component image contour to each other and different only in color strength (e.g., the size of halftone dots) from each other.

The color separations of C, M, Y and K created in the aforementioned manner are employed for printing colors (cyan, magenta, yellow and black) corresponding to the respective color separations on paper in a printing step. Images of the respective colors are superposed with each other for printing a full-color image.

In the step of creating a plurality of color component images having substantially identical contours and corresponding to each other as in the respective color separations, a single printing plate (photosensitive plate) P is fixed to a single portion of the drum 1 of the image recording system for creating the four color separations in the prior art image recording process when described with reference to the image recording system according to the first embodiment of the present invention. In order to make substantially identical the contours of the color component images recorded on the respective color separations with each other along the subscanning direction when the rotation speed of the drum 1 can be held constant, therefore, repetitive reproducibility has become a major problem when the drive motors 15 and 25 move the recording heads 10 and 20 respectively.

When employing two recording heads 10 and 20 arranged parallel to each other for two printing plates P12 and P11 parallelly held on different positions of a drum 1 as shown in FIG. 14 for recording any two of the images separated into C, M, Y and K, however, not only the repetitive reproducibility of movement of the recording heads 10 and 20 but also dispersion of feed rates by ball screws 11 and 21 become problems.

The following is an example of the problems. The first recording head 10 is moved when a drive motor 15 is supplied with a drive pulse. It is assumed that MD1 represents the quantity of movement of the first recording head 10 toward arrow AR1 when a pulse is transmitted to the drive motor 15. If n pulses are transmitted to the drive motor 15 while the first recording head 10 stops on a head position PL1, the first recording head 10 is supposed to move to an operated value PL2 which is a head position away from the head position PL1 by n×MD1, as shown in FIG. 14. However, if there is dispersion of feed rates by the ball screw 11, there is a case in which the first recording head 10 moves to an actually measured value PL3 which is a head position different from aforementioned operated value PL2. That is, the operated value PL2 and the actually measured value PL3 of the first recording head 10 differ from each other.

Next, the quantity MD11 of movement, an operated value PL12 of the head position PL, and an actually measured value PL13 of the head position for the second recording head 20 are defined in a manner similar to MD1, PL2, PL3 defined for the first recording head 10. It is also assumed that the operated value PL12 and the actually measured value PL13 differ from each other.

If both of the first recording head 10 and the second recording head 20 move while being deviated from the predetermined operated values, color component images different in length along the subscanning direction are recorded on the respective printing plates P11 and P12. In this case, the color separation images recorded on the respective printing plates P11 and P12 are deviated in the subscanning direction. If such printing plates P11 and P12 are used to print a full-color image, the contours of color component images in the full-color image may be displaced or unsharpened between the color separations.

A third embodiment of the present invention will be described with reference to correction processing for the feed rates of ball screws performed for making substantially identical the contours of the color component images to be recorded on the two printing plates P11 and P12 fixed to different positions of the drum 1. An image recording system employed in this embodiment has a hardware structure substantially similar to that of the image recording system according to the first embodiment, and hence difference between the first and third embodiments are now described.

<2. Hardware Structure of Image Recording System According to Third Embodiment>

FIG. 15 is a functional block diagram of control means of the image recording system according to the third embodiment. A memory space of a correction data memory 84 in this embodiment is divided into 125 along an i-axis direction corresponding to the main scanning direction and into 250 along a j-axis direction corresponding to the subscanning direction similarly to the first embodiment, and formed by 31250 cells in total (see FIG. 6). Each cell of the memory space stores dot regulation data dm1 for making uniform the dot intervals in main scanning lines of the first recording head 10 described with reference to the first embodiment and the regulation data ds1 for making uniform the subscanning positions of the first recording head 10 as well as feed rate regulation data dr1 (unit: pulse) employed for correcting the feed rate of the ball screw 11 as the correction data da1.

The correction data memory 84 employs the main scanning position signal m1 received from a counter 94 as a read address along the j-axis direction of the memory space while employing the subscanning position signal s1 received from a counter 101 as a read address along the i-axis direction of the memory space thereby specifying each cell of the correction data memory 84, reading the correction data da1 stored in each cell and outputting the same to a data separator 97.

The data separator 97 separates the correction data da1 received from the correction data memory 84 into the dot regulation data dm1, the regulation data ds1 and the feed rate regulation data dr1. The dot regulation data dm1, the regulation data ds1 and the feed rate regulation data dr1 separated by the data separator 97 are output to a dot length regulator 95, a divider 99 and a pulse regulator 104 respectively.

The pulse regulator 104 regulates the pulse signal ps1 received from the divider 99 by using the feed rate regulation data dr1 separated from the correction data da1 in the data separator 97 and received therein, to output a regulated pulse signal ps3 to a drive motor 15.

The feed rate regulation data dr1 is employed for regulating the number of pulses transmitted to the drive motor 15 when the actually measured value DP of the quantity of movement of the first recording head 10 is different from the operated value DC of the quantity of movement of the first recording head 10 obtained in response to the quantity MD1 (unit: mm/pulse) of movement of the first recording head 10 per pulse and the number of pulses due to dispersion of leads of the ball screw 11 in a prescribed range of the subscanning direction. When the actually measured value DP and the operated value DC of the quantity of movement of the recording head 10 geometrically mismatch due to dispersion of the leads of the ball screw 11, the feed rate regulation data dr1 is employed for compensating for this mismatching. When the actually measured value DP of the quantity of movement of the first recording head 10 in a specific subscanning section is greater than the operated value DC in this section, for example, the pulse regulator 104 receives the feed rate regulation data dr1 which causes the number of pulses transmitted to the drive motor 15 in this section to be decreased by a number corresponding to a difference between the aforementioned operated value DC and the actually measured value DP.

When the actually measured value DP and the operated value DC are identical to each other, i.e., when the leads of the ball screw 11 are not dispersed in the prescribed range of the subscanning direction, the pulse regulator 104 need not regulate the number of pulses. When the actually measured value DP and the operated value DC are identical to each other, therefore, the pulse signal ps1 input to the pulse regulator 104 is directly output to the drive motor 15 as the output pulse signal ps3 of the pulse regulator 104.

A correction data memory 84a has a memory space similar to that of the correction data memory 84 shown in FIG. 6. The memory space is divided into 125 in the i-axis direction corresponding to the main scanning direction and into 250 in the j-axis direction corresponding to the subscanning direction. Each cell of the memory space stores the dot regulation data dm2 for making uniform the dot intervals in the main scanning lines of the second recording head 20 described with reference to the first embodiment and the regulation data ds2 for making uniform the subscanning positions of the second recording head 20 as well as feed rate regulation data dr2 (unit: pulse) employed for correcting the feed rate of the ball screw 21 as the correction data da2.

The correction data memory 84a employs the main scanning position signal m2 received from the counter 94 as a read address along the j-axis direction of the memory space while employing the subscanning position signal s2 received from a counter 102 as a read address along the i-axis direction of the memory space thereby specifying each cell of the correction data memory 84a, reading the correction data da2 stored in each cell and outputting the same to a data separator 98.

The data separator 98 separates the correction data da2 received from the correction data memory 84a into the dot regulation data dm2, the regulation data ds2 and the feed rate regulation data dr2. The dot regulation data dm2, the regulation data ds2 and the feed rate regulation data dr2 are output to a dot length regulator 96, a divider 100 and a pulse regulator 105 respectively.

The pulse regulator 105 outputs a regulated pulse signal to the drive motor 25 similarly to the pulse regulator 104. The feed rate regulation data dr2 is employed for regulating the number of pulses transmitted to the drive motor 25 when the operated value and the actually measured value of the quantity of movement of the second recording head 20 are different from each other due to dispersion of leads of the ball screw 21, similarly to the feed rate regulation data dr1. As shown in FIG. 15, the pulse regulator 105 regulates the pulse signal ps2 received from the divider 100 by using the feed rate regulation data dr2 separated from the correction data da2 by the data separator 98 and received therein, to output a regulated pulse signal ps4 to the drive motor 25.

<3. Procedure for Acquiring Feed Rate Regulation Data>

Figure 17:
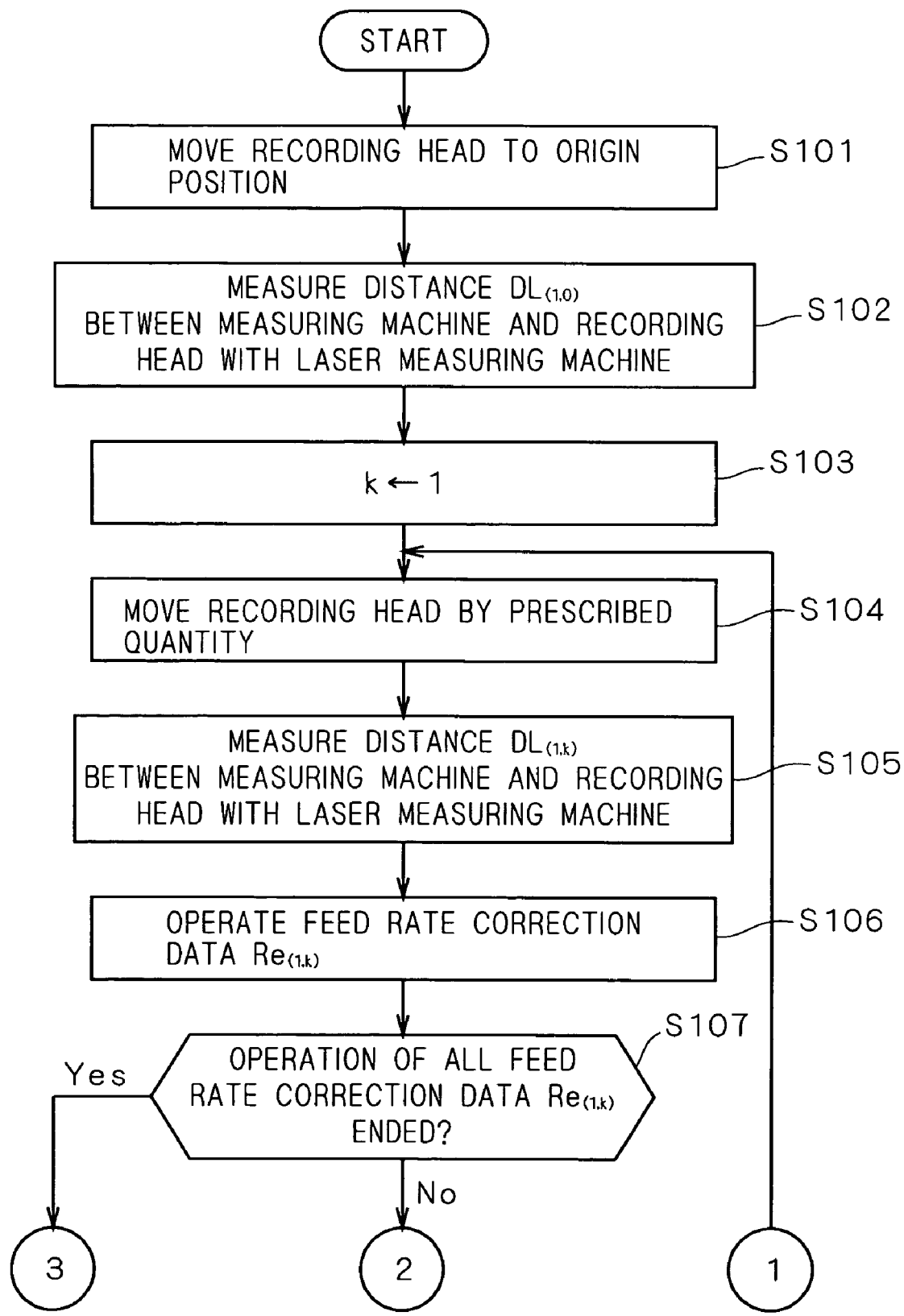
FIG. 17 is a flow chart showing an exemplary measurement procedure for feed rate regulation data of the ball screws in the third embodiment.
Figure 18:
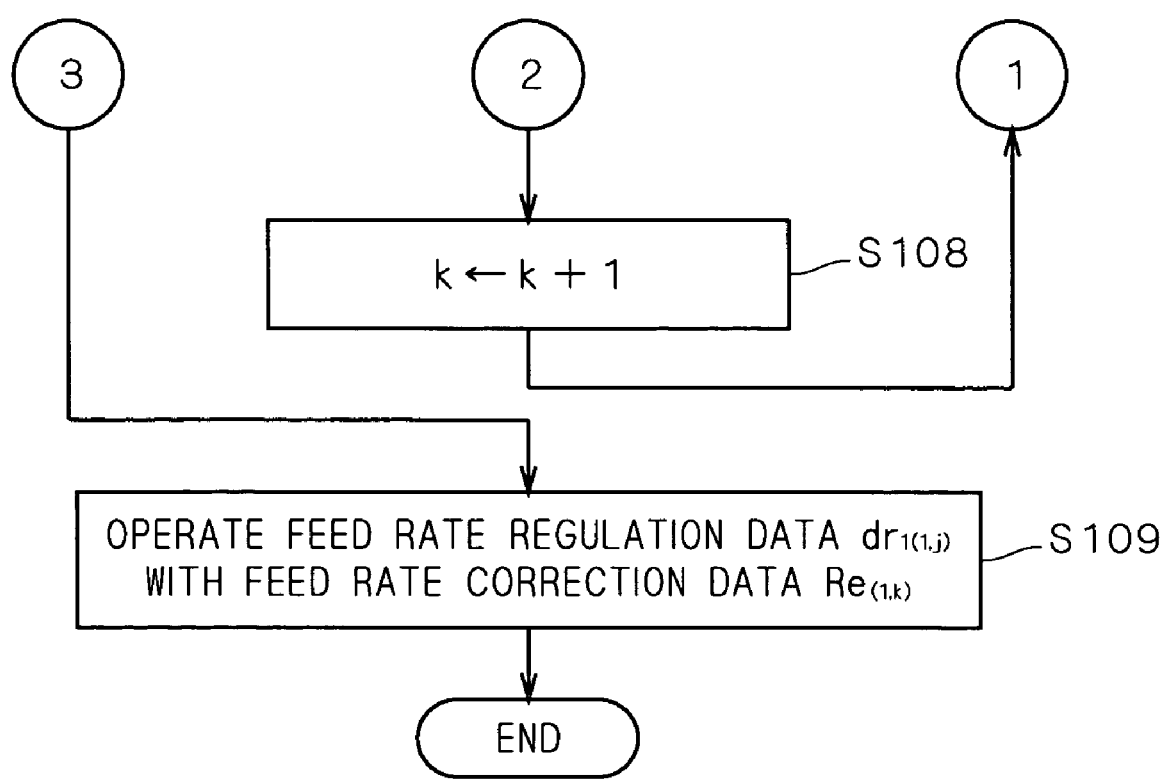
FIG. 18 is a flow chart showing an exemplary measurement procedure for feed rate regulation data of the ball screws in the third embodiment.

FIG. 16 illustrates a method of acquiring the feed rate regulation data dr1 and dr2 for the ball screws 11 and 21 according to this embodiment. FIGS. 17 and 18 are flow charts showing an exemplary procedure of acquiring the feed rate regulation data dr1 and dr2 for the ball screws 11 and 21. Since the feed rate regulation data dr1 and dr2 for the ball screws 11 and 21 are acquired through similar procedures, only the procedure of acquiring the feed rate regulation data dr1 for the ball screw 11 employed for moving the first recording head 10 is now described.

In the procedure for acquiring the feed rate regulation data dr1, a prescribed pulse is transmitted to the drive motor 15 for moving the first recording head 10 to an initial position PL(1,0) (origin position) of the head position PL (at S101). Then, a laser measuring machine 300 applies a laser beam to the first recording head 10 thereby measuring the distance DL(1,0) between the measuring machine 300 and the first recording head 10 (at S102). Then, an area for a variable k is reserved in an operation memory (not shown) provided in the control means 8, and "1" is stored in the variable k (at S103).

The prescribed number n1 of pulses is transmitted to the drive motor 15 for moving the first recording head 10 to a head position PL(1,1) (at S104). In this embodiment, the quantity MD1 of movement of the first recording head 10 per pulse is 0.5 μm. Since the number n1 of pulses transmitted to the drive motor 15 at the step S104 is 200,000, the operated value DC of the quantity of single movement of the first recording head 10 is 100 mm.

Then, the laser measuring machine 300 measures the distance DL(1,k) at a head position PL(1,k) (at S105). The distances DL(1,0) and DL(1,k) measured at the steps S102 and S105 are substituted in the following formula 1 when the value of the variable k is "1" or the distances DL(1,k−1) and DL(1,k) measured at the step S105 are substituted in the formula 1 along with the operated value DC and the quantity MD1 of movement of the first recording head 10 per pulse when the value of the variable k is greater than "1", thereby obtaining feed rate correction data Re(1,k) (unit: pulse) (at S106):

$$Re_{(1,k)} = \frac{(DL_{(i,k)} - DL_{(1,k-1)}) - DC}{MD_1}$$ [Formula 1]

The feed rate correction data Re(1,k) is correction data necessary for correcting the prescribed number n1 of pulses when actually moving the first recording head 10 for the operated value DC. When the variable k is "1" and the value (DL(1,1)−DL(1,0)) is 100.010 (mm), for example, the feed rate correction data Re(1,k) is 20 pulses. In other words, 199,980 pulses obtained by subtracting 20 pulses from the number n1 of pulses are transmitted to the drive motor 15 in order to move the first recording head 10 for 100 mm from the initial position PL(1,0). When the value (DL(1,1)−DL(1,0)) is 99.994 (mm), the feed rate correction data Re(1,k) is −12 pulses, and 200,012 pulses must be transmitted to the drive motor 15 in order to move the first recording head 10 for 100 mm from the initial position PL(1,0).

When operation of the feed rate correction data Re(1,k) is ended at all measured positions PL(1,k), the feed rate correction data Re(1,k) obtained at the step S106 is employed for operating the feed rate regulation data dr1 to be stored in the correction data memory 84 shown in FIG. 6 (at S109).

As hereinabove described, the memory space of the correction data memory 84 in this embodiment is divided into 125 along the i-axis direction and into 250 along the j-axis direction, similarly to the first embodiment. When the prescribed number n1 of pulses is 200,000, the quantity MD1 of movement of the first recording head 10 per pulse is 0.5 μm (hence the operated value DC of the quantity of movement of the first recording head 10 at the step S104 is 100 mm), the coverage of the ball screw 11 is 2500 mm from the initial position PL(1,0) (hence the steps S104 to S106 are repeated 25 times), and the feed rate correction data Re(1,k) (1≦k≦25), then the feed rate regulation data dr1(i,j) representing feed rate regulation data stored in a cell (i,j) is obtained, for example, by the following formulas 2 and 3:

$$k = \left[\frac{j}{10}\right]^* + 1$$ [Formula 2]

$$dr_{1(i,j)} = \frac{Re_{(1,k)}}{10}$$ [Formula 3]

The formula 2 expresses the relation between the variable k and the j coordinate of the memory space of the correction data memory 84. In the formula 2, [ ]* is a function which means discarding all digits to the right of the decimal point. The formula 3 expresses the relation between the feed rate regulation data dr1(i,j) and the feed rate correction data Re(1, k), and holds for an arbitrary variable i (0≦i≦124). In other words, the formula 3 indicates that the same feed rate regulation data dr1(i,j) is stored in the cells having equal values of the i coordinates of the memory space of the correction data memory 84. For example, "2" is stored in the feed rate regulation data dr1(0,j) (0≦j≦9) when the value of the feed rate correction data Re(1,1) is 20 pulses, according to the formulas 2 and 3. Further, "2" is stored in the feed rate regulation data dr1(i,8) (0≦i≦124).

When the operation of the feed rate correction data Re(1,k) is not ended for all positions PL(1,k), "1" is added to the variable i (at S108), and the processing at the steps S104 to S106 is executed again (at S107).

<4. Correction Processing with Correction Data Including Feed Rate Regulation Data>

Figure 19:
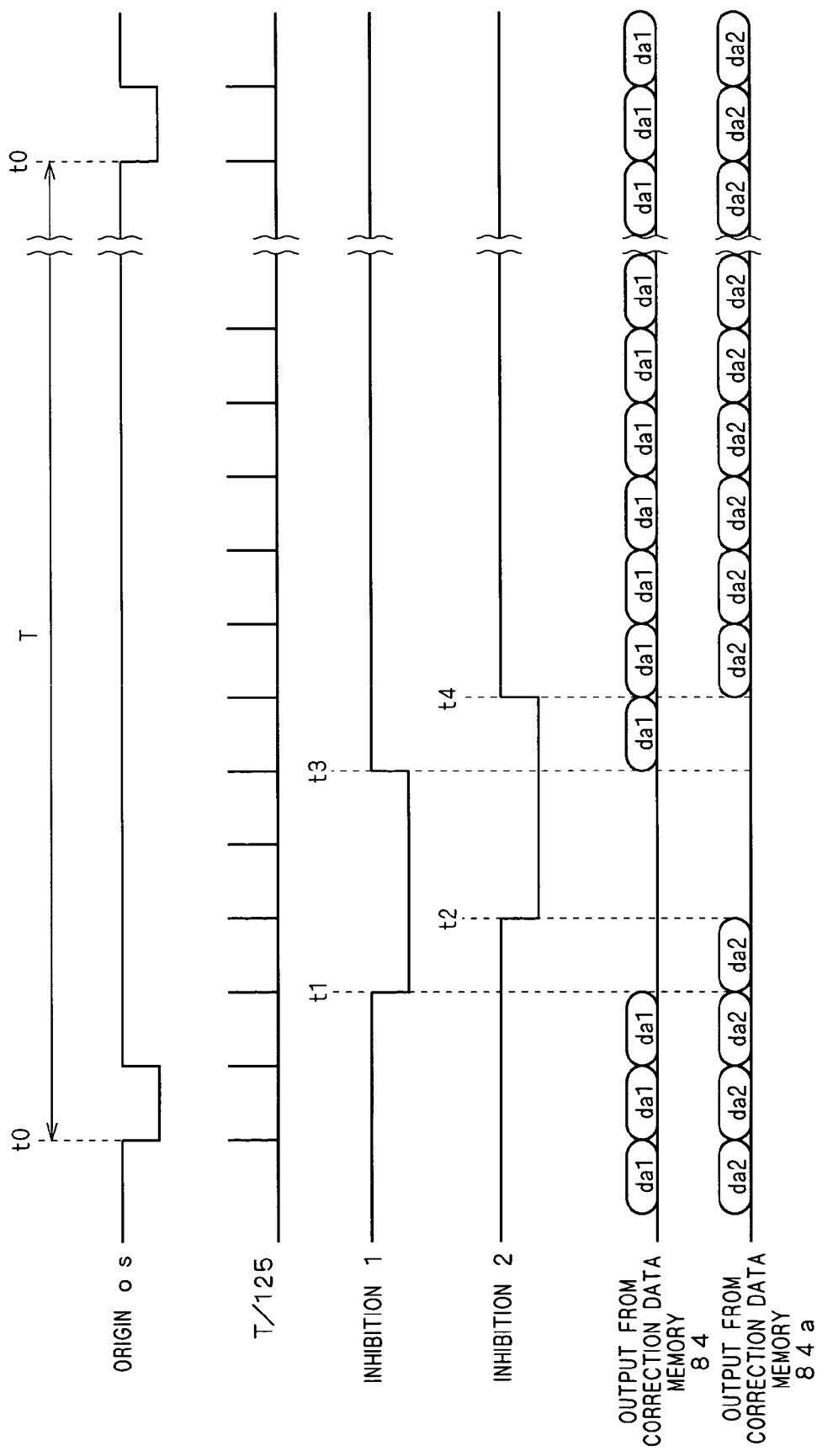
FIG. 19 is a timing chart illustrating correction processing in the image recording system according to the third embodiment.

FIG. 19 is a timing chart illustrating correction processing in the image recording system according to this embodiment. Correction processing using the correction data da1 stored in the correction data memory 84 and correction processing using the correction data da2 stored in the correction data memory 84a are described with reference to the timing chart shown in FIG. 19 and the functional block diagram shown in FIG. 15.

As shown in FIG. 19, the control part 91 controls the counters 94 and 101 to supply the first main scanning position signal m1 and the first subscanning position signal s1 to the correction data memory 84 during the time interval between the instant to when the rotational position of the drum 1 reaches the origin position and the encoder 7 transmits the origin signal os to the control part 91 and the instant t1 when the main scanning position of the first recording head 10 reaches the recording inhibition area. The correction data memory 84 outputs the correction data da1 (formed by the dot regulation data dm1, the regulation data ds1 and the feed rate regulation data dr1) stored in the cell corresponding to the scanning position of the first recording head 10 to the data separator 97. In other words, the correction data da1 responsive to the current position of the first recording head 10 can be output to the data separator 97 by supplying the main scanning position signal m1 and the subscanning position signal s1 to the correction data memory 84. The data separator 97 separates the correction data da1 to output the dot regulation data dm1, the regulation data ds1 and the feed rate regulation data dr1 to the dot length regulator 95, the divider 99 and the pulse regulator 104 respectively.

The divider 99 outputs the pulse signal ps1 properly corrected in response to the subscanning feed regulation data ds1 to the pulse regulator 104. The pulse regulator 104 regulates the pulse signal ps1 to generate the pulse signal ps3 on the basis of the feed rate regulation data dr1 received from the data separator 97, thereby increasing/decreasing the number of pulses output to the drive motor 15 and regulating the quantity of movement of the first recording head 10.

The dot length regulator 95 transmits a properly corrected dot clock dc1 to the first image processing means 81 on the basis of the dot regulation data dm1 received from the data separator 97. The first image processing means 81 generates the drawing signal d1 on the basis of the dot clock dc1 received from the dot length regulator 95 and the image data im1 to transmit the drawing signal d1 to the first recording head 10, thereby recording an image on the printing plate P12.

During the time interval between the instant t0 and the instant t2 when the main scanning position of the second recording head 20 reaches a recording inhibition area, the control part 91 controls the counters 94 and 102 to supply the main scanning position signal m2 and the subscanning position signal s2 to the correction data memory 84*a*. The correction data memory 84*a* outputs the correction data da2 stored in the cell corresponding to the scanning position of the second recording head 20 to the data separator 98. In other words, the correction data memory 84*a* outputs the correction data da2 corresponding to the current position of the second recording head 20 to the data separator 98, as in the case of the first recording head 10. The data separator 98 separates the correction data da2 to output the dot regulation data dm2, the regulation data ds2, and the feed rate regulation data dr2 to the dot length regulator 96, the divider 100, and the pulse regulator 105 respectively.

The divider 100 outputs the pulse signal ps2 properly corrected in response to the subscanning feed regulation data ds2 to the pulse regulator 105. The pulse regulator 105 regulates the pulse signal ps2 to generate the pulse signal ps4 on the basis of the feed rate regulation data dr2 received from the data separator 98, thereby increasing/decreasing the number of pulses output to the drive motor 25 and regulating the quantity of movement of the second recording head 20.

The dot length regulator 96 transmits the properly corrected dot clock dc2 to the second image processing means 82 on the basis of the dot regulation data dm2 received from the data separator 98. The second image processing means 82 generates the drawing signal d2 on the basis of the dot clock dc2 received from the dot length regulator 96 and the image data im2 to transmit the drawing signal d2 to the second recording head 20 thereby recording an image on the printing plate P11.

Thus, the control means 8 can cause the recording heads 10 and 20 to perform image recording in parallel during the time interval between t0 and t1 by (1) regulating the feed rates of the recording heads 10 and 20 in the subscanning direction with the feed rate regulation data dr1 and dr2 respectively to supply the regulated pulse signals ps3 and ps4 to the drive motors 15 and 25 respectively thereby individually moving the recording head 10 and 20, and (2) supplying the drawing signals d1 and d2 to the recording heads 10 and 20 respectively.

When the first recording head 10 reaches the recording inhibition area at the time t1, the control part 91 controls the counters 94 and 101 to stop supplying the main scanning position signal m1 and the subscanning position signal s1 to the correction data memory 84, thereby temporarily stopping reading of the correction data da1 from the correction data memory 84. When the second recording head 20 reaches the recording inhibition area at the time t2, the control part 91 controls the counters 94 and 102 to stop supplying the main scanning position signal m2 and the subscanning position signal s2 to the correction data memory 84*a*, thereby temporarily stopping reading of the correction data da2 from the correction data memory 84*a*.

At the time t3 when the first recording head 10 reaches a recordable area, the control part 91 controls the counters 94 and 101 to transmit the first main scanning position signal m1 and the first subscanning position signal s1 to the correction data memory 84, which in turn restarts outputting the correction data da1. Thus, during the time interval between the instant t3 and the instant t0 (the time t0 shown on the right side in FIG. 19) when the rotational position of the drum 1 reaches the origin position again, the correction data memory 84 sequentially transmits the correction data da1 to the data separator 97. On the basis of the correction data da1, the pulse regulator 104 outputs the pulse signal ps3 to the drive motor 15 and the image processing means 81 outputs the drawing signal d1 to the first recording head 10 respectively, as hereinabove described.

At the time t4 when the second recording head 20 reaches a recordable area, the control part 91 controls the counters 94 and 102 to transmit the main scanning position signal m2 and the subscanning position signal s2 to the correction data memory 84*a*, which in turn restarts outputting the correction data da2. Thus, during the time interval between the instant t4 and the instant t0 when the rotational position of the drum 1 reaches the origin position again, the correction data memory 84*a* sequentially transmits the correction data da2 to the data separator 98. On the basis of the correction data da2, the pulse regulator 105 outputs the pulse signal ps4 to the drive motor 25 and the image processing means 82 outputs the drawing signal d2 to the recording head 20, as hereinabove described.

Thus, during the time interval between the instant t4 and the instant t0 when the rotational position of the drum 1 reaches the origin position again, the control means 8 can cause the recording heads 10 and 20 to perform image recording in parallel while regulating the feed rates of the recording heads 10 and 20 in the subscanning direction by using the feed rate regulation data dr1 and dr2 respectively.

The processing continuously shifts from the time t0 shown on the right side in FIG. 19 to the time t0 shown on the left side, whereby the correction processing is continuously performed.

<5. Advantage of Image Recording System According to Third Embodiment>

The third embodiment features (1) outputting the pulse signal ps3 regulated with the feed rate regulation data dr1 in the pulse regulator 104 to the drive motor 15 and (2) outputting the pulse signal ps4 regulated with the feed rate regulation data dr2 in the pulse regulator 105 to the drive motor 25. This reduces the influence of dispersion of the feed rates of the first and second recording heads 10 and 20 resulting from dispersion of leads of the ball screws 11 and 21, to accomplish an adjustment so that the contours of the plurality of color component images corresponding to each other and to be recorded on the printing plates (printing materials) P12 and P11 are substantially identical with each other.

In a prepress process employing such image recording, four color separations (C, M, Y and K separations) necessary for full-color printing are divided into pairs of color separations, and two color component images are recorded on each pair of printing materials mounted on the drum 1 as the printing plates P11 and P12, respectively. For example, a first pair of printing materials, e.g. the C separation and the M separation, are arranged and mounted on the drum 1, and a C color component image and an M color component image are recorded in parallel on the C and M separations, respectively. Then, a second pair of printing materials, e.g. the Y separation and the K separation, are arranged and mounted on the drum 1, and a Y color component image and a K color component image are recorded in parallel on the Y and K separations, respectively. The use of the four color separations completed in the aforementioned manner for printing of the color component images of Y, M, C and K on a printing medium such as paper prevents the contours of recorded materials in the printed full-color image from being displaced from each other or unsharpened.

Fourth Embodiment

<1. Deformation of Recorded Image Resulting from Displacement of Mounting Position of Positioning Pin>

FIG. 20 is a view for illustrating a method of arranging two printing plates on the drum 1 by using a plurality of positioning pins provided upright on the drum 1. FIG. 21 shows that the printing plates fixed and subjected to image recording as shown in FIG. 20 are developed in two dimensions.

As shown in FIG. 20(a), the printing plate P11 is positioned and arranged by two positioning pins DP11 and DP12 provided upright on the drum 1. More specifically, the positioning pin DP12 is fitted in a cutout portion CP11 formed in an upper portion of the printing plate P11, and a printing plate upper end straight line PU11 in the upper portion of the printing plate P11 is pressed against the positioning pin DP11, whereby the printing plate P11 is positioned in place on the drum 1 so that the printing plate upper end straight line PU11 of the printing plate P11 and the rotation axis RA1 of the drum 1 are parallel to each other. When the subscanning direction of the second recording head 20 and the rotation axis RA1 are parallel with each other, a recording area upper end straight line LU11 connecting recording start points of an image recorded on the printing plate P11 by the second recording head 20 is parallel with the printing plate upper end straight line PU11, the distance between the printing plate upper end straight line PU11 and the recording area upper end straight line LU11 is set at a distance DD1. A clamp member (not shown) holds the printing plate P11 positioned by the positioning pins DP11 and DP12 on the outer peripheral surface of the drum 1.

When the subscanning direction of the first recording head 10 and the rotation axis RA1 are parallel with each other, the printing plate P12 is arranged on the drum 1 using a positioning pin DP13, a cutout portion CP12 and a positioning pin DP14, whereby a recording area upper end straight line LU12 connecting recording start points of an image recorded on the printing plate P12 by the first recording head 10 is parallel with a printing plate upper end straight line PU12, and the distance between the printing plate upper end straight line PU12 and the recording area upper end straight line LU12 is set at a distance DD2.

Thus, the recording area upper end straight lines LU11 and LU12 are made parallel with the rotation axis RA1, and the distance DD1 between the recording area upper end straight line LU11 and the printing plate upper end straight line PU11 is made equal to the distance DD2 between the recording area upper end straight line LU12 and the printing plate upper end straight line PU12, whereby any two of the four color separation images can be simultaneously recorded on the printing plates P12 and P11 by using the first and second recording heads 10 and 20 when color component images of substantially identical contours are drawn for respective color separations for full-color reproduction.

When the mounting position of the positioning pin DP21 or DP22 is poor in precision as shown in FIG. 20(b), however, the angle θ2 formed by a straight line RA2 parallel with the rotation axis RA1 and a printing plate upper end straight line PU21 indicating the upper end of the printing plate P21 might exceed a tolerance for an angle necessary for recording color component images of substantially identical contours by simultaneously employing the two recording heads 10 and 20.

At this time, an image recording area PA21 (enclosed by solid lines) for recording an image on the printing plate P21 by the second recording head 20 is rotated through the angle θ2 downward about a position Pt21 as compared with an image recording area PA23 (enclosed by one-dot chain lines) obtained when the positioning pins DP21 and DP22 are mounted in place on the drum 1 as shown in FIG. 21(b). Therefore, the recording area upper end straight line LU21 (solid lines) connecting start points of image recording by the second recording head 20 is moved downward as compared with a recording area upper end straight line LU23 (one-dot chain lines) of the image recording area PA23.

In some cases, poor precision of the mounting positions of two positioning pins might cause the distance DD3 between a recording area upper end straight line LU24 of an image recording area PA24 (enclosed by solid lines) and a recording area upper end straight line LU25 of an image recording area PA25 (enclosed by one-dot chain lines) obtained when the positioning pins are mounted in place to exceed a tolerance for a distance necessary for recording color component images of substantially identical contours by simultaneously employing the two recording heads 10 and 20. As a result, the recording area upper end straight line LU24 (solid lines) might be moved downward as compared with the recording area upper end straight line LU25 (one-dot chain lines) as shown in FIG. 21(c).

Further, an image area might be present in a position downwardly translated and rotated with respect to the rotation axis RA1 as compared with a reference image area obtained when the pins are mounted.

When the precision of the mounting positions of the positioning pins is out of a prescribed range in the aforementioned manner, it is impossible to record images in proper positions on the printing plates and to make the contour of a color component image drawn by the first recording head 10 and the contour of a color component image drawn by the second recording head 20 substantially identical in shape. It is also impossible to make substantially the same a relative positional relationship between the color component image drawn by the first recording head 10 and the positioning pins DP13 and DP14 and a relative positional relationship between the color component image drawn by the second recording head 20 and the positioning pins DP11 and DP12. When the color separations of color reproduction are created by the two recording heads 10 and 20 and thereafter full-color printing is performed using the color separations subjected to drawing, the contours of respective color component images in the printed color image are displaced or unsharpened.

Therefore, a fourth embodiment of the present invention illustrates correction processing based on geometric positional relation between the positioning pins for making the contours of two color component images recorded on the two printing plates P11 and P12 fixed in different positions on the drum 1 substantially identical in shape and for providing substantially the same relative positional relation, for all printing plates, between the color component images and the positioning pins corresponding to the color component images, in an image recording system substantially similar to that according to the first embodiment. The hardware structure of the image recording system according to this embodiment is identical to that of the image recording system according to the first embodiment except that (1) it further comprises image conversion means 106 and 107 for converting the image data im1 and im2 by rotation movement or linear translation, and hence only the difference between the image recording systems according to the fourth embodiment and the first embodiment is now described.

<2. Hardware Structure of Image Recording System According to Fourth Embodiment>

Figure 22:
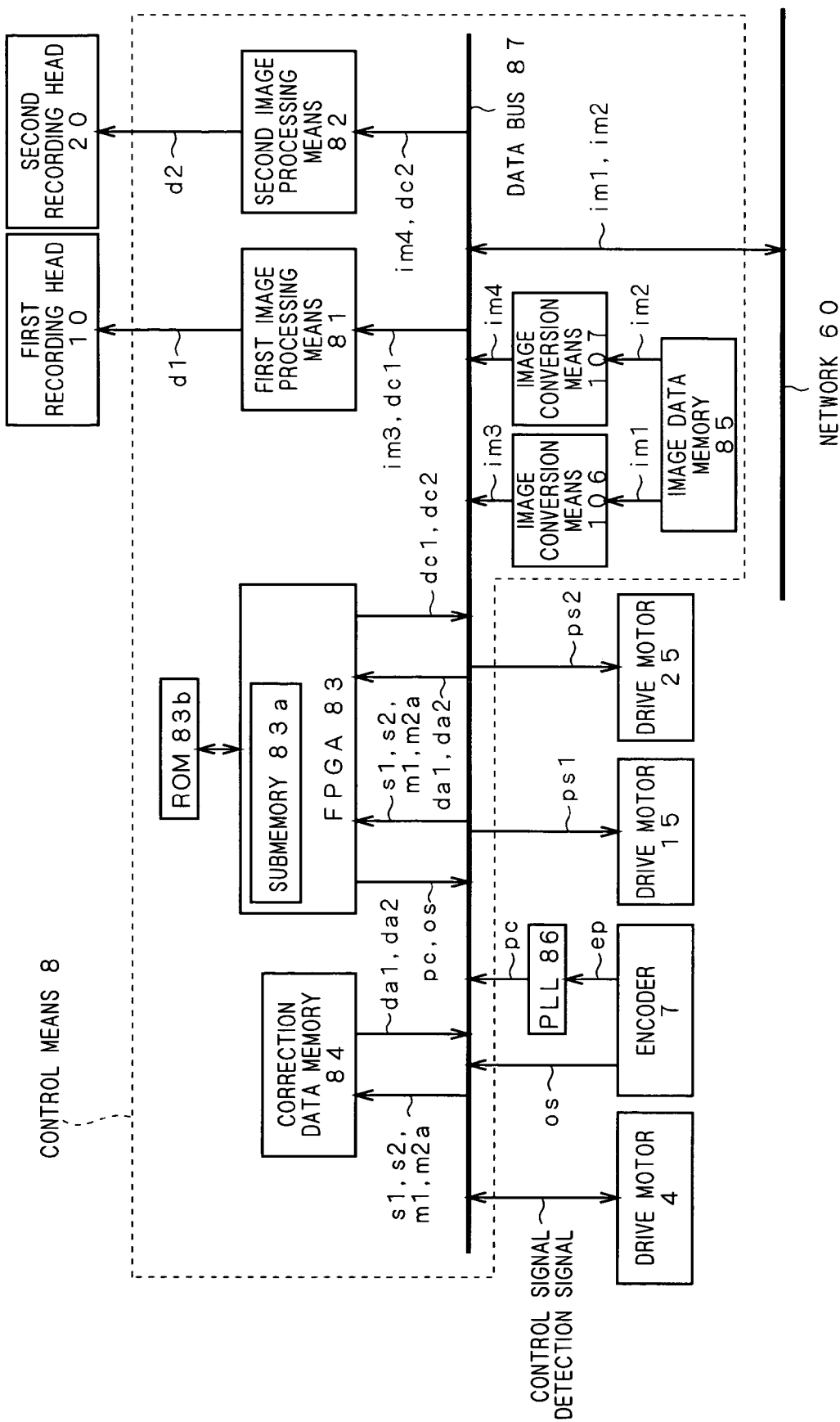
FIG. 22 is a block diagram illustrating the hardware structure of control means of an image recording system according to the fourth embodiment.
Figure 23:
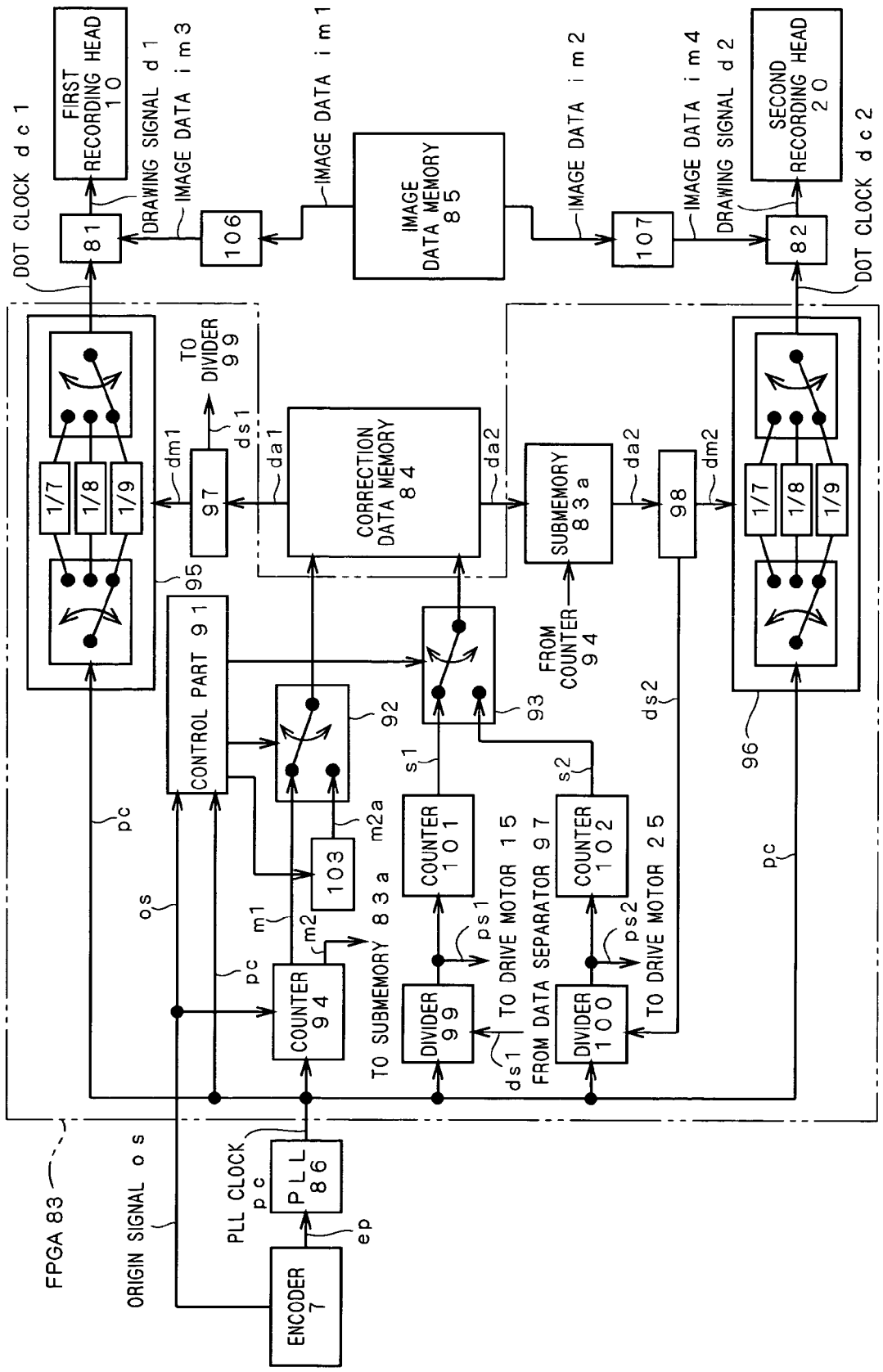
FIG. 23 is a functional block diagram of the control means of the image recording system according to the fourth embodiment.

FIG. 22 is a diagram for illustrating the hardware structure of control means in this embodiment. FIG. 23 is a functional block diagram of the control means in this embodiment. As shown in FIGS. 22 and 23, the hardware structure of the image recording system according to this embodiment is substantially identical to that of the control means according to the first embodiment except that the image conversion means 106 and 107 are added to the control means 8. Therefore, the image conversion means 106 and 107 are now described.

When the mounting positions of the positioning pins are out of tolerance and images cannot be correctly recorded on the printing plates as shown in FIG. 21(*b*) or 21(*c*), the image conversion means 107 converts the image data im2 to be recorded by the second recording head 20 to generate image data im4. As shown in FIG. 23, the image conversion means 107 is added between the image data memory 85 and the image processing means 82.

As shown in FIG. 23, the image conversion means 107 receives the image data im2 from the image data memory 85. The image conversion means 107 stores the angle θ2 (refer to FIG. 20(*b*)) formed by the rotation axis RA1 and the recording area upper end straight line of an image recording area and a shift amount DD3 (refer to FIG. 20(*c*)) of the image recording area in the main scanning direction, the angle θ2 and the shift amount. DD3 being previously obtained by an experiment or the like. The original image data im2 is translated and rotated by the use of the angle θ2 and the shift amount DD3 and converted into the image data im4.

The image conversion means 106 is conversion means having a function similar to that of the image conversion means 107, and converts the image data im1 recorded by the first recording head 10 to generate image data im3. As shown in FIG. 23, the image conversion means 106 is added between the image data memory 85 and image processing means 81. The image conversion means 106 employs rotation and translation parameters previously obtained by an experiment or the like thereby converting the original image data im1 into the translated and rotated image data im3.

<3. Correction Processing in Image Recording System According to Fourth Embodiment>

Correction processing related to displacement of the positioning pins executed in the image conversion means 106 and 107 is described with reference to FIG. 22 showing the diagram for illustrating the hardware structure of the control means according to this embodiment.

As shown in FIG. 22, the image conversion means 107 receives the image data im2 from the image data memory 85. The image conversion means 107 converts the original image data im2 to the image data im4 by using the angle θ2 formed by the rotation axis RA1 and the recording area upper end straight line of the image recording area and the shift amount DD3 (refer to FIG. 20(*c*)) of the image recording area in the main scanning direction.

The converted regulated image data im4 is output to the image processing means 82 through a data bus 87. The image processing means 82 generates the drawing signal d2 synchronous with the dot clock dc2 on the basis of the image data im4. The drawing signal d2 is input to the second recording head 20 similarly to that in the first embodiment, whereby a color component image is recorded on a printing plate.

The first recording head 10 records the image data im3 converted by the image conversion means 106 on a printing plate in a similar manner.

As shown in FIG. 22, the image conversion means 106 receives the image data im1 from the image data memory 85. The image conversion means 106 converts the image data im1 to the image data im3 by translation and rotation processing by using previously stored rotation and translation parameters. The converted regulated image data im3 is output to the image processing means 81 through the data bus 87. The image processing means 81 generates the drawing signal d1 synchronous with the dot clock dc1 on the basis of the image data im3. The drawing signal d1 is input to the first recording head 10 similarly to that in the first embodiment, whereby a color component image is recorded on a printing plate.

The image conversion means 106 and 107 may convert the original image data im1 and im2 to the image data im3 and im4 respectively during the execution of the image recording processing if the time required for the conversion processing of the image data im3 and im4 corresponding to the respective dot clocks (i.e., the time required for reading the image data im1 and im2 necessary for the conversion processing of the image data im3 and im4 corresponding to the dot clocks dc1 and dc2 from the image memory 85 and thereafter converting the read image data im1 and im2 to the image data im3 and im4 in the image conversion means 106 and 107) is within the time defined by the dot clocks dc1 and dc2. If the conversion processing is not completed within the time defined by the dot clocks dc1 and dc2, the image conversion means 106 and 107 may be provided with image data memories (not shown) for storing the previously converted regulated image data im3 and im4 therein, and the image data im3 and im4 may be read from the image data memories when the recording heads 10 and 20 execute the image recording processing.

The correction data memory 84 and the submemory 83a perform correction processing in the main scanning direction and the subscanning direction similarly to those in the first embodiment.

<4. Advantages of Image Recording System According to Fourth Embodiment>

When the precision of the mounting positions of the positioning pins is not within a prescribed range, the fourth embodiment features (1) outputting the image data im3 converted by the image conversion means 106 to the image processing means 81 in place of the image data im1 and (2) outputting the image data im4 converted by the image conversion means 107 to the image processing means 82 in place of the image data im2. This accomplishes the adjustment of the contour of a color component image recorded by the first recording head 10 and the contour of a color component image recorded by the second recording head 20 to substantially the same shape regardless of the mounting positions of the positioning pins. Additionally, the fourth embodiment can also make an adjustment to provide substantially the same relation, for all printing plates, between the color component images and the positioning pins corresponding to the color component images relative to each other.

In a prepress process employing such image recording, four color separations (C, M, Y and K separations) necessary for full-color printing are divided into pairs of color separations, and two color component images are recorded on each pair of printing materials mounted on the drum 1 as the printing plates P11 and P12, respectively, similarly to the third embodiment. The use of the four color separations completed in this manner for printing of the color component images of Y, M, C and K on a printing medium such as paper prevents the contours of the recorded materials in the printed full-color image from being displaced from each other or unsharpened.

According to the fourth embodiment, the submemory 83a is employed similarly to the first embodiment, thereby preventing an overlap between accesses to the correction memory 84 for correction processing of the first and second recording heads 10 and 20. The use of counters 94, 101 and 102 shown in FIG. 23 enables read addresses to be supplied to the correction data memory 84 by means of a relatively simple circuit structure.

According to the fourth embodiment, further, the submemory 83a capable of storing the quantity of data (the quantity of correction data for one line in the i-axis direction shown in FIG. 6) required by one recording head during single rotation of the drum 1 is employed as a memory for storing the correction data da used in the second recording head 20, as in the first embodiment, and the correction data da can be read from the correction data memory 84 and stored in the submemory 83a as need. Therefore, it is not necessary to prepare another correction data memory having a memory space similar to that of the correction data memory 84 for holding additional data similar to the correction data da stored in the correction data memory 84, but hardware resources and software resources can be saved.

Fifth Embodiment

<1. Deflection Correction in Main Scanning Direction>

Figure 24:
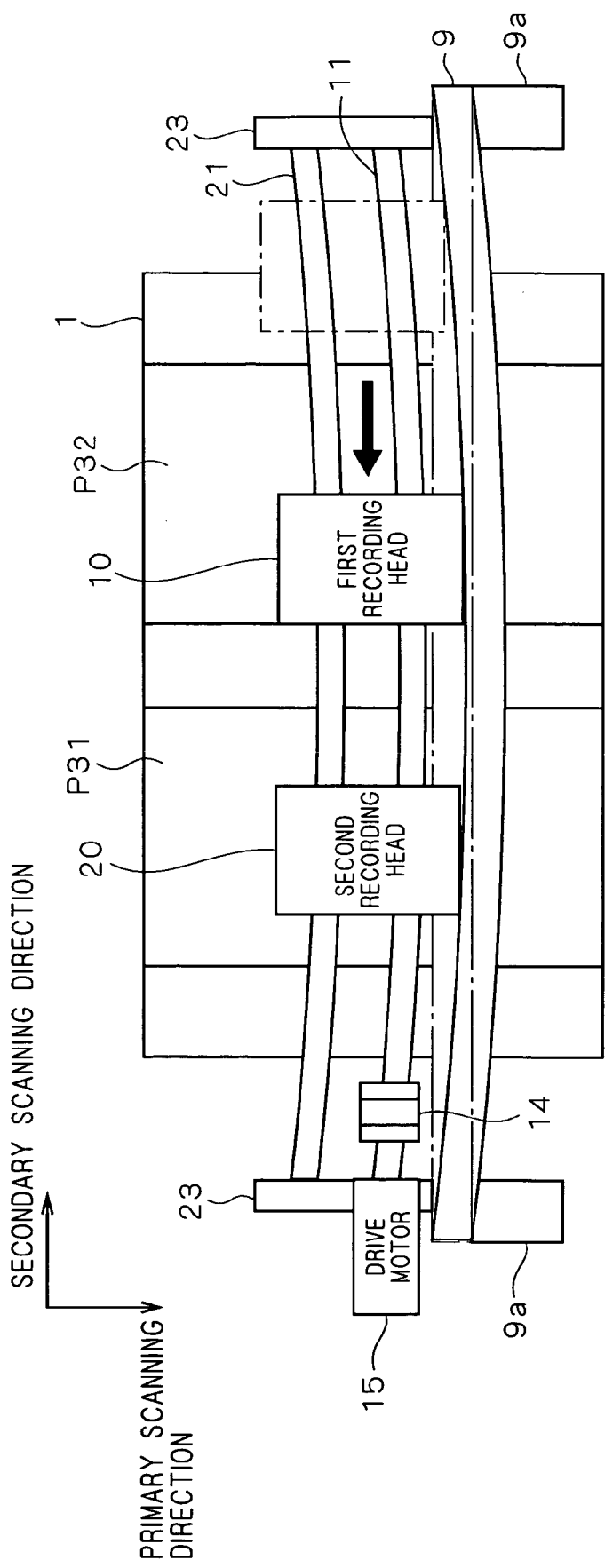
FIG. 24 is a view for illustrating deflection of a base part and ball screws in a fifth embodiment of the present invention.

FIG. 24 is a view for illustrating deflection of the ball screws 11 and 21 and a base part 9 in an image recording system according to a fifth embodiment of the present invention. As shown in FIG. 24, the base part 9 is supported by at least two base part support means 9a, and two screw support means 23 are fixed to upper portions thereof.

The two ball screws 11 and 21 are fixed to the two screw support means 23 in the subscanning direction. According to this embodiment, the drum 1 has a length great enough to hold two printing plates P31 and P32 on the outer peripheral surface thereof as shown in FIG. 24, and the base part 9 is increased in size with a length of at least 3000 mm in the subscanning direction. When fixed onto the base part support means 9a as shown in FIG. 24, the base part 9 is remarkably influenced by deflection resulting from its own weight as compared with a base part of a conventional image recording system. Consequently, the base part 9 is deformed from a shape shown by one-dot chain lines in FIG. 24 to a shape shown by solid lines.

The guides 12 (See FIG. 12) for guiding the first recording head 10 and the second recording head 20 in the subscanning direction are also deformed under the significant influence of deflection resulting from their own weight in a manner similar to the base part 9. The ball screw 11 for moving the first recording head 10 in the subscanning direction is deformed as shown in FIG. 24 under the load of the first recording head 10 in addition to its own weight increased by size increase. Likewise, the ball screw 21 for moving the second recording head 20 in the subscanning direction is deformed as shown in FIG. 24 under the load of the second recording head 20 in addition to its own weight increased by size increase.

Thus, the ball screws 11 and 21, the guides 12 and the base part 9 are remarkably influenced by deformation mainly due to the size increase of the drum 1 as compared with those in the conventional image recording system. Therefore, the direction of movement of the recording heads 10 and 20 guided by the ball screw 11, the guides 12 and the ball screw 21, and the rotation axis RA1 of the drum 1 are distorted relative to each other. As a result, images recorded on printing plates are also deflected and distorted.

FIG. 25(a) illustrates exemplary images recorded on printing plates when not influenced by such deflection. As shown in FIG. 25(a), a printing plate upper end straight line PU31 of the printing plate P31 and a recording area upper end straight line LU31 of an image recording area PA31 can be parallel with each other, and a printing plate upper end straight line PU32 of the printing plate P32 and a recording area upper end straight line LU32 of an image recording area PA32 can be parallel with each other. Additionally, the distance DD31 between the printing plate upper end straight line PU31 and the recording area upper end straight line LU31 can be equal to the distance DD32 between the printing plate upper end straight line PU32 and the recording area upper end straight line LU32. Therefore, two images of substantially identical shapes such as color separations of color reproduction can be simultaneously recorded on the image recording areas PA31 and PA32 by the use of the recording heads 10 and 20.

FIG. 25(b) illustrates exemplary images recorded on printing plates when influenced by deflection. As shown in FIG. 24, the central portions of the ball screws 11 and 21 and the base part 9 are most deflected. Therefore, a recording area upper end straight line LU43 connecting recording start points of an image recording area PA41 gradually descends (shifts in the positive main scanning direction) from the left end of the recording area upper end straight line LU43 toward the positive subscanning direction as compared with a recording area upper end straight line LU41 obtained under no load. A recording area lower end straight line LL43 connecting recording end points of the image recording area PA41 also gradually descends from the left end of the recording area lower end straight line LL43 toward the positive subscanning direction as compared with a recording area lower end straight line LL41 obtained under no load. Similarly, a recording area upper end straight line LU44 connecting recording start points of an image recording area PA42 gradually descends (shifts in the positive main scanning direction) from the right end of the recording area upper end straight line LU44 toward the negative subscanning direction as compared with a recording area upper end straight line LU42 obtained under no load. A recording area lower end straight line LL44 connecting recording end points of the image recording area PA42 also gradually descends from the right end of the recording area lower end straight line LL44 toward the negative subscanning direction as compared with a recording area lower end straight line LL42 obtained under no load.

Thus, the shapes of the image recording areas PA42 and PA41 recorded by the recording heads 10 and 20 respectively differ from each other and are relatively distorted due to the deflection of the ball screws 11 and 21 and the base part 9. Therefore, it is extremely difficult to record images of substantially identical shapes such as color separations of color reproduction on the printing plates P42 and P41 respectively under the influence of the deflection.

Therefore, description will be given in the fifth embodiment on the correction for eliminating the influence of distortion of images on printing plates recorded by the recording heads 10 and 20 respectively to make the shapes of the images substantially identical when influenced by deflection in the image recording system similar in hardware structure to that according to the fourth embodiment. The image recording system according to this embodiment is identical to that according to the fourth embodiment except image conversion parameters stored in image conversion means 106 and 107 to be described later, and hence only the difference (deflection correction) between the image recording system according to the fifth embodiment and that according to the fourth embodiment is now described.

<2. Procedure for Acquiring Deflection Quantity Regulation Data in Main Scanning Direction>

Figure 26:
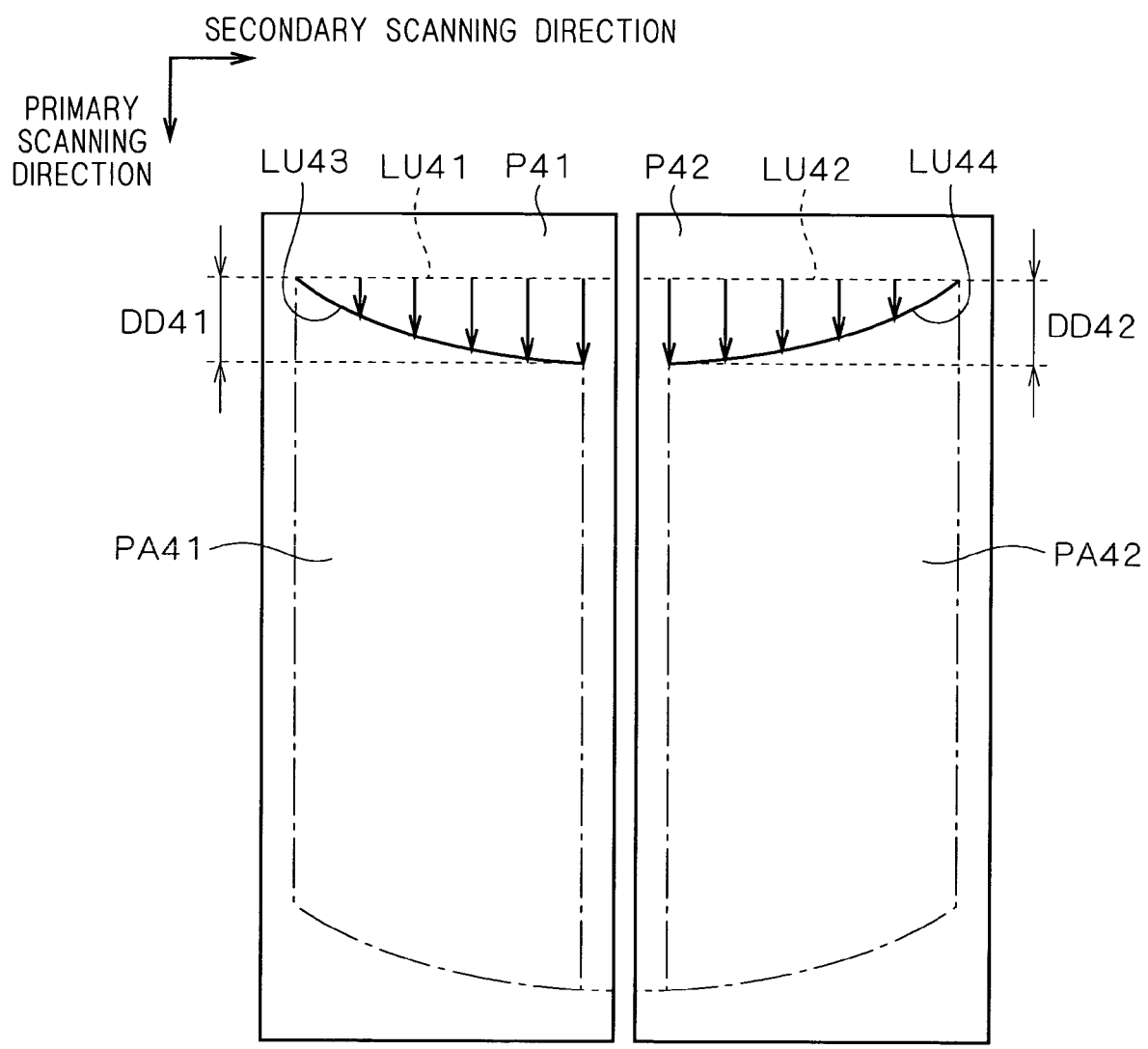
FIG. 26 is a view for illustrating an image recorded for acquiring deflection correction data in the fifth embodiment.

A method of acquiring deflection quantity regulation data in the main scanning direction is now described. FIG. 26 is a view for illustrating a method of acquiring the deflection quantities of the ball screws 11 and 21 and the base part 9. In deflection correction, as shown in FIG. 26, image conversion parameters to be described later are not stored in the image conversion means 106 and 107 respectively, but the second recording head 20 is employed for the printing plate P41 and the recording area upper end straight line LU43 indicating the upper end of the image recording area PA41 is recorded. Similarly, the first recording head 10 is employed for the printing plate P42, and the recording area upper end straight line LU44 indicating the upper end of the image recording area PA42 is recorded.

Then, a plurality of distances DD41 (unit: mm) between the recording area upper end straight line LU41 (broken lines) connecting recording start points of the image recording area PA41 under no influence of deflection and respective parts of the recording area upper end straight lines LU43 (solid lines) are measured. At this time, the distances DD41 may be measured, for example, for respective portions corresponding to the areas obtained by dividing the surface of the drum 1 into 250 along the subscanning direction.

Then, the image conversion means 107 converts all of the measured distances DD41 to deflection quantity regulation data df2 for use in image conversion. The deflection quantity regulation data df2 is employed for converting image data im2 of the first embodiment for the purpose of recording an image not influenced by deflection such as that starting image recording from the recording area upper end straight line LU41 on the printing plate P41, and is obtained for each of the portions corresponding to the areas obtained by division into 250 along the subscanning direction, for example. The deflection quantity regulation data df2 can be obtained by dividing the distances DD41 by the rotation distance of the outer peripheral surface of the drum 1 per dot clock dc2. An image not influenced by deflection can be recorded on the printing plate P41 by performing the conversion processing of moving the image data im2 for the amount of the deflection quantity regulation data df2 in the negative main scanning direction. The image conversion means 107, for example, stores the obtained deflection quantity regulation data df2.

Similarly, the image conversion means 106 stores deflection quantity regulation data df1 obtained by dividing distances DD42 by the rotation distance of the outer peripheral surface of the drum 1 per dot clock dc1. An image not influenced by deflection can be recorded on the printing plate P42 by performing the conversion processing of moving the image data im1 in the negative main scanning direction in accordance with the subscanning position by using the deflection quantity regulation data df1.

<3. Correction Processing with Deflection Quantity Regulation Data>

Correction processing on deflection quantities executed in the image conversion means 106 and 107 is now described with reference to FIG. 22 for illustrating the hardware structure of the control means according to the fourth embodiment.

According to this embodiment, the image conversion means 106 coverts the original image data im1 to the image data im3 by using the deflection quantity regulation data df1, and the image conversion means 107 converts the original image data im2 to the image data im4 by using the deflection quantity regulation data df2.

As shown in FIG. 22, the image conversion means 106 receives the image data im1 from the image data memory 85. The image conversion means 106 converts the image data im1 to the image data im3 moved in the main scanning direction on the basis of the deflection quantity regulation data df1. The converted regulated image data im3 is output to the first image processing means 81 through the data bus 87. The first image processing means 81 generates the drawing signal d1 synchronous with the dot clock dc1 on the basis of the image data im3. The drawing signal d1 is input to the first recording head 10 as in the fourth embodiment, whereby an image is recorded on the printing plate.

The image conversion means 107 performs image conversion processing by a method similar to that of the image conversion means 106. The image conversion means 107 receives the image data im2 from the image data memory 85. The image conversion means 107 converts the image data im2 to the image data im4 moved in the main scanning direction on the basis of the deflection quantity regulation data df2. The second recording head 20 records the converted regulated image data im4 on the printing plate through the data bus 87 and the second image processing means 82.

Similarly to the fourth embodiment, the image conversion means 106 and 107 may convert the original image data im1 and im2 to the image data im3 and im4 respectively during the execution of the image recording processing by the recording heads 10 and 20 if the time required for the conversion processing of the image data im3 and im4 corresponding to the respective dot clocks is within the time defined by the dot clocks dc1 and dc2. If the conversion processing is not completed within the time defined by the dot clocks dc1 and dc2, the image conversion means 106 and 107 may be provided with image data memories (not shown) for storing the previously converted image data im3 and im4 therein, and the image data im3 and im4 may be read from the image data memories when the recording heads 10 and 20 execute the image recording processing.

The correction data memory 84 and the submemory 83a perform correction processing in the main scanning direction and the subscanning direction similarly to those in the first embodiment.

<4. Advantages of Image Recording System According to Fifth Embodiment>

When the ball screws 11 and 21, the guides 12 and the base part 9 are influenced by deflection, the fifth embodiment features (1) outputting the image data im3 converted by the image conversion means 106 on the basis of the deflection quantity regulation data df1 in place of the image data im1 to the image processing means 81, and (2) outputting the image data im4 converted by the image conversion means 107 on the basis of the deflection quantity regulation data df2 in place of the image data im2 to the image processing means 82. This accomplishes the adjustment of the timing for starting supplying the image data so that images not influenced by deflection are recorded on printing plates, whereby the contours of color component images recorded by the first and second recording heads 10 and 20 are regulated to have substantially identical shapes. Therefore, the fifth embodiment allows the recording heads 10 and 20 to simultaneously create color separations, with two printing plates fixed on the drum 1.

Since the fifth embodiment has a hardware structure similar to that of the first embodiment except the image conversion means 106 and 107 added to the control means 8, the fifth embodiment produces effects similar to those of the first embodiment (simplification of the circuit structure because of the submemory 83a and saving of hardware and software resources).

Sixth Embodiment

Figure 27:
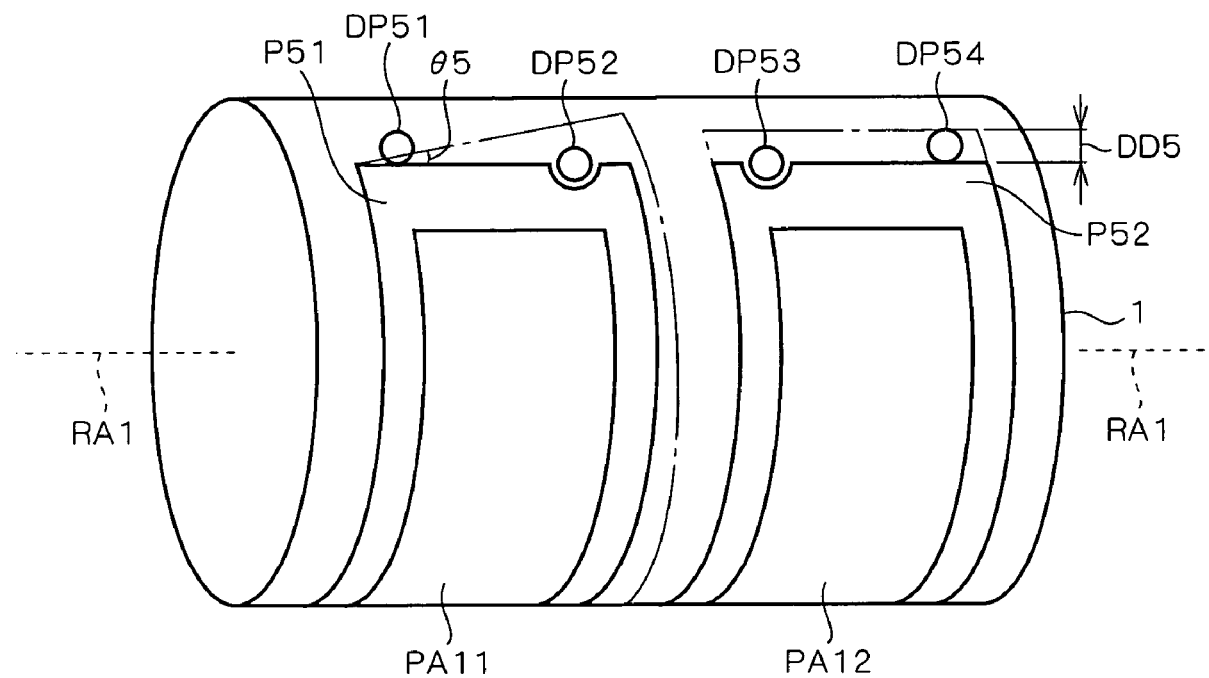
FIG. 27 is a view for illustrating the relation between positions of respective positioning pins provided upright and the fixed positions of two printing plates in the case of drawing images on the two printing plates with a single recording head in a sixth embodiment of the present invention.

The fourth embodiment has described the problems resulting from displacement of the mounting positions of the positioning pins when two printing plates are held on the outer peripheral surface of the drum 1 as shown in FIG. 20, i.e., (1) inclination of the recording area upper end straight lines of the image recording areas with respect to the rotation axis RA1 and (2) displacement of the recording area upper end straight lines along the main scanning direction, as well as the correction processing therefor. Such inclination and displacement similarly become problems when the image recording system according to the fourth embodiment is employed and only one of the first and second recording heads 10 and 20 is used to record images on two printing plates as shown in FIG. 27.

The image recording system according to the six embodiment is adapted so that, if one of the first and second recording heads 10 and 20 becomes unusable due to trouble and the like, only the usable recording head is used to record images in order on the two printing plates mounted on the drum 1. It is now assumed that two printing plates P52 and P51 are fixed in such a condition as shown in FIG. 27 on the drum 1, and that the second recording head 20 becomes unusable. In this case, the second recording head 20 is retracted to a position not opposed to the drum 1, and then the first recording head 10 records images on the printing plates P52 and P51 in the order named.

The printing plate P52 is positioned by positioning pins DP53 and DP54. It is assumed that the mounted printing plate P52 is displaced a distance DD5 in the main scanning direction from a predetermined mounting position as shown by the one-dot chain lines in FIG. 27 due to lack of positional precision of one of the positioning pins.

The remaining printing plate P51 is positioned by positioning pins DP51 and DP52. It is assumed that the mounted printing plate P51 is rotated an angle θ5 from a predetermined mounting position due to lack of positional precision of one of the positioning pins.

For the normal image recording using both of the first and second recording heads 10 and 20 as discussed above with reference to FIG. 22, the image conversion means 106 applies a previously stored parameter (in this case, a translation parameter) to the image data im1 for the printing plate P52 to output the regulated image data im3 subjected to the translation conversion. The image conversion means 107 applies a previously stored parameter (in this case, a rotation parameter) to the image data im2 for the printing plate P51 to output the regulated image data im4 subjected to the rotation conversion.

The image recording according to the sixth embodiment is performed in a manner to be described below. The image conversion means 106 performs an image conversion on the original image data im1 for use in image recording on the printing plate P52 in accordance with the previously stored parameter, to provide the regulated image data im3, and thereafter transmits the regulated image data im3 to the first image processing means 81. This is similar to the process in the fourth embodiment. In the sixth embodiment, however, the image conversion means 106 also performs the image conversion on the original image data im2 for use in image recording on the printing plate P51, to provide the regulated image data im4, and thereafter transmits the regulated image data im4 to the first image processing means 81. It should be noted that the image conversion means 106 reads the rotation parameter previously stored in the image conversion means 107 to apply the rotation parameter to the original image data im2 when performing the image conversion on the original image data im2.

Such processing allows the image recording of a plurality of color component images corresponding to each other such as those having substantially identical contours on the two printing plates even when only the first recording head 10 is used for image recording on the two printing plates P51 and P52.

Seventh Embodiment

The fifth embodiment has described the problems with the images recorded on the printing plates and the deflection correction processing in the case where the ball screws 11 and 22, the guides 12 and the base part 9 are deflected as shown in FIG. 24. The problems resulting from the deflection, however, also arise in the case where only one of the first and second recording heads 10 and 20 is used to record images on the two printing plates as shown in FIG. 25 when the image recording system of the fifth embodiment is used. In this case, applying such a technique as described in the sixth embodiment enables only one of the recording heads to record a plurality of color component images corresponding to each other such as those having substantially identical contours on the two printing plates.

Eighth Embodiment

Figure 28:
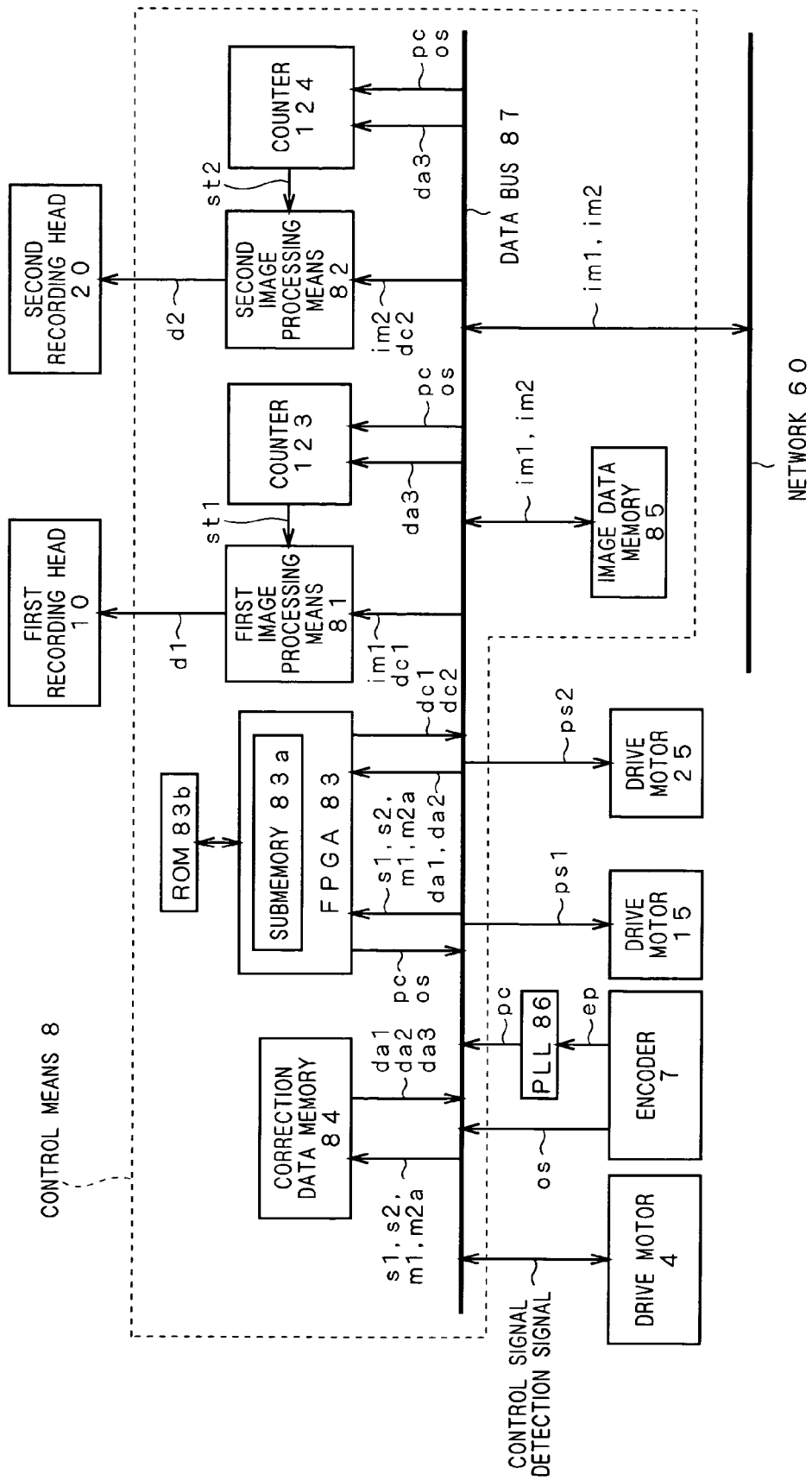
FIG. 28 is a block diagram for illustrating the hardware structure of control means of an image recording system in an eighth embodiment of the present invention.
Figure 29:
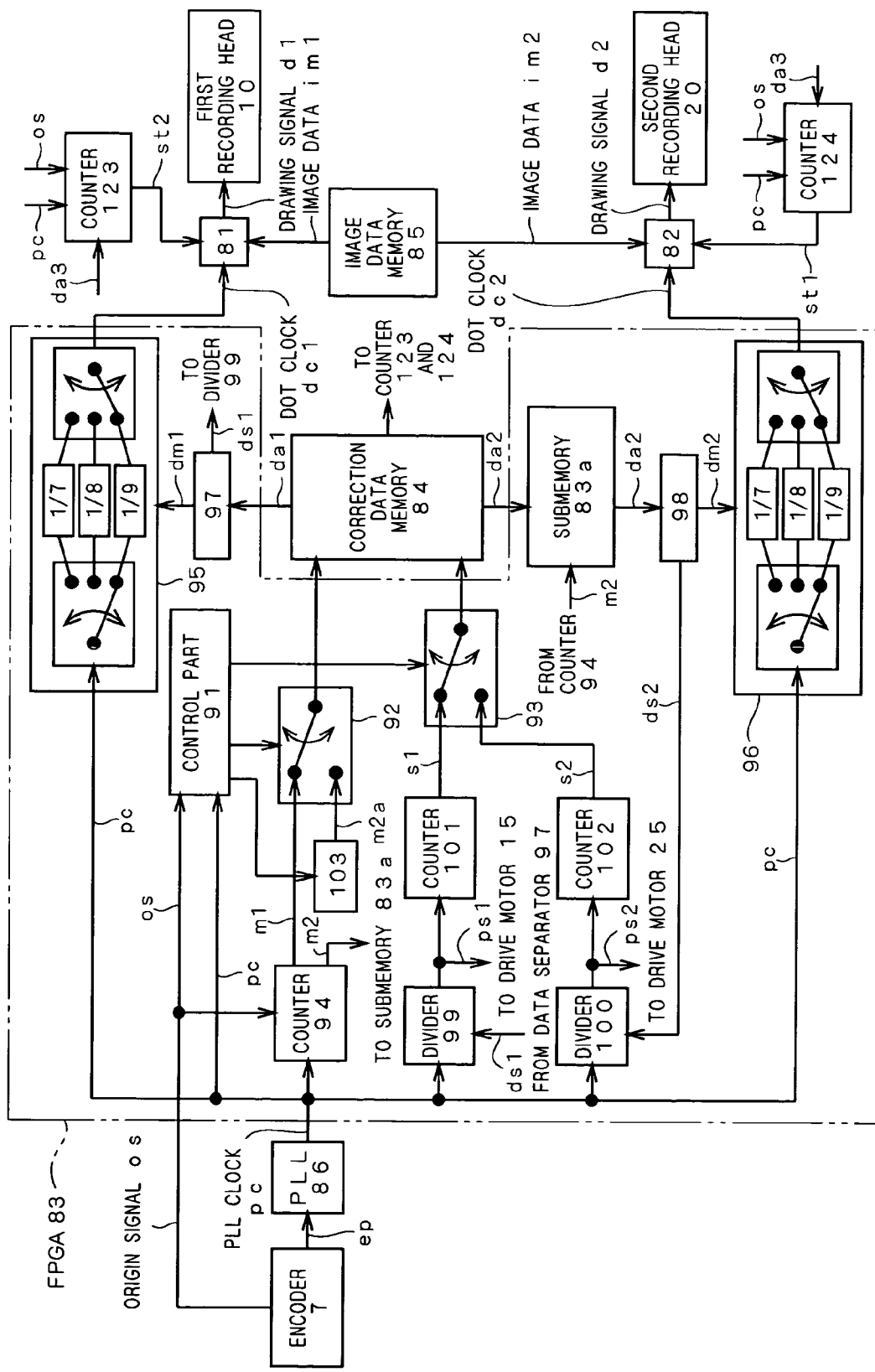
FIG. 29 is a functional block diagram of control means in the eighth embodiment.

Although the deflection correction in the main scanning direction is performed by converting the image data in the fifth and seventh embodiments, the deflection correction may be accomplished by a technique to be described below. FIG. 28 is a block diagram for illustrating the hardware structure of control means of an image recording system according to an eighth embodiment of the present invention. FIG. 29 is a functional block diagram of the control means. Since these are substantially identical with those of the first embodiment, only differences will be described.

As shown in FIG. 28, counters 123 and 124 are newly added in the eighth embodiment. The correction data memory 84 further stores correction data da3 for deflection correction in the main scanning direction in addition to the correction data da1 and da2.

The correction data da3 will be described. The correction data da3 specifies a distance in the main scanning direction from a main scanning origin to a position at which the recording head 10 or 20 starts the image recording, using the PLL clock pc as a unit. Specifically, if the recording start positions from the main scanning origin are made identical in all subscanning positions when the base part 9, the guides 12 and the ball screws 11 and 12 are deflected in the main scanning direction as described above with reference to FIG. 24, the recording area upper end straight lines LU43 and 44 of the image recording areas PA41 and PA42 on the printing plates P31 and P32 are deflected as shown in FIG. 25(b). The correction data da3 is data for correcting the aforementioned recording area upper end straight lines LU43 and 44 as denoted by LU41 and LU42 indicated by dotted lines in FIG. 25(b) so that the recording area upper end straight lines LU43 and 44 are parallel with the printing plate upper end straight lines PU31 and 32. The correction data d3 is also data corresponding to the distances in the main scanning direction from the main scanning origin to the recording area upper end straight lines LU43 and 44 in a plurality of subscanning positions.

The correction data da3 is also data such that low-density data acquired by measurement at each position obtained by dividing the drum 1 by 250 in the subscanning direction is computed to have a resolution increased to a unit corresponding to the amount of movement (referred to as one pitch) of the recording heads 10 and 20 in the subscanning direction during one rotation of the drum 1. Thus, the data acquired by measurement is incremented by computation.

The counters 123 and 124 receive the origin signal os indicating the main scanning origin position from the encoder 7, and receives the PLL clock pc indicating the rotational phase of the drum 1 from the PLL 86.

The correction data da3 corresponding to the current subscanning positions of the corresponding recording heads 10 and 20 are read and set in the counters 123 and 124 in timed relation to the input of the origin signal os to the counters 123 and 124. The counters 123 and 124 start counting the PLL clock pc at the time when the origin signal os is input to the counters 123 and 124. When the PLL clock pc corresponding to the recording correction data da3 is counted, recording start timing signals st1 and st2 are sent to the first and second image processing means 81 and 82.

The first and second image processing means 81 and 82 are triggered by the recording start timing signals st1 and st2 to start sending the drawing signals d1 and d2 synchronous with the dot clocks dc1 and dc2 based on the image data im1 and im2 sent from the image data memory 85, thereby providing the drawing signals d1 and d2 to the first and second recording heads 10 and 20.

Thus, the image recording areas PA31 and PA32 having no deflection in the main scanning direction are formed on the printing plates P31 and P32 (See FIG. 25(a)). The distance DD31 from the printing plate upper end straight line PU31 of the printing plate P31 to the recording area upper end straight line LU31 become equal to the distance DD32 from the printing plate upper end straight line PU32 of the printing plate P32 to the recording area upper end straight line LU32. Therefore, the use of the recording heads 10 and 20 allows the simultaneous recording of two color component images whose contours are substantially identical in shape, such as color separations of color reproduction, in the image recording areas PA31 and PA32.

Although the correction data da3 for correction of the deflection in the main scanning direction is shared between the first and second recording heads 10 and 20 in the eighth embodiment, the correction data da3 may be prepared for each of the recording heads 10 and 20.

MODIFICATIONS

While the Present invention has been described, the present invention is not restricted to the aforementioned embodiments but can be modified in various ways.

(1) While the drum 1 having the cylindrical outer surface is employed in the first to eighth embodiments to hold the imaging material, the present invention is not restricted to this but is also executable in a so-called internal drum image recording system which holds an imaging material on a holding surface defined by the inner surface of a cylindrical holding member and rotates recording heads in the cylindrical inner surface for scanning, for example.

(2) While the subscanning positions of the recording heads are acquired on the basis of the signals from the encoder 7 coupled to the rotary shaft of the drum 1 in the first to eighth embodiments, an encoder may be mounted on a drive motor driving a ball screw for acquiring the subscanning positions on the basis of encoder pulse signals from this encoder.

(3) In the first and second embodiments, a plurality of printing plates, rather than a single printing plate, may be mounted on the drum 1 for individually recording images on the respective printing plates by the use of different recording heads.

(4) While it has been described that the image distortion in the main scanning direction results from a manufacturing error of the drum 1 and the image distortion in the subscanning direction results from a mounting error of the guide rails 12 in the first and second embodiments for the purpose of simplification, image distortion resulting from other factors can also be corrected according to the present invention. For example, image distortion in the main scanning direction might result from a mounting error of the encoder 7. Further, other correspondences between image distortion and the factor therefor than the above is also conceivable. For example, the image distortion in the subscanning direction might result from a manufacturing error of the drum 1, or the image distortion in the main scanning direction might result from a mounting error of the guide rails 12. The present invention is applicable to either case. These modifications are also applicable to the fourth to eighth embodiments.

(5) The image distortion to be eliminated by the present invention in the first and second embodiments does not necessarily take place only when a plurality of recording heads share the same member. For example, while different ball screws feed the respective recording heads in the subscanning direction in the aforementioned embodiments, the different ball screws might cause substantially similar main scanning displacement or subscanning displacement with respect to the recording heads. This is generally derived from the characteristics of the respective products (ball screws). The present invention can also eliminate image distortion resulting from a member not shared between a plurality of recording heads. These modifications are also applicable to the fourth to eighth embodiments.

(6) While two recording heads are employed for recording substantially identical images such as color separations of color reproduction on the two printing plates in the third to fifth, and eighth embodiments, the present invention is not restricted to this. For example, at least three recording heads may be employed for recording images on three printing plates corresponding to the respective recording heads.

Figure 30:
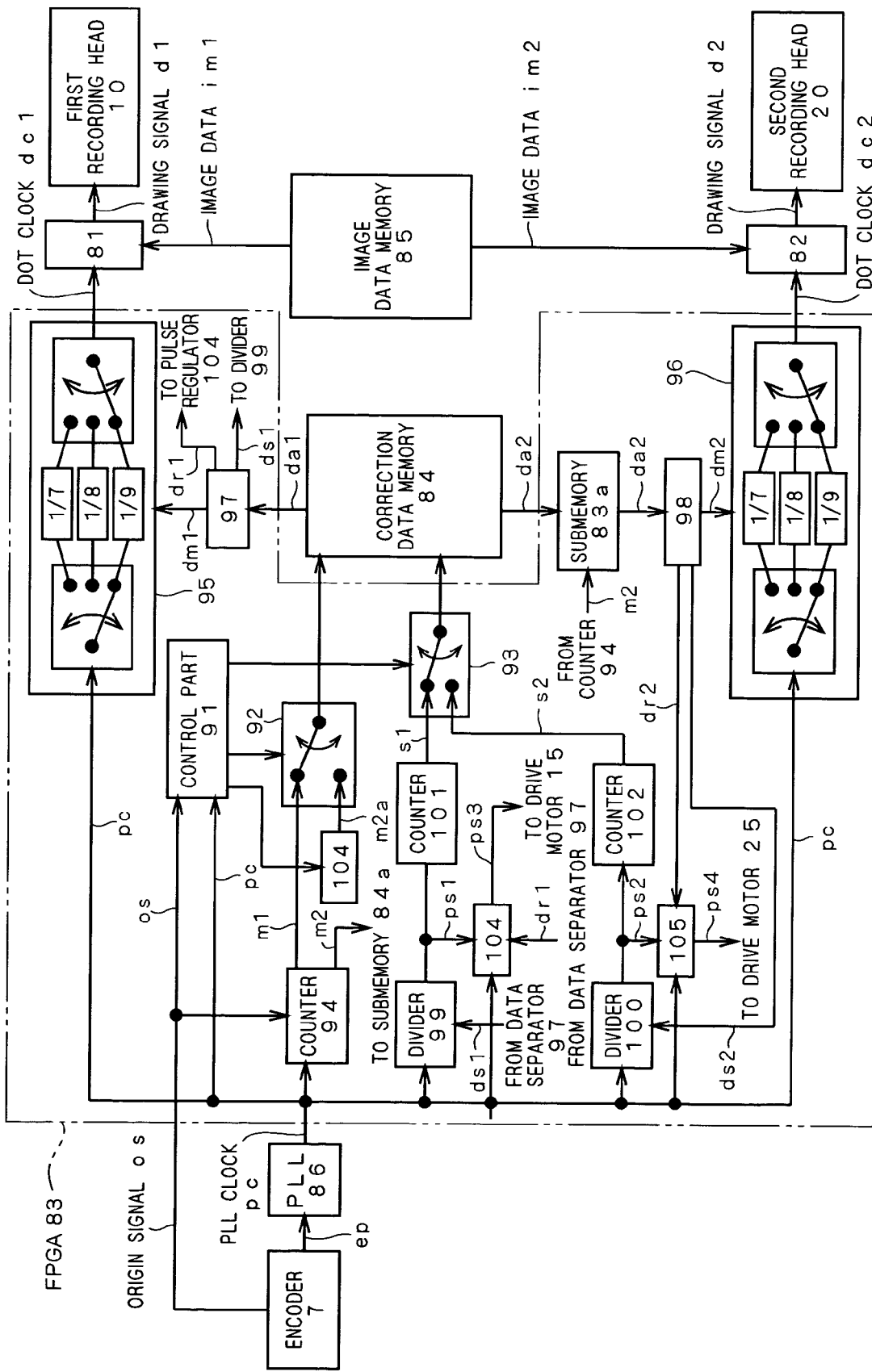
FIG. 30 shows a modification of the functional block of the control means of the image recording system in the third embodiment.

(7) While the correction data memories 84 and 84a store the correction data da1 and da2 respectively as shown in FIG. 15 for performing correction processing in the third embodiment, the present invention is not restricted to this. For example, pulse regulators 104 and 105 may be added to the FPGA 83 of the image recording system according to the first embodiment for performing correction processing in the correction data memory 84 and the submemory 83a, as shown in FIG. 30. More specifically, (A) each cell of the memory space of the correction data memory 84 stores the dot regulation data dm1, the regulation data ds1 and the feed rate regulation data dr1 and dr2, and (B) the dot regulation data dm1, the regulation data ds1 and the feed rate regulation data dr1 are output as the correction data da1 to the data separator 97, whereas the dot regulation data dm2, the regulation data ds2 and the feed rate regulation data dr2 are output as the correction data da2 to the data separator 98. During the image recording, (C) correction processing similar to that in the first embodiment is executed according to the timing chart shown in FIG. 8. Consequently, effects similar to those of the first embodiment, i.e., simplification of the circuit structure because of the submemory 83 and saving of hardware and software resources can be attained also in the third embodiment by applying this modification. Application of the modifications (4) and (5) is also enabled by application of this modification.

(8) While a single combination of the positioning pins for arranging the printing plates corresponding to the recording heads is described in the fourth and eighth embodiments, the present invention is not restricted to this. For example, if there are a plurality of combinations of the positioning pins for the printing plates, image conversion parameters responsive to the number of combinations may be employed.

While the invention has been shown and described in detail, the foregoing description is in all aspects illustrative and not restrictive. It is therefore understood that numerous modifications and variations can be devised without departing from the scope of the invention.

The invention claimed is:

1. An image recording system for recording an image by scanning an imaging material on the basis of image data, comprising:
 a holding element for holding the imaging material on a substantially cylindrical holding surface;
 a plurality of recording heads individually movable on a common moving path along an axial direction of said holding surface and capable of individually scanning said imaging material;
 a compensation data holding element for holding compensation data compensating for a scanning error from a reference scanning state with respect to said holding surface; and
 a regulation element for regulating scanning positions of said plurality of recording heads on said imaging material while employing the same part of said compensation data for said plurality of recording heads for the same scanning position.

2. An image recording system for recording an image by scanning an imaging material on the basis of image data, comprising:
 a holding element for holding the imaging material on a substantially cylindrical holding surface;
 a plurality of recording heads movable on a common moving path along an axial direction of said holding surface and capable of individually scanning said imaging material;
 a compensation data holding element for holding compensation data compensating for a scanning error from a reference scanning state with respect to said holding surface; and
 a regulation element for regulating scanning positions of said plurality of recording heads on said imaging material while employing the same part of said compensation data for said plurality of recording heads for the same scanning position, wherein
 said compensation data holding element comprises
  a data memory for storing the compensation data for compensating for scanning positions of the recording heads on said imaging material, and
 said regulation element comprises:
  a submemory for temporarily storing said compensation data,
  a scanning position detection element for detecting the scanning positions of the recording heads,
  an element for detecting that at least one of said plurality of recording heads is in a recording inhibition area on the basis of a signal from said scanning position detection element, to read the compensation data for the remainder of the plurality of recording heads from said data memory thereby to store the compensation data in said submemory while said one of the recording heads is in said recording inhibition area, and
  a correction element for reading the compensation data in parallel from said data memory and the submemory to correct the scanning positions of the plurality of recording heads on the imaging material.

3. The image recording system according to claim 2, wherein
 said scanning position detection element detects main scanning positions of the plurality of recording heads respectively, and said correction element corrects the main scanning positions of said plurality of recording heads on the imaging material.

4. The image recording system according to claim 2, wherein
 said scanning position detection element detects subscanning positions of said plurality of recording heads respectively, and
 said correction element corrects the subscanning positions of said plurality of recording heads on the imaging material.

5. An image recording system for recording a plurality of images on a plurality of imaging materials respectively on the basis of a plurality of image data corresponding to each other, comprising:
 a holding element for holding said plurality of imaging materials in parallel on a substantially cylindrical holding surface;
 a plurality of recording heads arranged in parallel opposite to said holding surface;

an image data supply element for supplying said plurality of image data to said plurality of recording heads respectively;

a moving element for individually moving said plurality of recording heads along an axial direction of said holding surface;

a moving signal supply element for supplying moving signals for said plurality of recording heads respectively to said moving element; and a regulation element for at least partially regulating said plurality of image data and said moving signals, thereby to compensate for a geometric mismatch between the scans of said plurality of imaging materials respectively by said plurality of recording heads.

6. The image recording system according to claim 5, wherein said regulation element changes the feed rates of said plurality of recording heads respectively in response to the current positions of said plurality of recording heads respectively.

7. The image recording system according to claim 5, wherein said moving element comprises:
   a guide element for guiding said plurality of recording heads along said axial direction, and
   a drive element for driving said plurality of recording heads in said axial direction along said guide element, and
said regulation element regulates said plurality of image data in response to relative distortion of said guide element and said holding surface.

8. The image recording system according to claim 5, wherein said holding element rotates about its axis; and
said regulation element regulates a timing for starting supplying said plurality of image data to said plurality of recording heads each time said holding element makes one rotation.

9. The image recording system according to claim 5, wherein said holding element comprises
   a positioning element for positioning said plurality of imaging materials on said holding surface, and
said regulation element regulates said plurality of image data on the basis of geometric relation between
   i) moving directions of said plurality of recording heads respectively and
   ii) a plurality of imaging material holding positions defined by said positioning element.

10. The image recording system according to claim 9, wherein said regulation element comprises
   an image conversion element for converting said plurality of image data on the basis of image conversion parameters corresponding respectively to said plurality of recording heads, thereby to obtain a plurality of regulated image data, and
said plurality of recording heads record said images on said plurality of imaging materials on the basis of said plurality of regulated image data respectively.

11. The image recording system according to claim 10, wherein said image conversion element converts said plurality of image data by rotation to obtain said plurality of regulated image data.

12. The image recording system according to claim 10, wherein said image conversion element converts said plurality of image data by translation to obtain said plurality of regulated image data.

13. The image recording system according to claim 10, wherein said image conversion element applies a rotation conversion and a translation conversion to said plurality of image data to obtain said plurality of regulated image data.

14. The image recording system according to claim 5, wherein said regulation element comprises
a correction data memory for storing correction data for correcting scanning positions of said plurality of recording heads on said plurality of imaging materials respectively,
a submemory for temporarily storing said correction data,
a scanning position detection element for detecting the scanning positions of said recording heads,
an element for detecting that at least one of said plurality of recording heads is in a recording inhibition area on the basis of a signal from said scanning position detection element, to read the correction data for the remainder of the plurality of recording heads from said correction data memory thereby to store the correction data in said submemory while said one of the recording heads is in said recording inhibition area, and
a correction element for reading the correction data in parallel from said correction data memory and the submemory to correct the scanning positions of said plurality of recording heads on said plurality of imaging materials.

15. The image recording system according to claim 5, wherein said plurality of image data are image data about a plurality of color components of a single full-color image.

16. An image recording system for recording a plurality of images on a plurality of imaging materials respectively on the basis of a plurality of image data corresponding to each other, comprising:

a holding element for holding said plurality of imaging materials in parallel on a substantially cylindrical holding surface;

a recording head provided opposite to said holding surface;

an image data supply element for sequentially supplying said plurality of image data to said recording head;

a moving element for moving said recording head along an axial direction of said holding surface;

a moving signal supply element for supplying a moving signal for said recording head to said moving element; and a regulation element for at least partially regulating said plurality of image data and said moving signal each, thereby to compensate for a geometric mismatch between the scans of said plurality of imaging materials respectively by said recording head.

17. The image recording system according to claim 16, wherein said moving element comprises
   a guide element for guiding said recording head along said axial direction, and
   a drive element for driving said recording head in said axial direction along said guide element, and
said regulation element regulates said plurality of image data in response to relative distortion of said guide element and said holding surface.

18. The image recording system according to claim 16, wherein
  said holding element rotates about its axis; and
  said regulation element regulates a timing for starting supplying said plurality of image data to said recording head each time said holding element makes one rotation.

19. The image recording system according to claim 16, wherein
  said holding element comprises
    a positioning element for positioning said plurality of imaging materials on said holding surface, and
  said regulation element regulates said plurality of image data on the basis of relative positional relation between
    i) a moving direction of said single recording head and
    ii) an imaging material holding position defined by said positioning element.

20. The image recording system according to claim 16, wherein
  said regulation element comprises
    an image conversion element for converting said plurality of image data on the basis of an image conversion parameter corresponding to said recording head, thereby to obtain a plurality of regulated image data, and
  said recording head sequentially records said images on said plurality of imaging materials on the basis of said plurality of regulated image data.

21. The image recording system according to claim 20, wherein
  said image conversion element converts said plurality of image data by rotation, thereby to obtain said regulated image data.

22. The image recording system according to claim 16, wherein
  said regulation element changes the feed rates of said recording head in response to the current positions of said recording head.

* * * * *